United States Patent
Feldman et al.

(10) Patent No.: US 8,295,575 B2
(45) Date of Patent: Oct. 23, 2012

(54) COMPUTER ASSISTED DIAGNOSIS (CAD) OF CANCER USING MULTI-FUNCTIONAL, MULTI-MODAL IN-VIVO MAGNETIC RESONANCE SPECTROSCOPY (MRS) AND IMAGING (MRI)

(75) Inventors: Michael D. Feldman, Wilmington, DE (US); Satish Viswanath, Highland Park, NJ (US); Pallavi Tiwari, Highland Park, NJ (US); Robert Toth, Hillsborough, NJ (US); Anant Madabhushi, South Plainfield, NJ (US); John Tomaszeweski, Abington, PA (US); Mark Rosen, Bala Cynwyd, PA (US)

(73) Assignees: The Trustees of the University of PA., Philadelphia, PA (US); Rutgers, The State University of New Jersey, New Brunswick, NJ (US)

( * ) Notice: Subject to any disclaimer, the term of this patent is extended or adjusted under 35 U.S.C. 154(b) by 190 days.

(21) Appl. No.: 12/740,383

(22) PCT Filed: Oct. 29, 2008

(86) PCT No.: PCT/US2008/081656
§ 371 (c)(1),
(2), (4) Date: Sep. 16, 2010

(87) PCT Pub. No.: WO2009/058915
PCT Pub. Date: May 7, 2009

(65) Prior Publication Data
US 2010/0329529 A1  Dec. 30, 2010

Related U.S. Application Data

(60) Provisional application No. 60/983,553, filed on Oct. 29, 2007.

(51) Int. Cl.
*G06K 9/00* (2006.01)
*A61B 5/05* (2006.01)
(52) U.S. Cl. ........................................ 382/131; 600/410
(58) Field of Classification Search .................. 382/128, 382/129, 130, 131, 132, 133, 134, 159, 190, 382/227; 378/4, 21–27, 901; 424/9.3, 174.1; 435/6.14, 7.23, 344; 436/64, 173, 813; 600/407, 600/410, 425, 427, 525; 607/901
See application file for complete search history.

(56) References Cited

U.S. PATENT DOCUMENTS

| | | | |
|---|---|---|---|
| 6,154,560 A * | 11/2000 | Cothren et al. | 382/128 |
| 7,099,499 B2 * | 8/2006 | Blezek et al. | 382/128 |
| 7,983,732 B2 * | 7/2011 | Chen et al. | 600/407 |

(Continued)

OTHER PUBLICATIONS

Chappelow et al., "A Combined Feature Ensemble Based Mutual Information Scheme for Robust Inter-Modal, Inter-Protocol Image Registration", In 4th IEEE International Symposium on Biomedical Imaging: From Nano to Macro, 2007, ISBI 2007; ISBN: 104244-0672-2, pp. 644-647.

*Primary Examiner* — Abolfazl Tabatabai
(74) *Attorney, Agent, or Firm* — RatnerPrestia

(57) ABSTRACT

This invention relates to computer-assisted diagnostics and classification of prostate cancer. Specifically, the invention relates to segmentation of the prostate boundary on MRI images, cancer detection using multimodal multi-protocol MR data; and their integration for a computer-aided diagnosis and classification system for prostate cancer.

21 Claims, 37 Drawing Sheets

U.S. PATENT DOCUMENTS

| | | |
|---|---|---|
| 2002/0159622 A1 | 10/2002 | Schneider et al. |
| 2002/0181786 A1 | 12/2002 | Stark et al. |
| 2004/0142496 A1 | 7/2004 | Nicholson |
| 2004/0236208 A1 | 11/2004 | Amiel et al. |
| 2005/0111719 A1 | 5/2005 | Pescatore et al. |
| 2006/0235812 A1 | 10/2006 | Rifkin et al. |
| 2007/0053554 A1 | 3/2007 | Fayad et al. |
| 2007/0053589 A1 | 3/2007 | Gering |
| 2007/0081724 A1 | 4/2007 | Zhang et al. |
| 2007/0249928 A1 | 10/2007 | Blezek et al. |

* cited by examiner

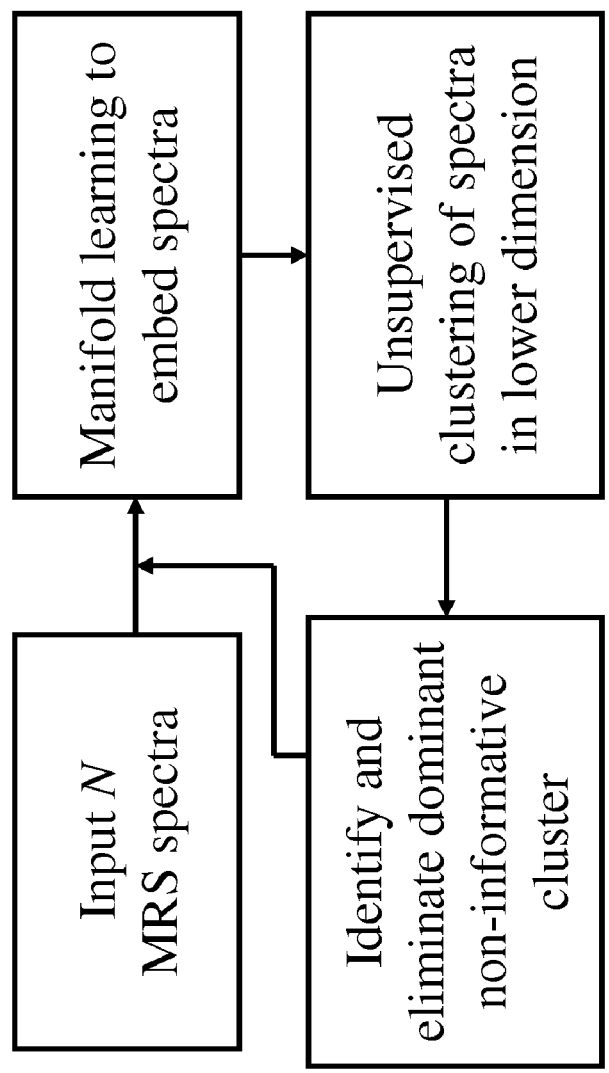
Figure # 1

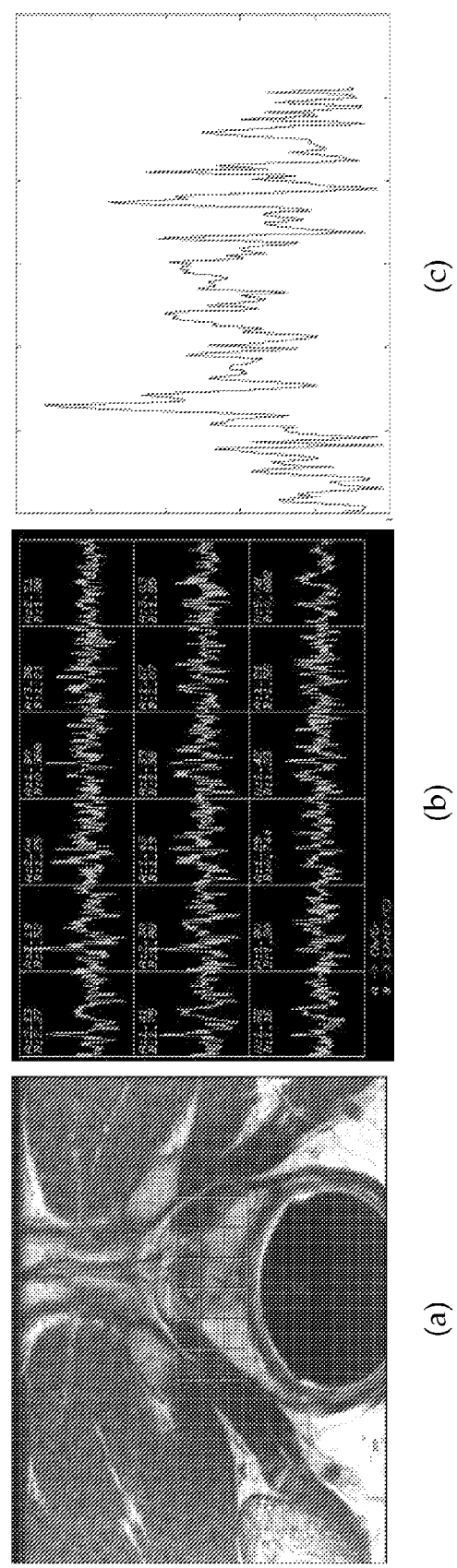
Figure # 2

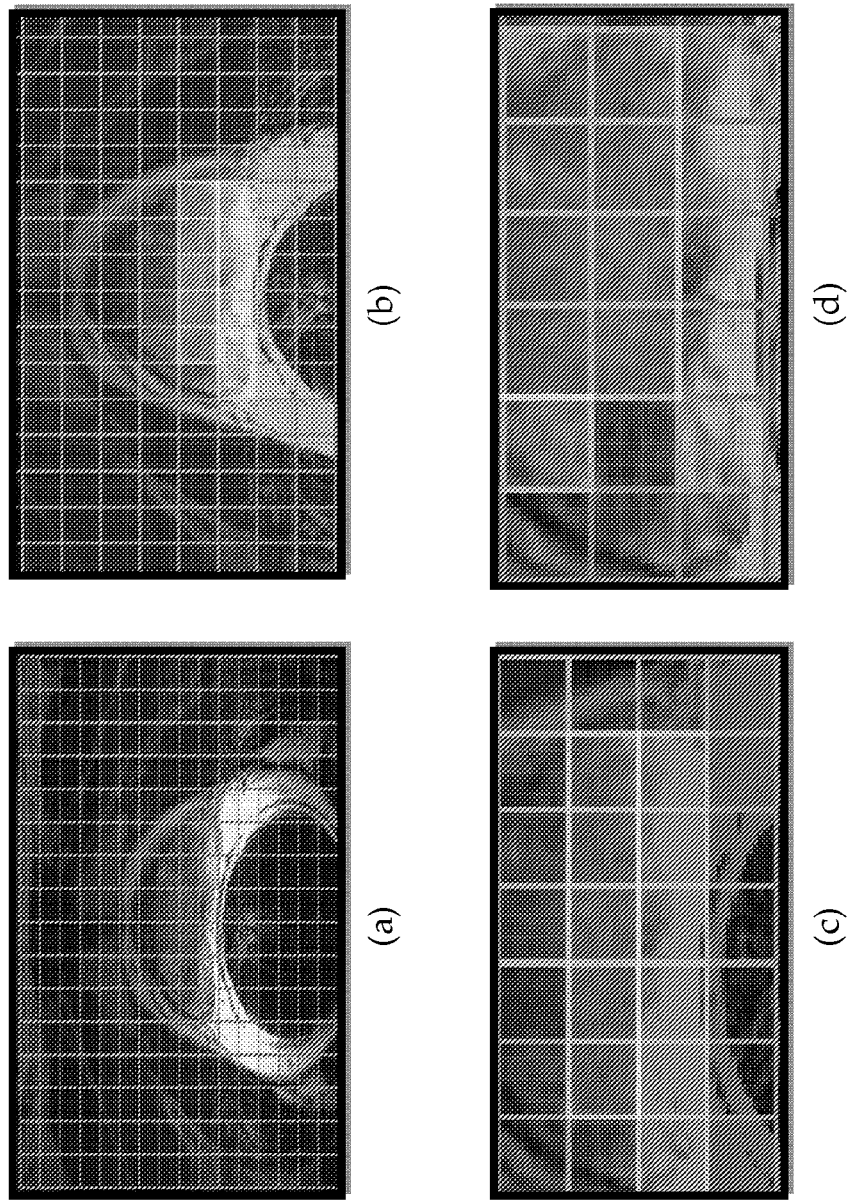
Figure # 3

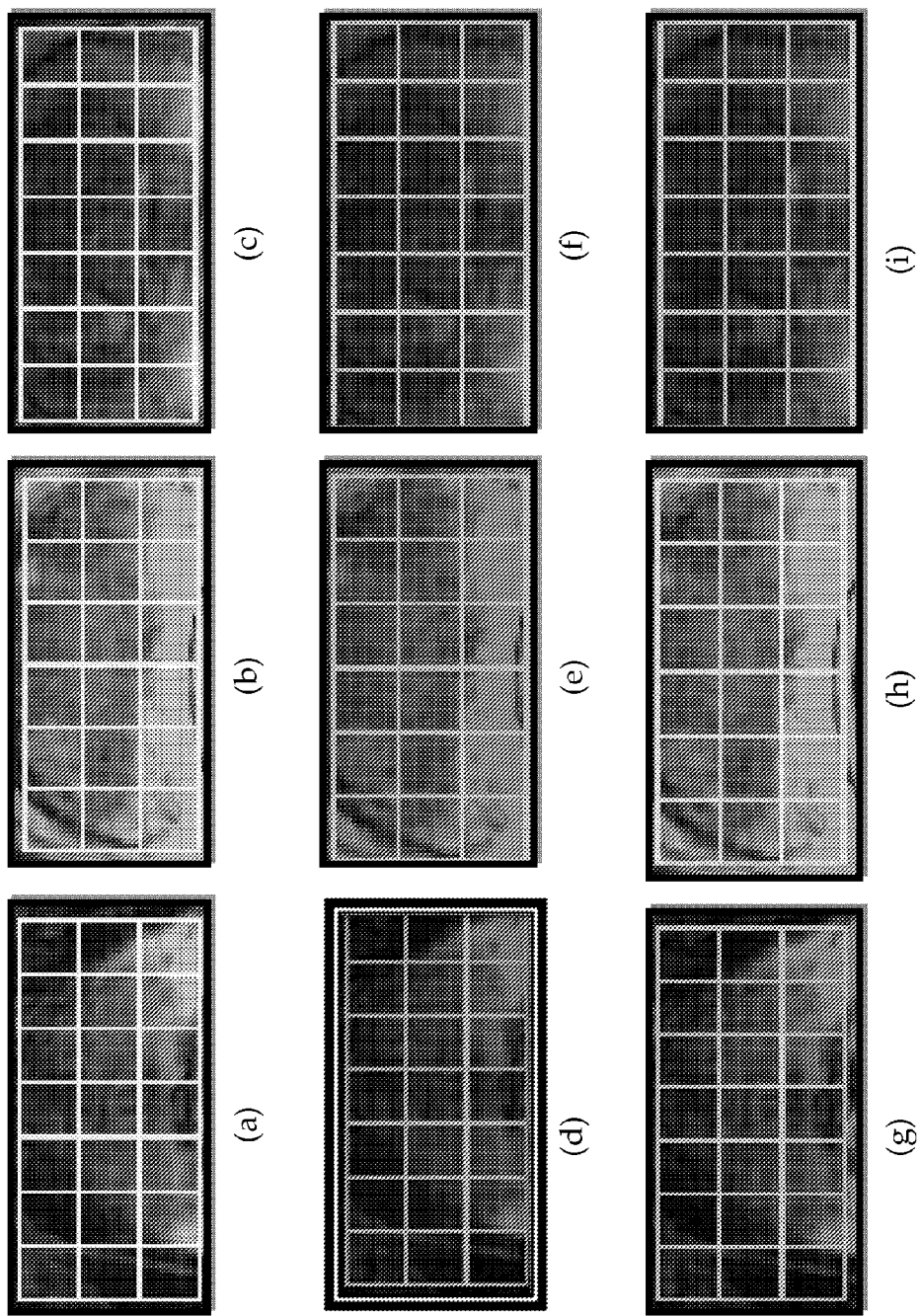
Figure # 4

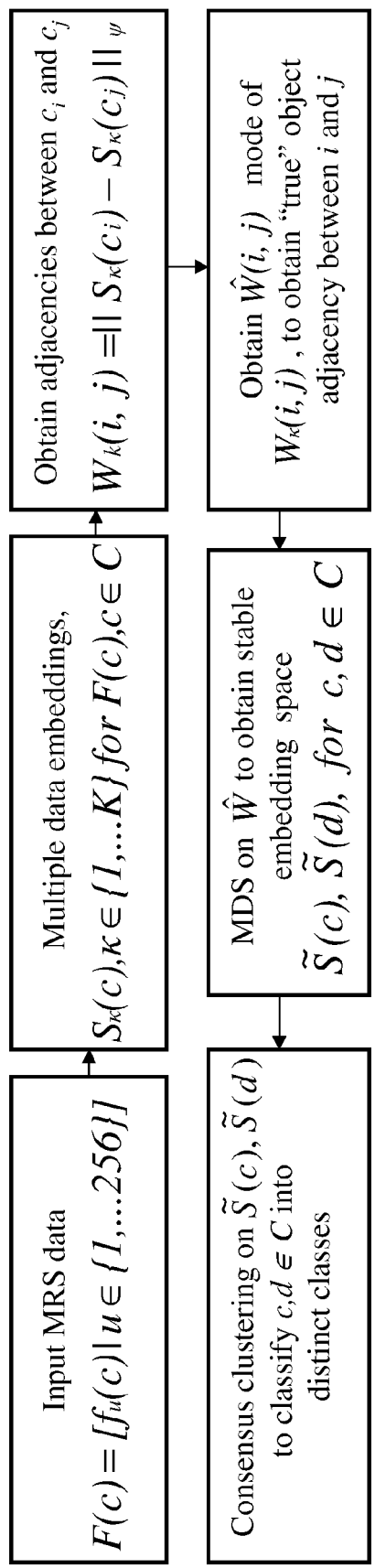
Figure # 5

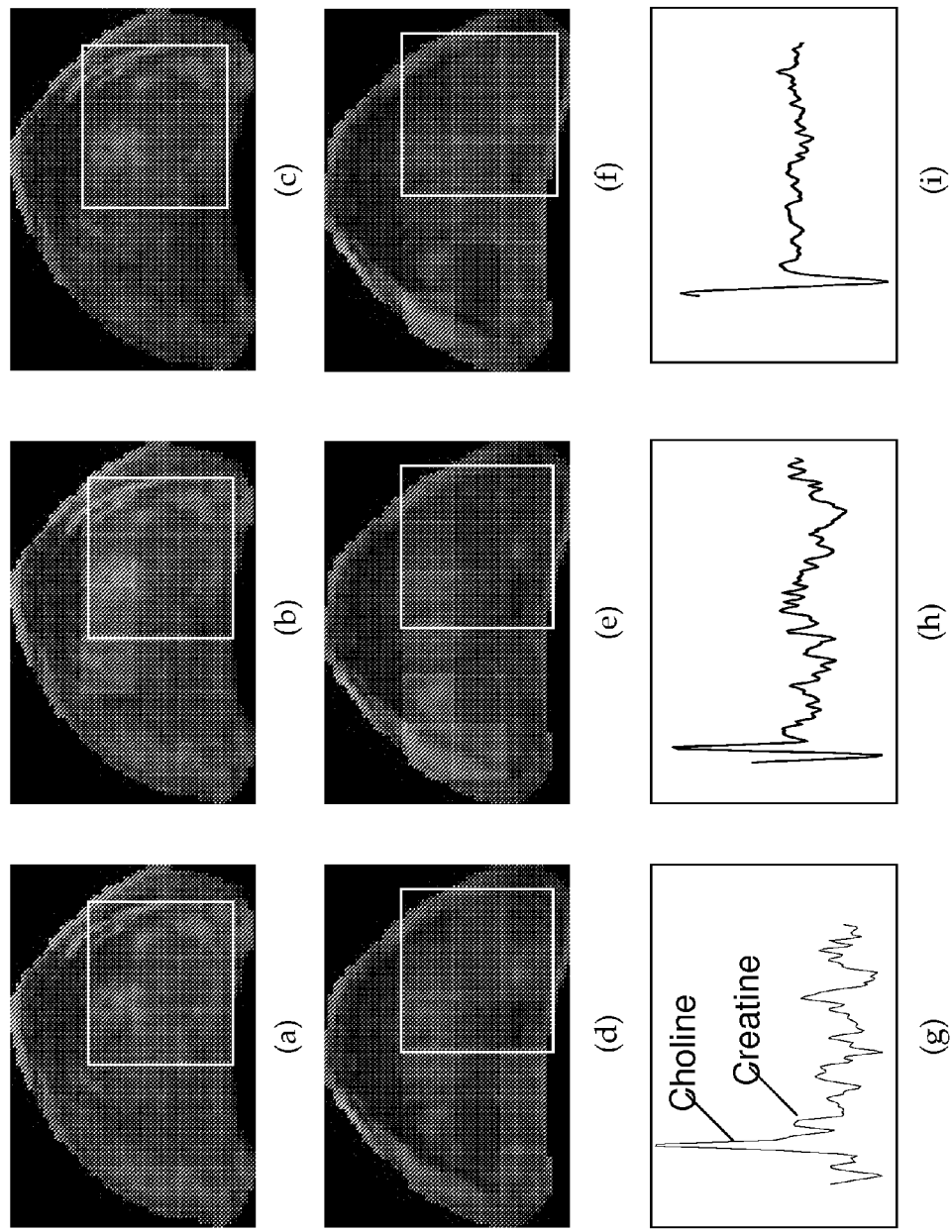
Figure # 6

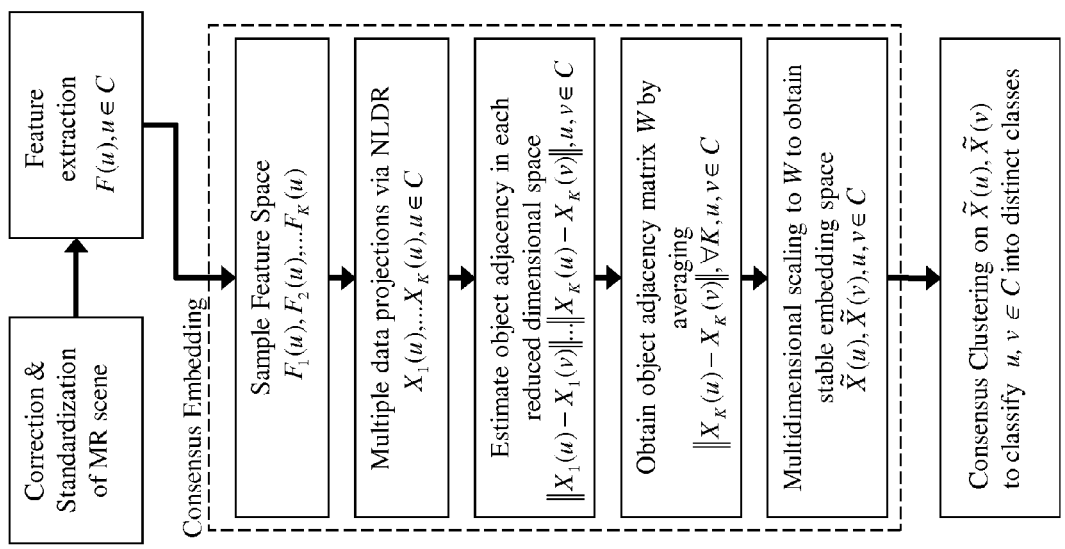
Figure #7

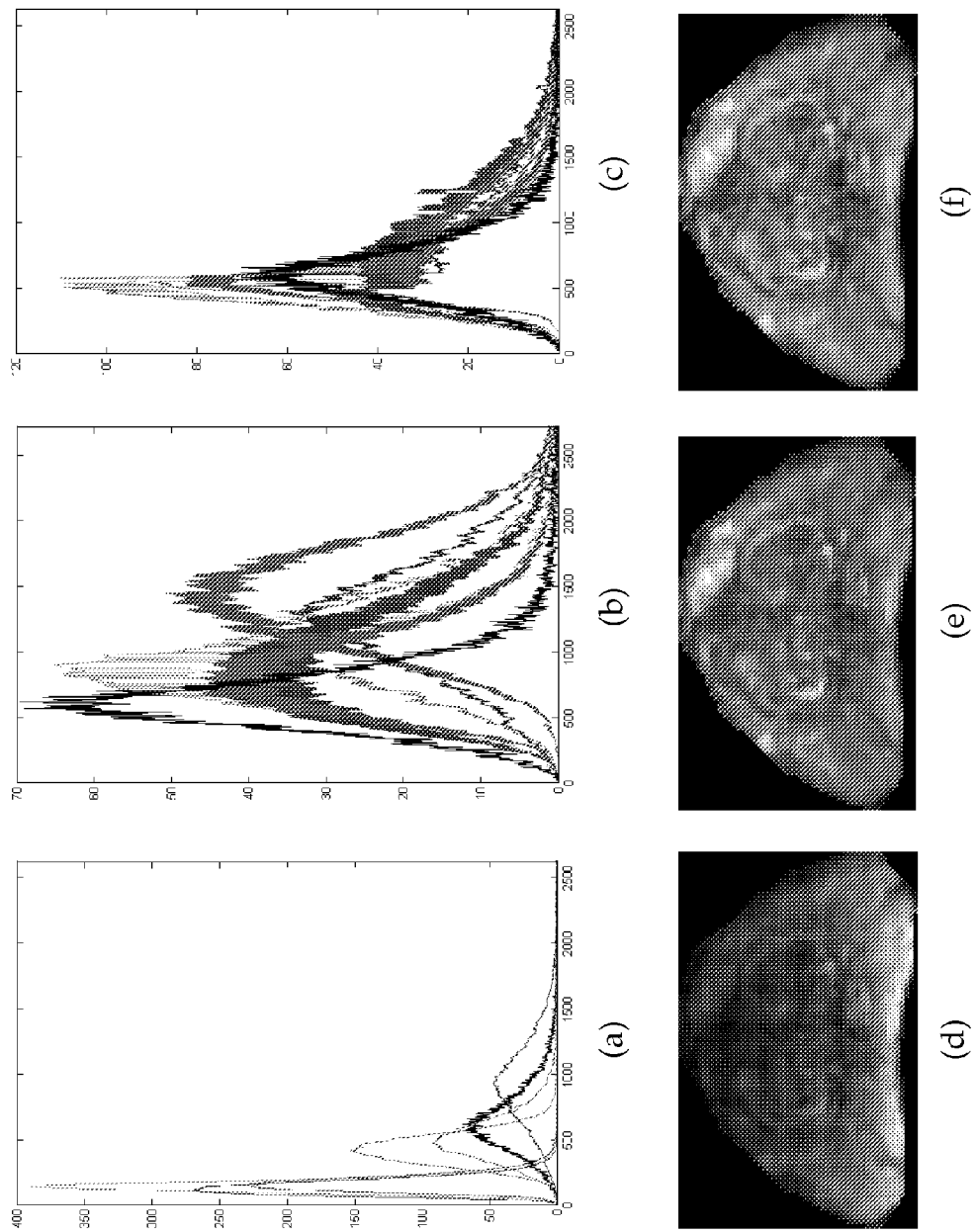
Figure # 8

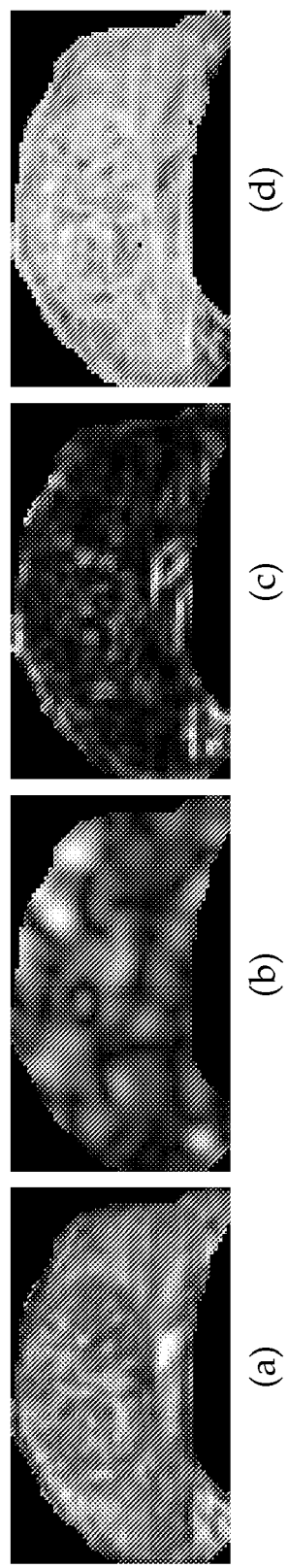
Figure # 9

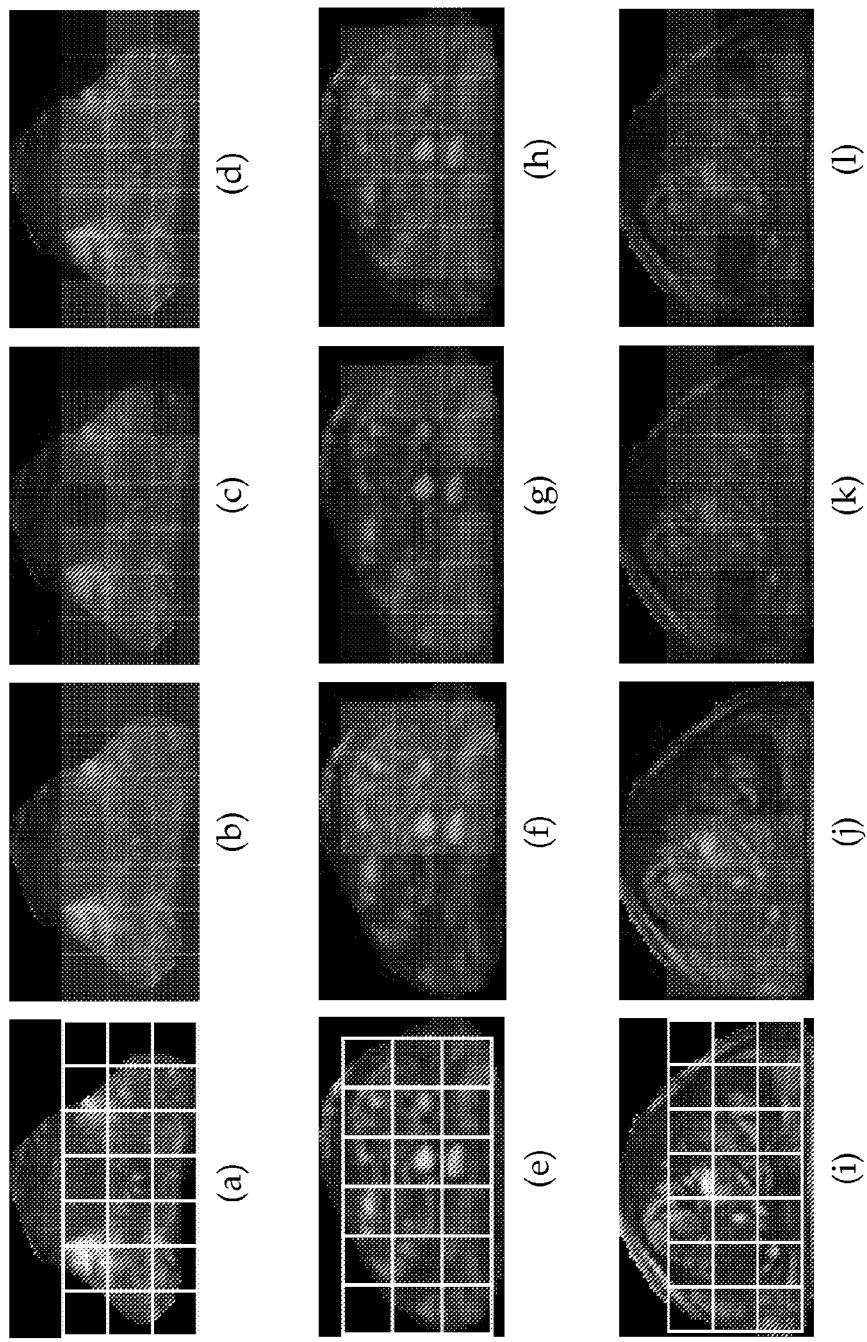
Figure # 10

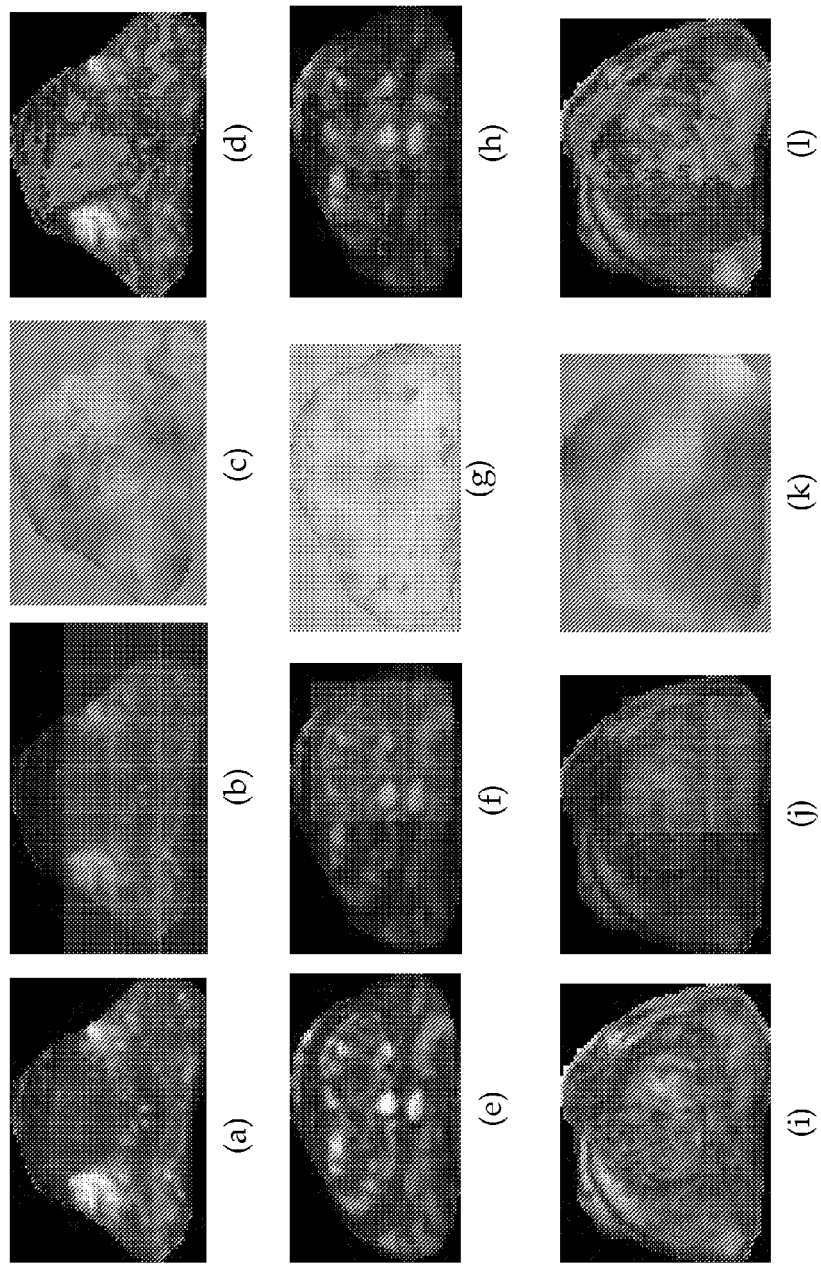
Figure # 11

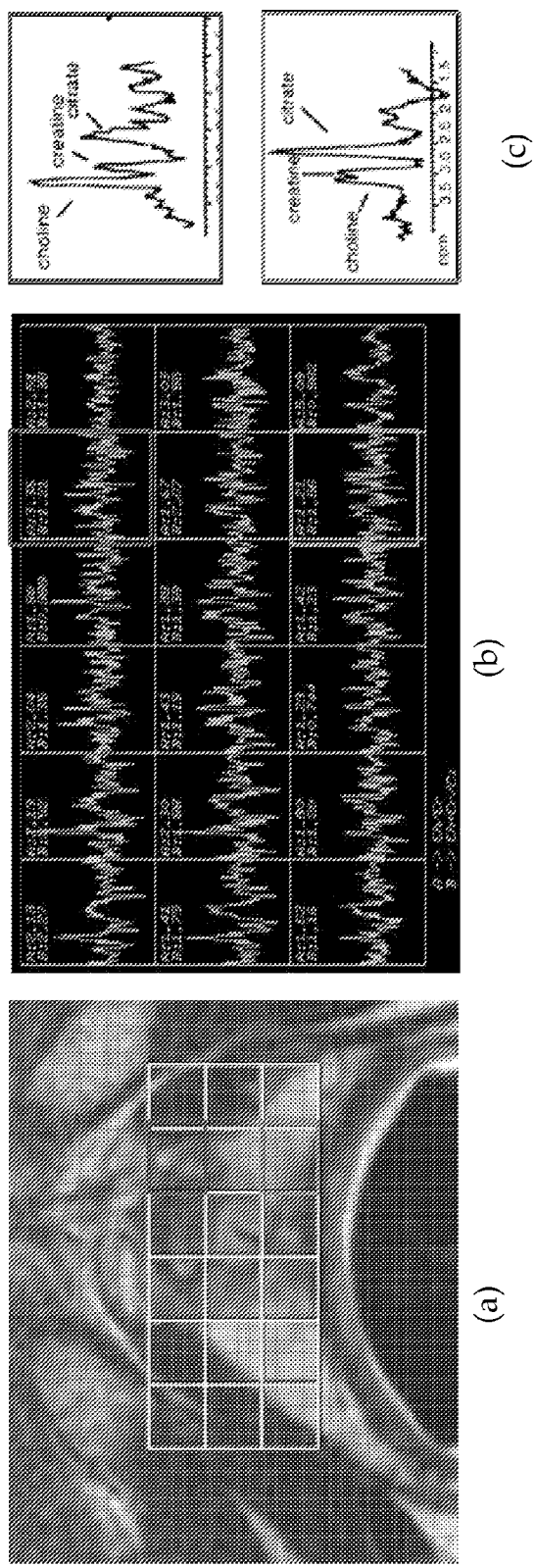
Figure # 12

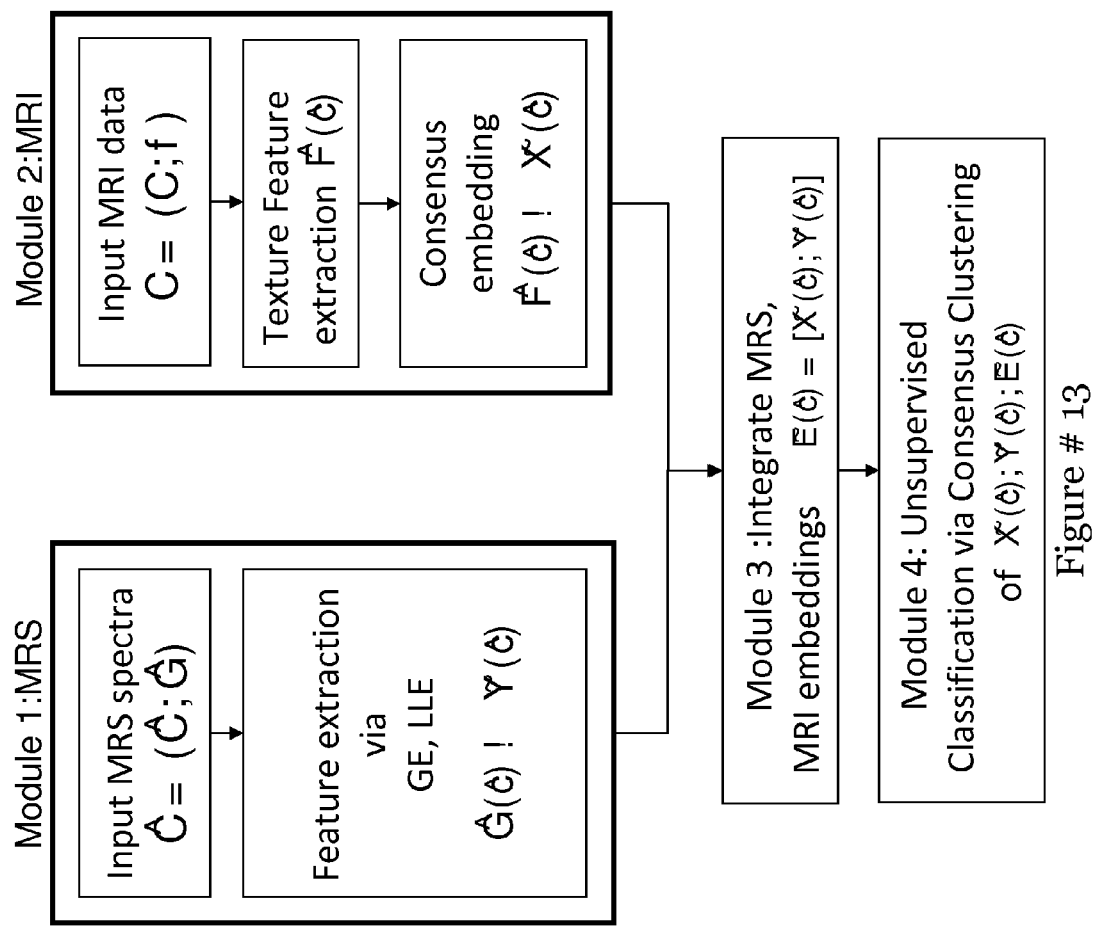
Figure # 13

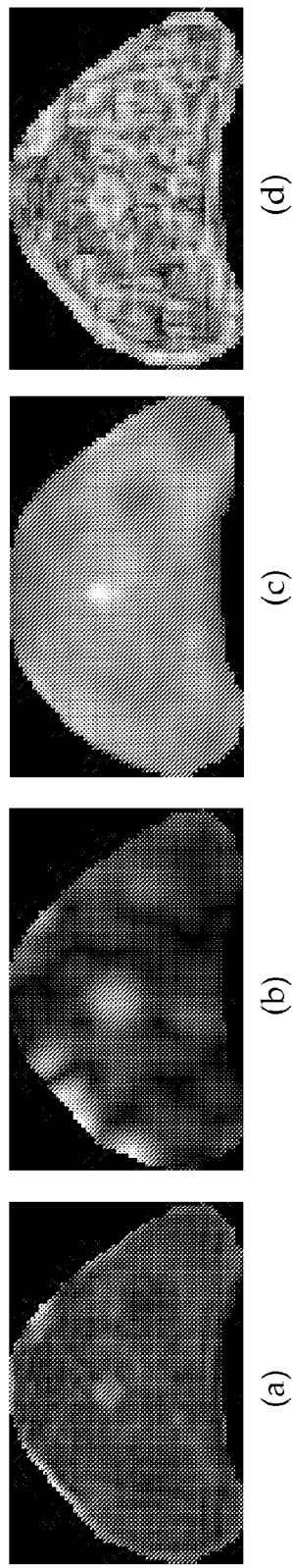
Figure # 14

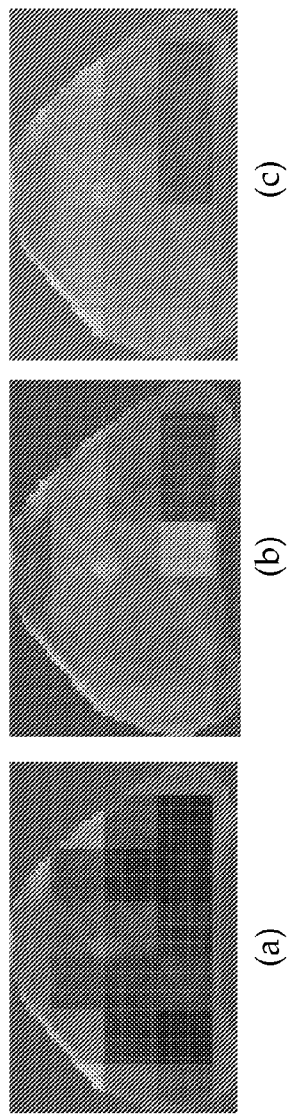
Figure # 15

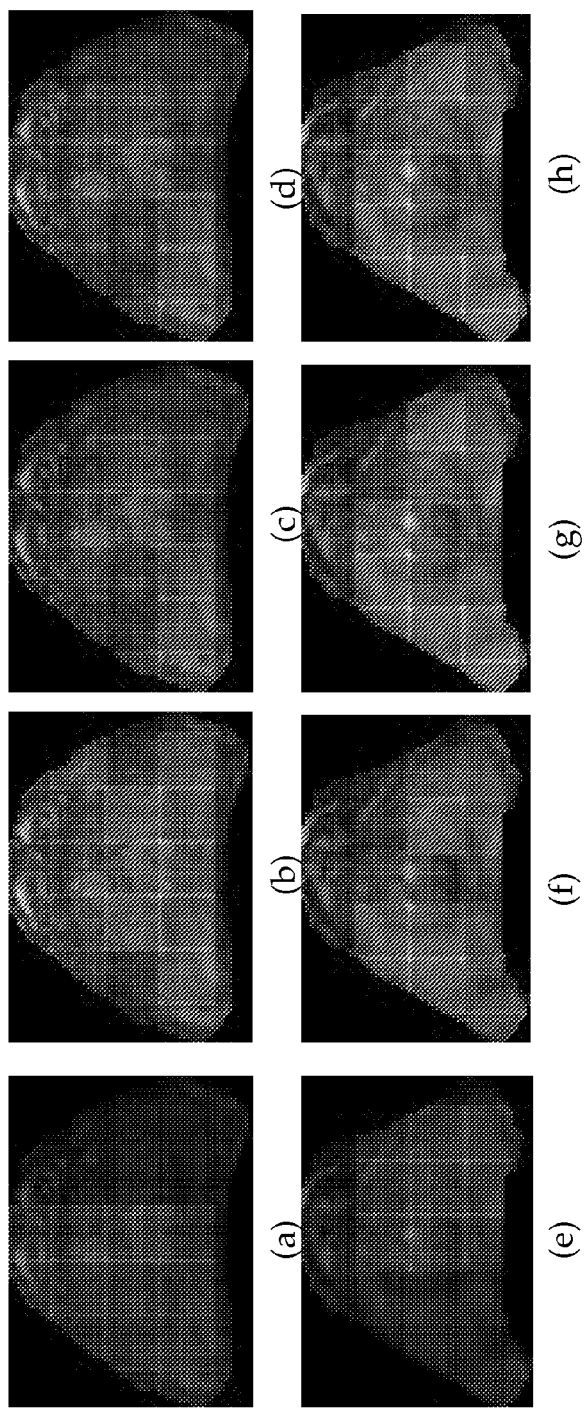
Figure # 16

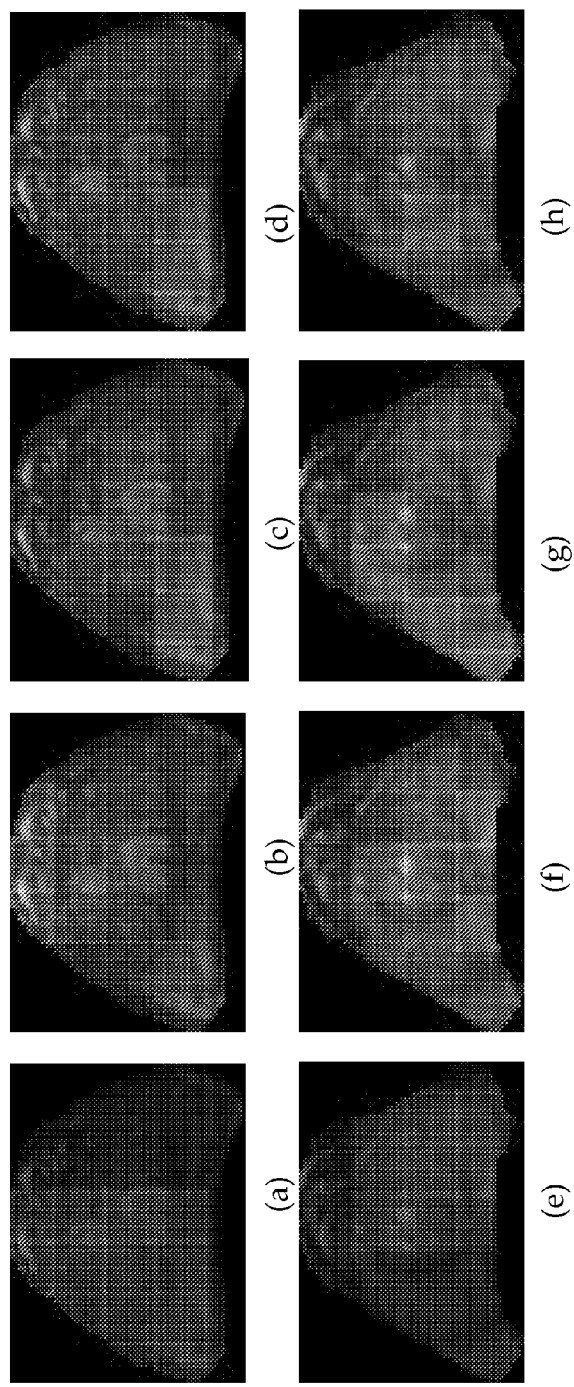
Figure # 17

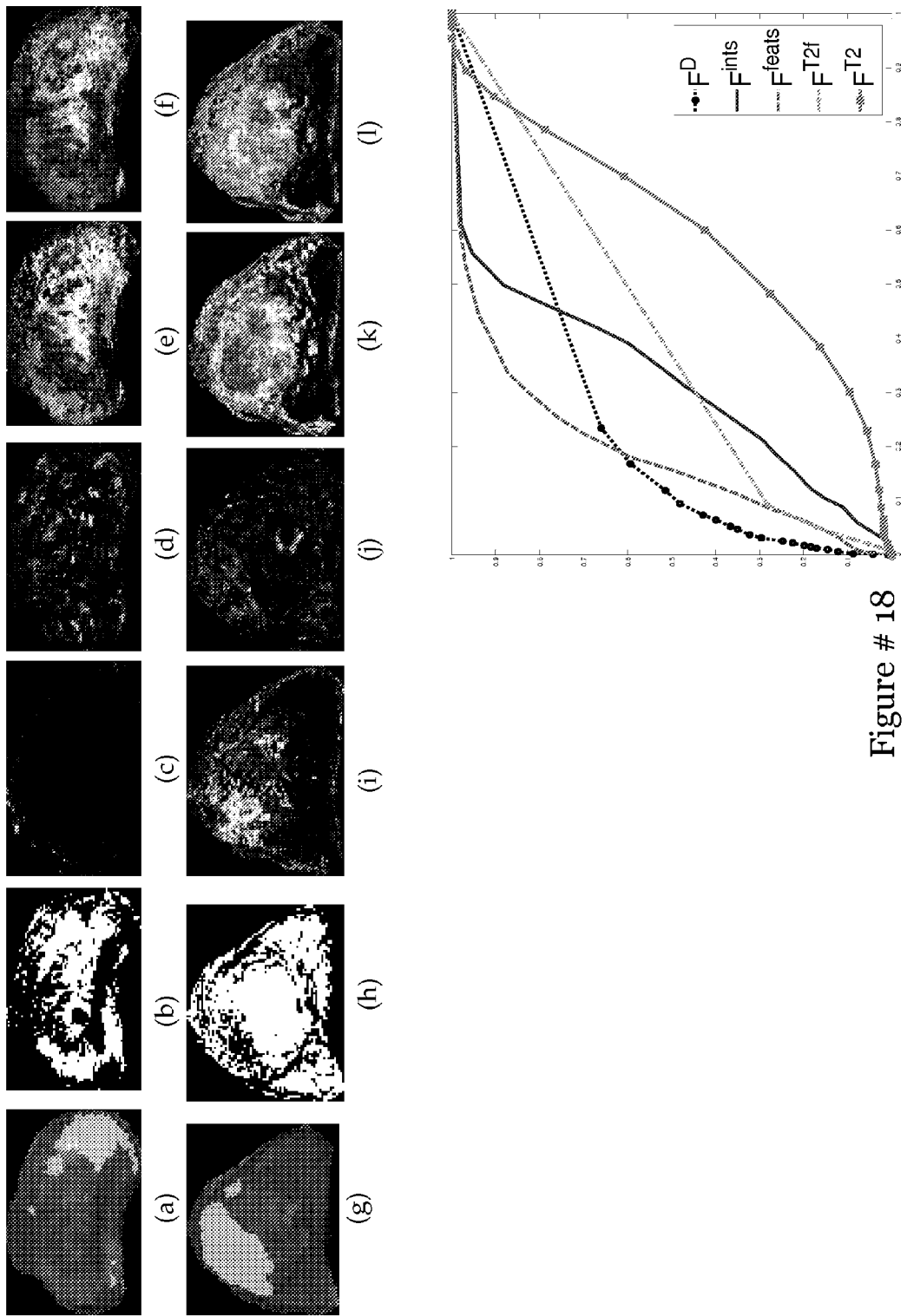
Figure # 18

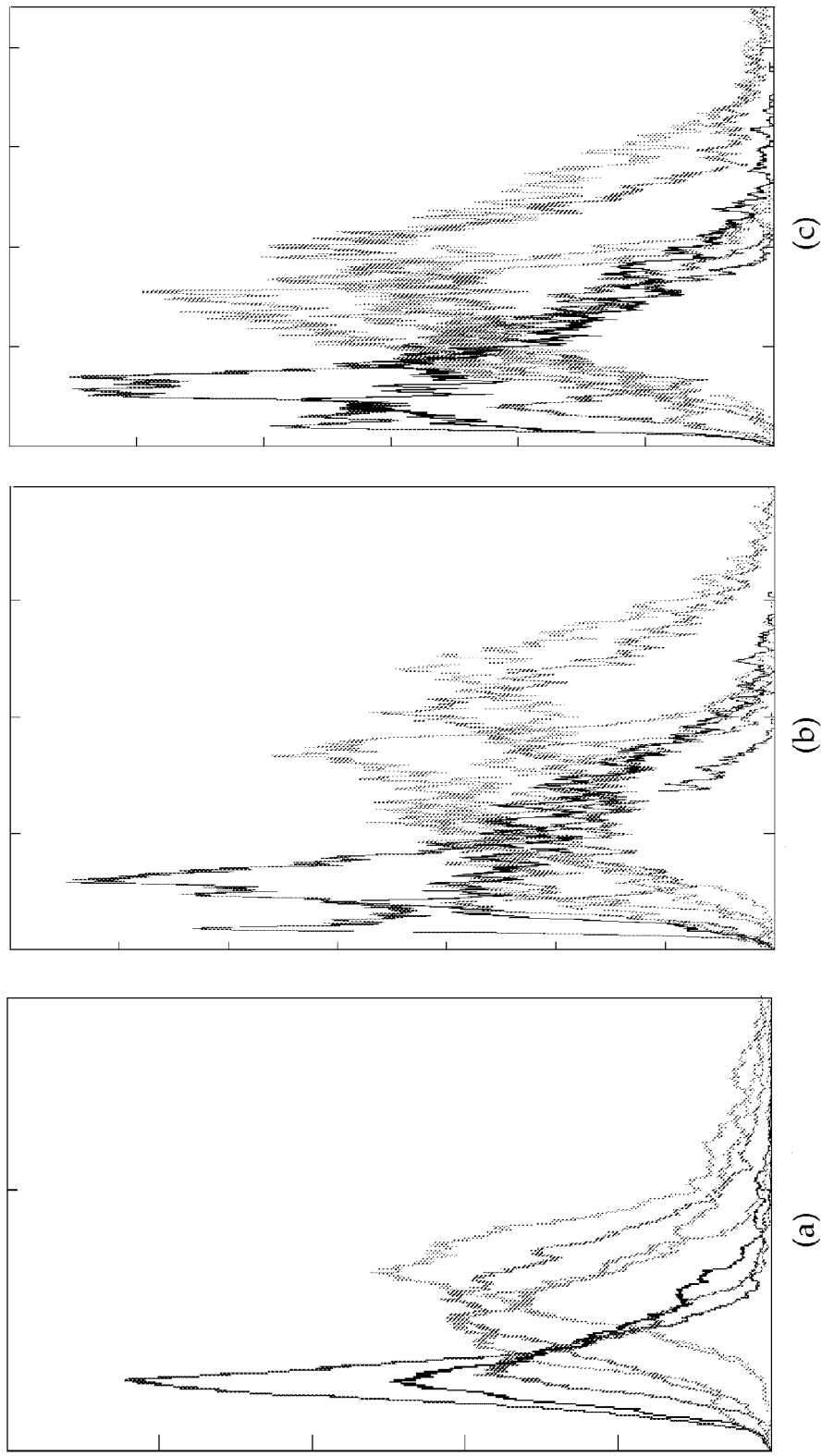
Figure # 19

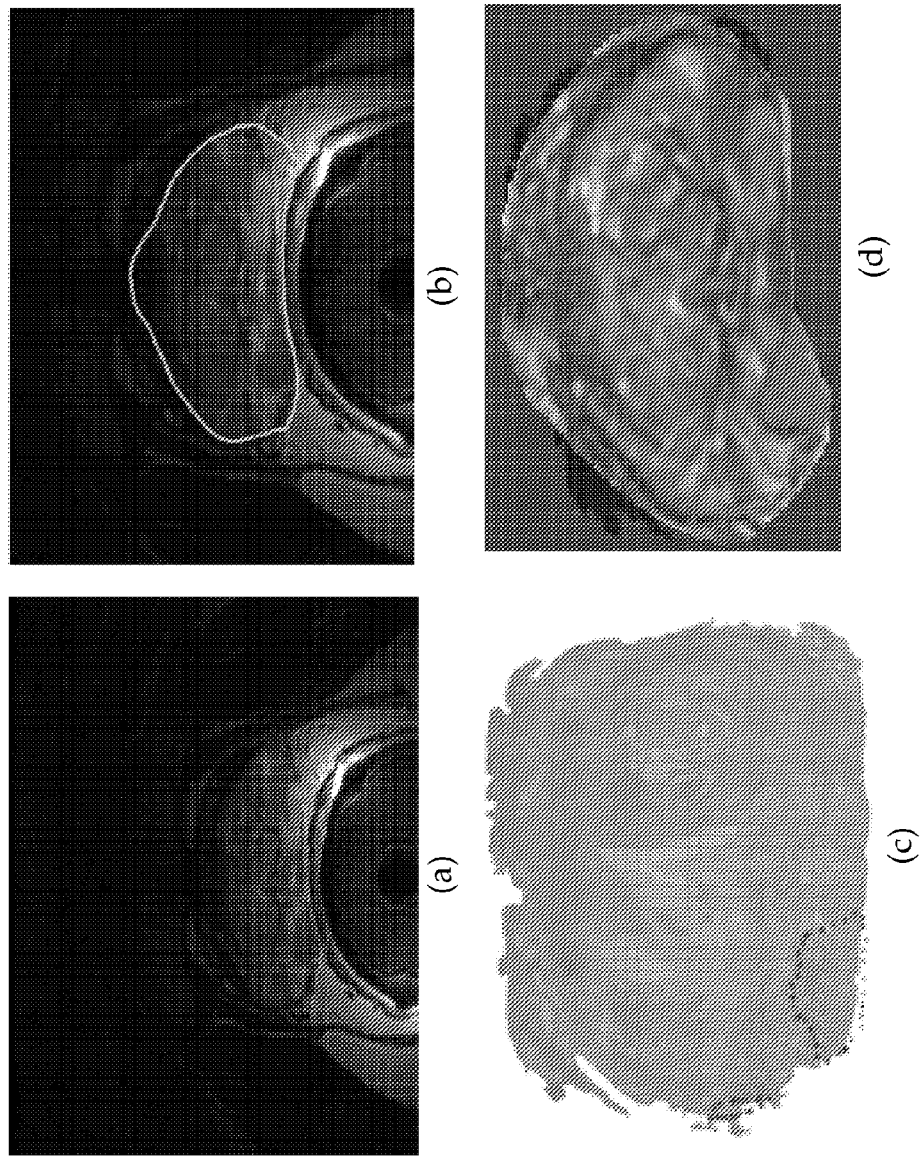
Figure # 20

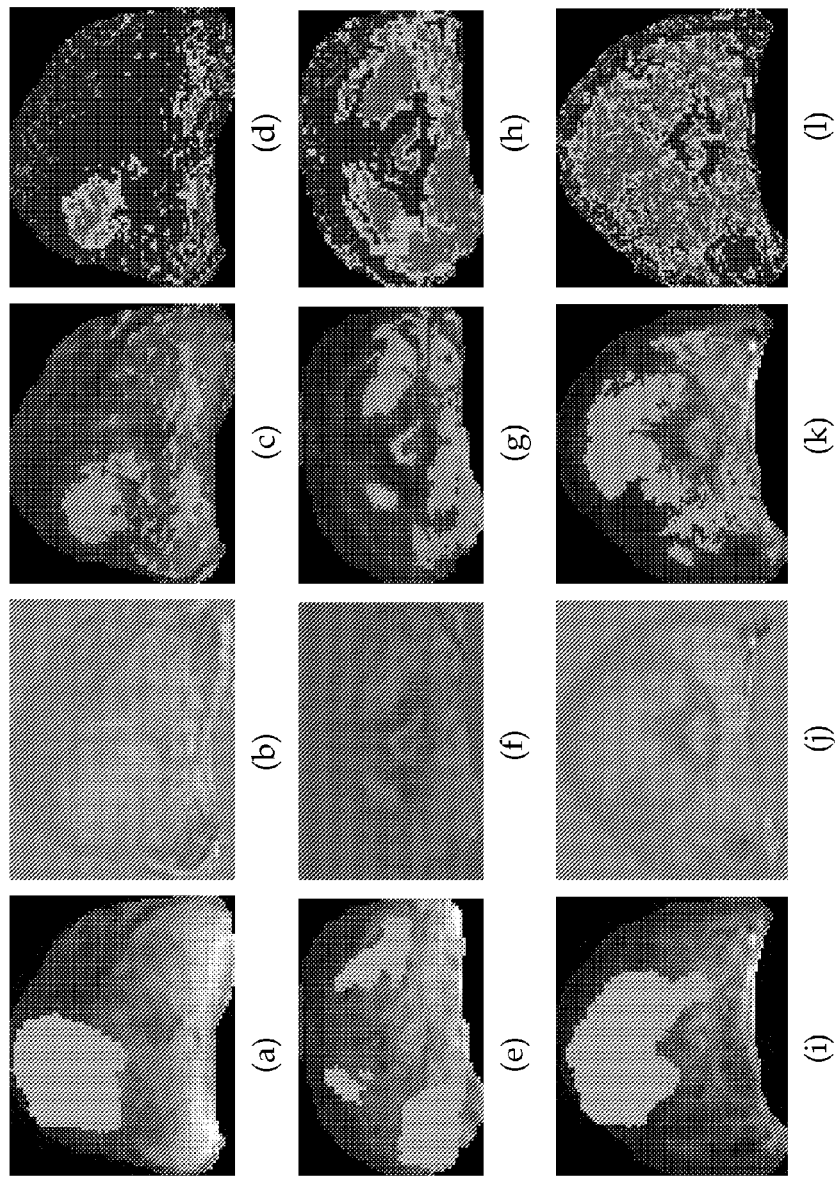
Figure # 21

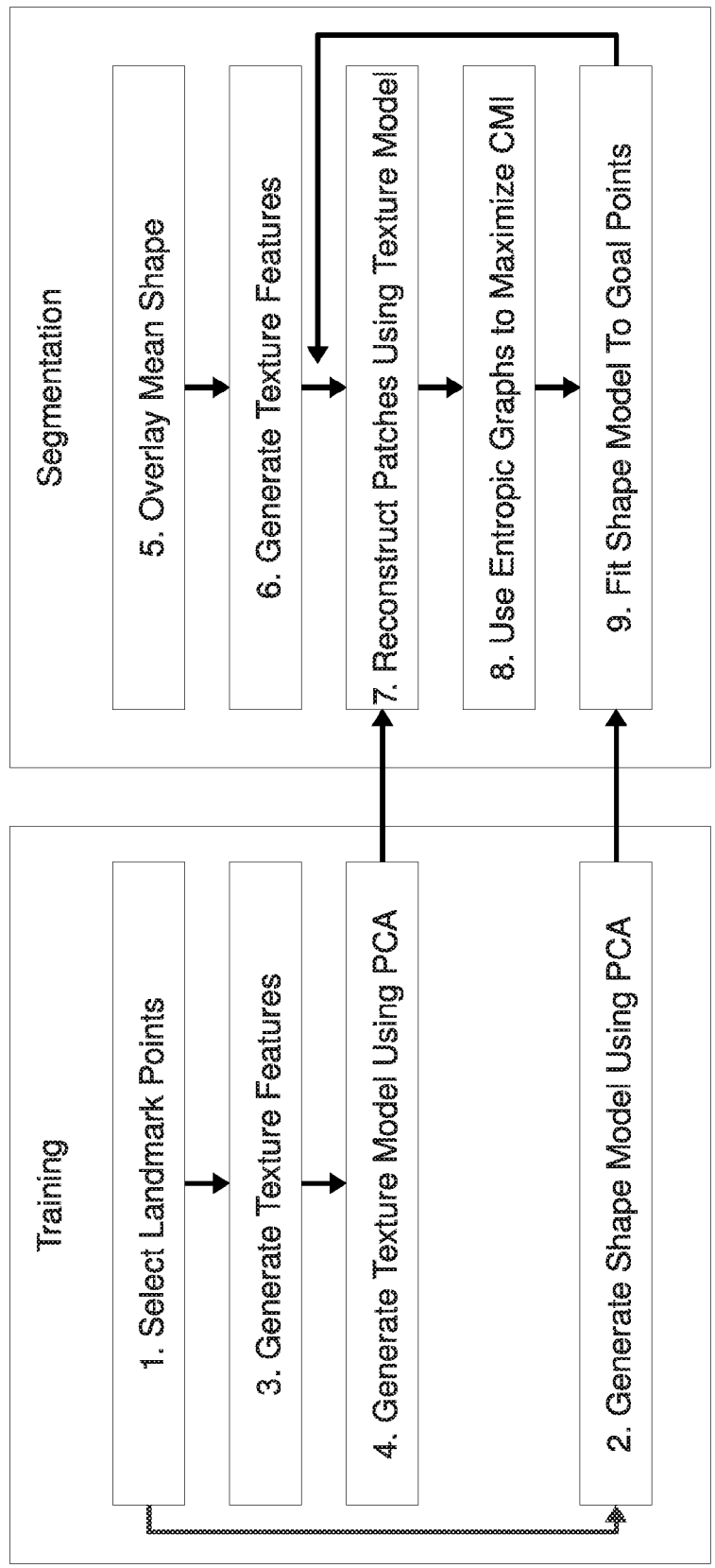
Figure # 22

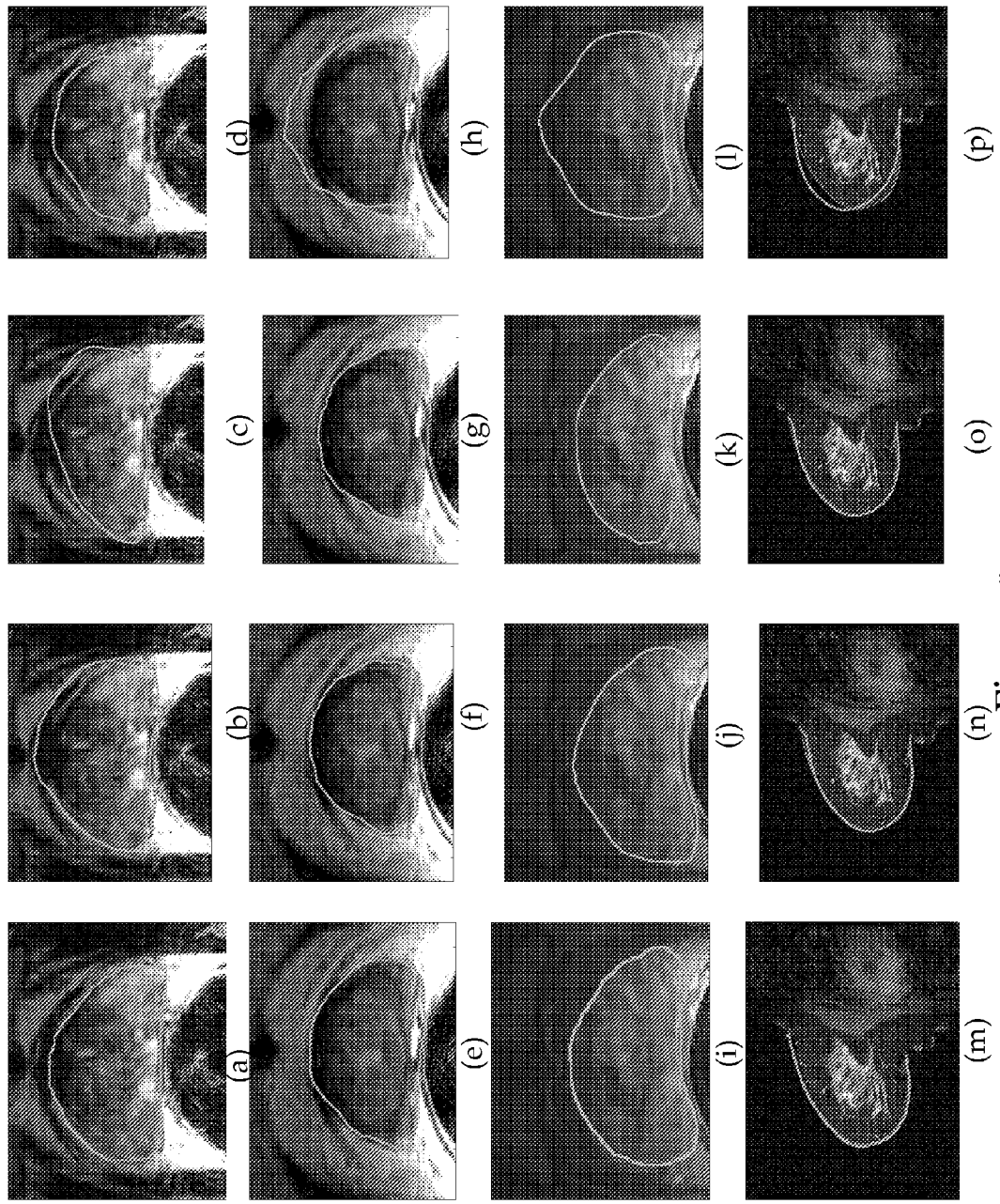
Figure # 23

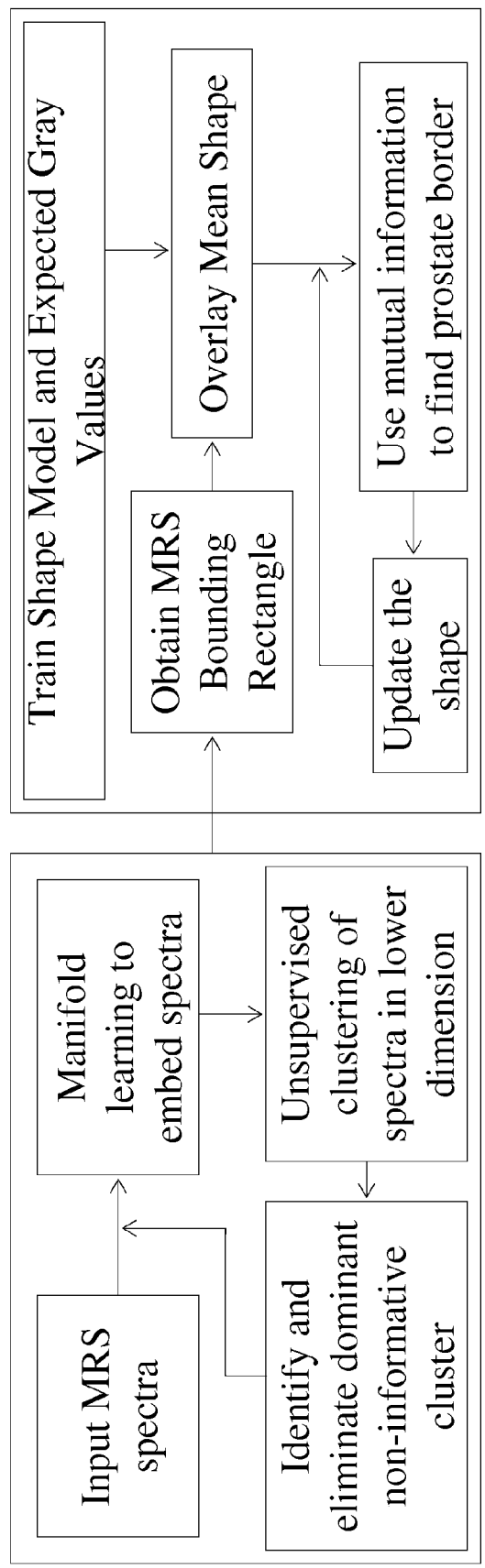
Figure # 24

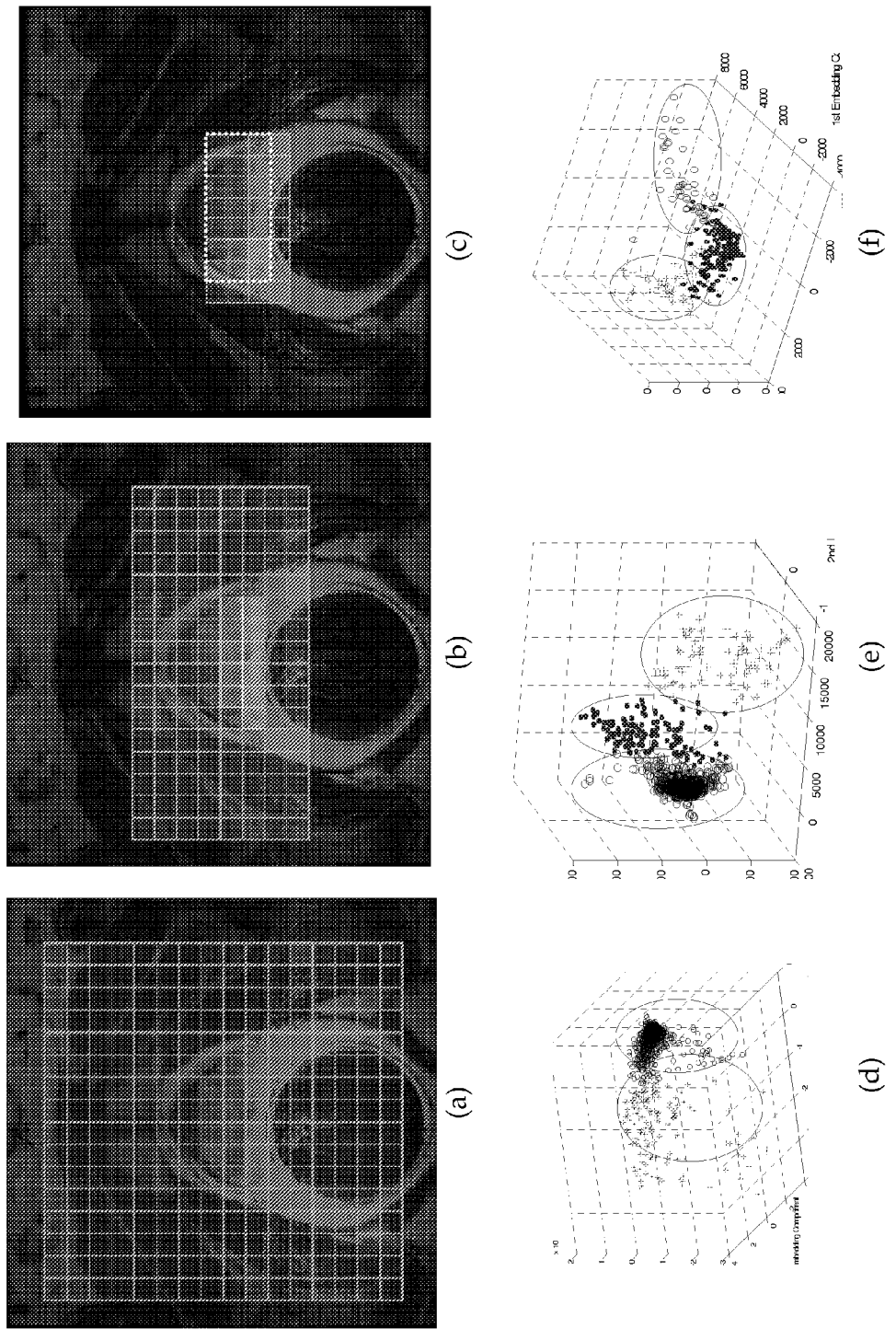
Figure # 25

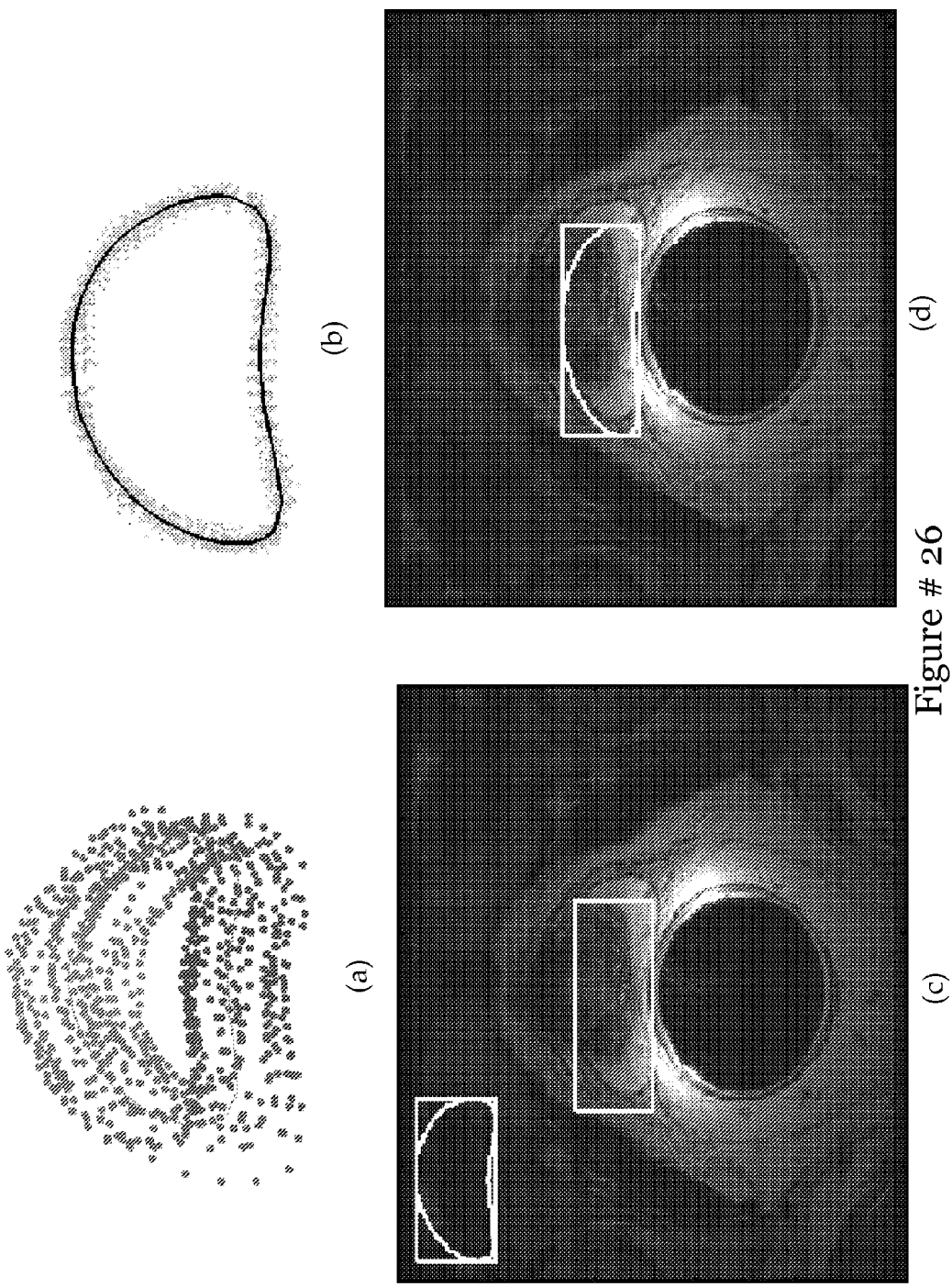
Figure # 26

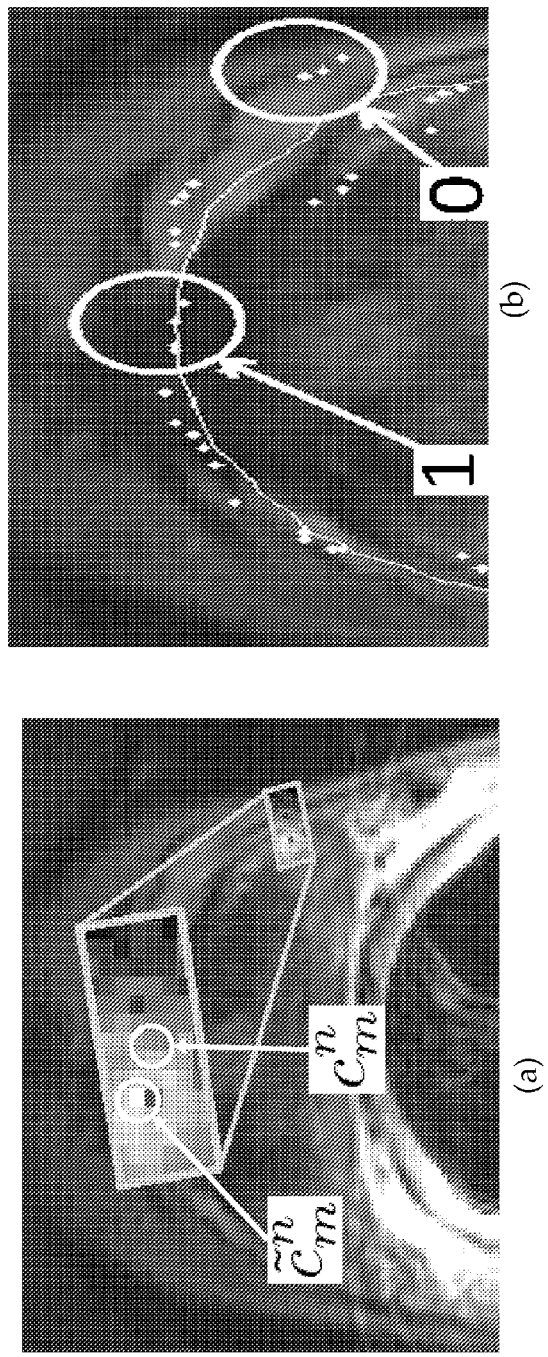
Figure # 27

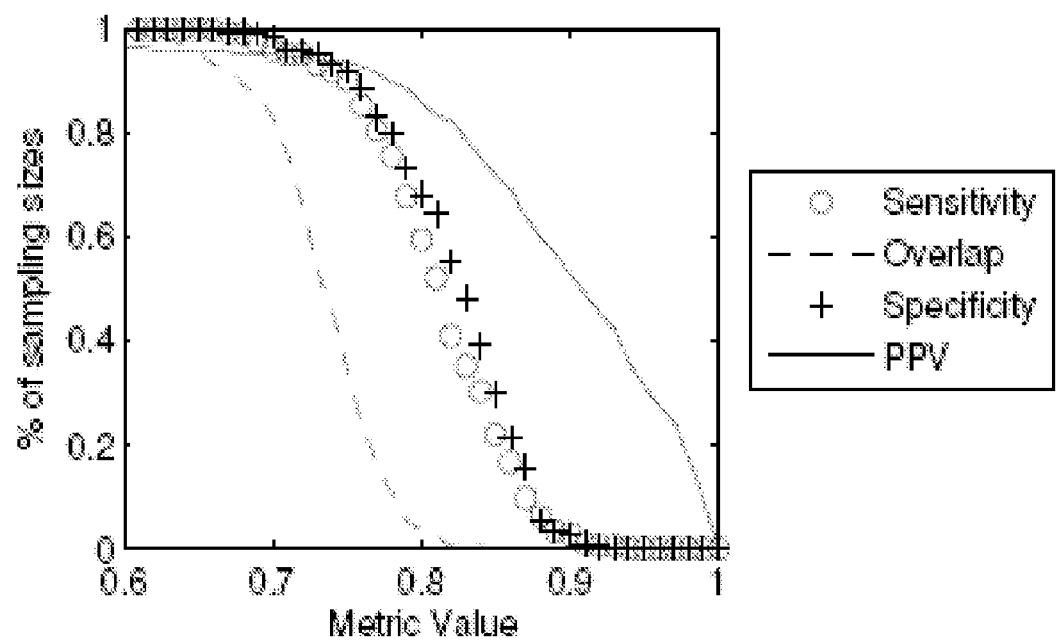
Figure # 28

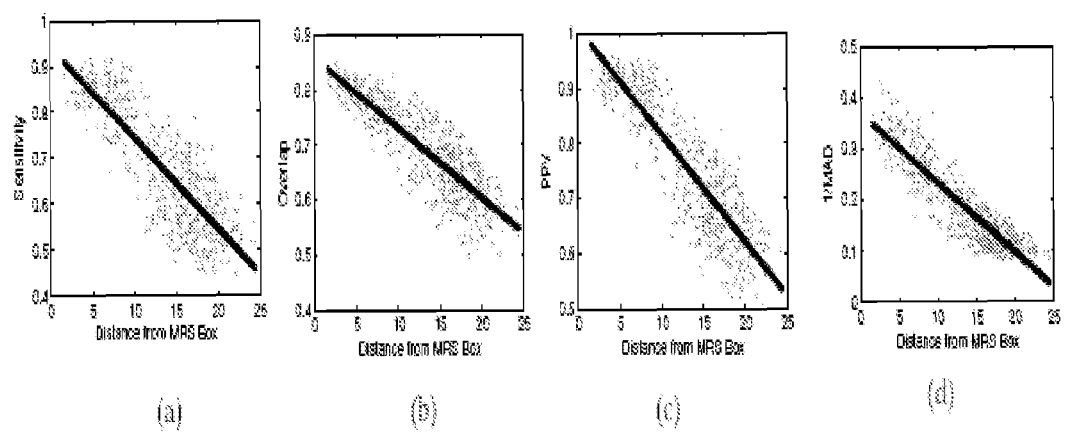
Figure # 29

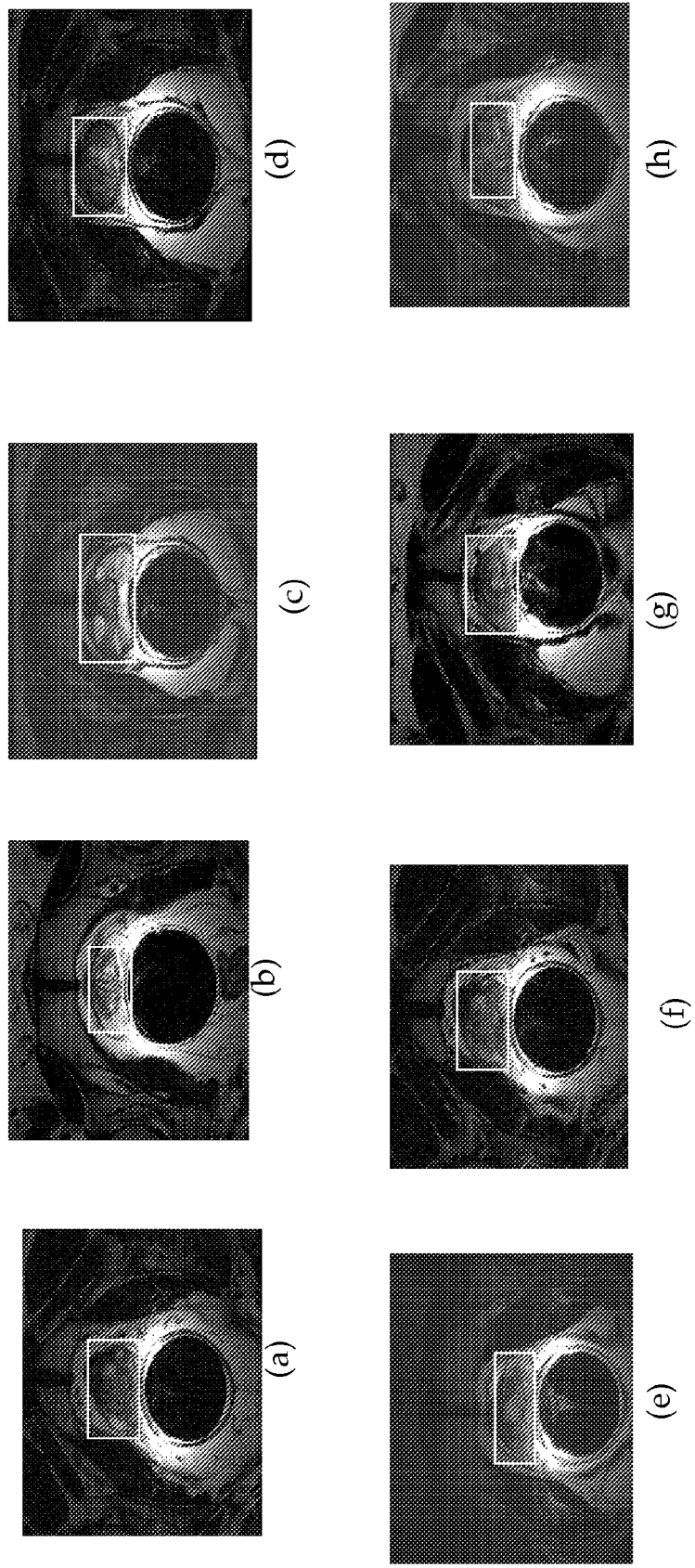
Figure # 30

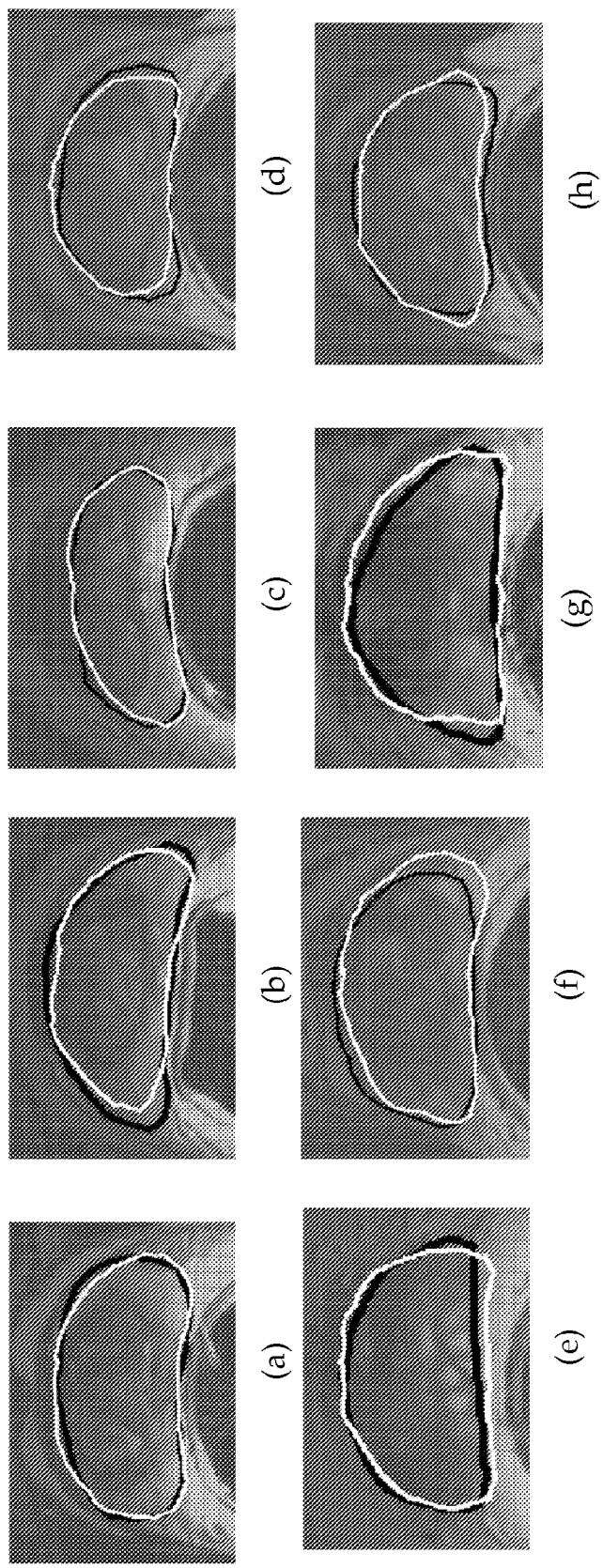
Figure # 31

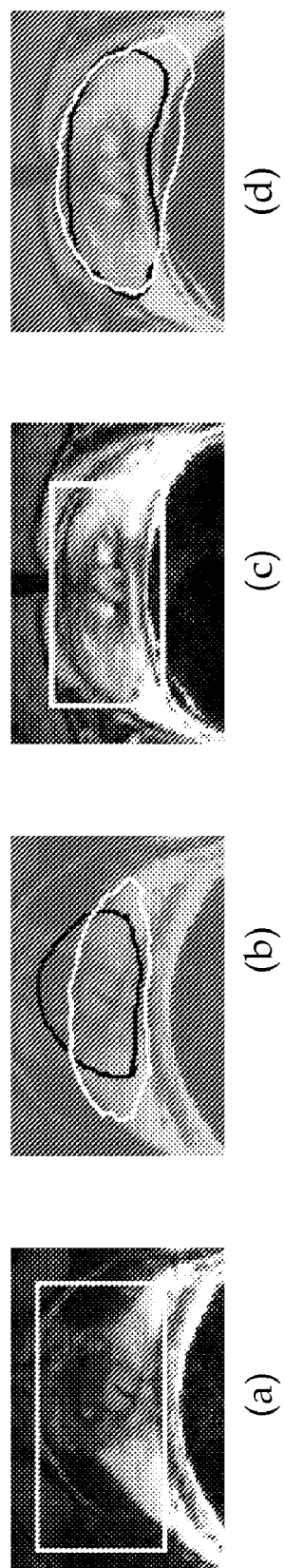
Figure # 32

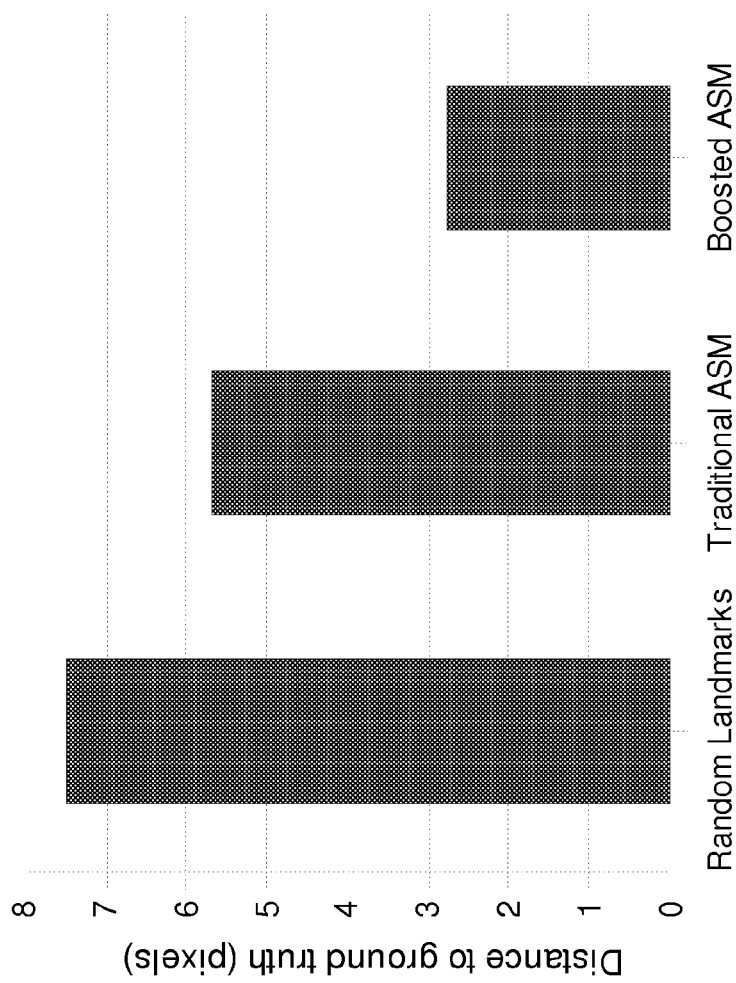
Figure # 33

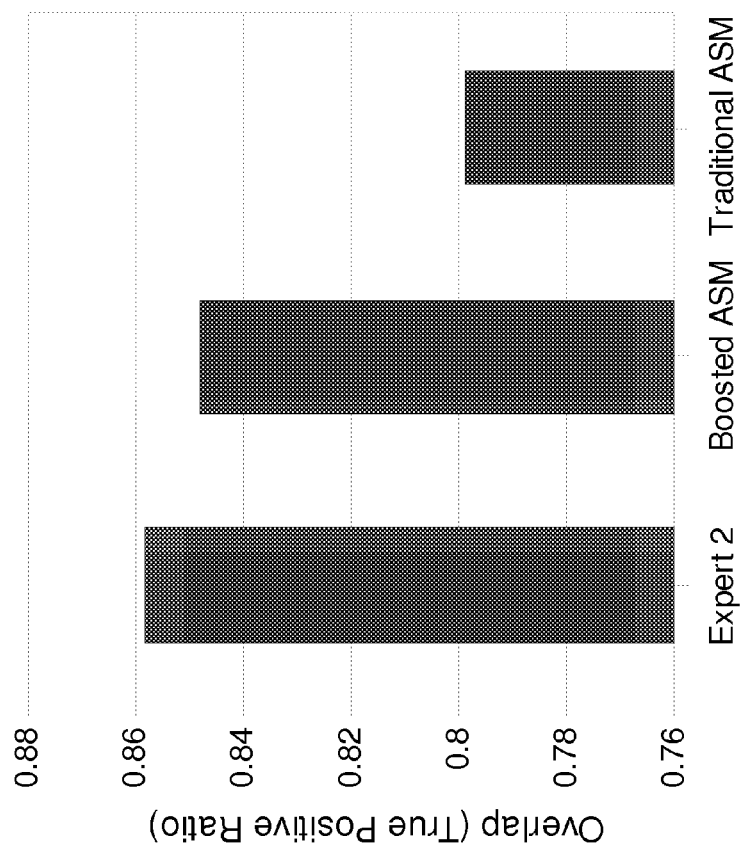
Figure # 34

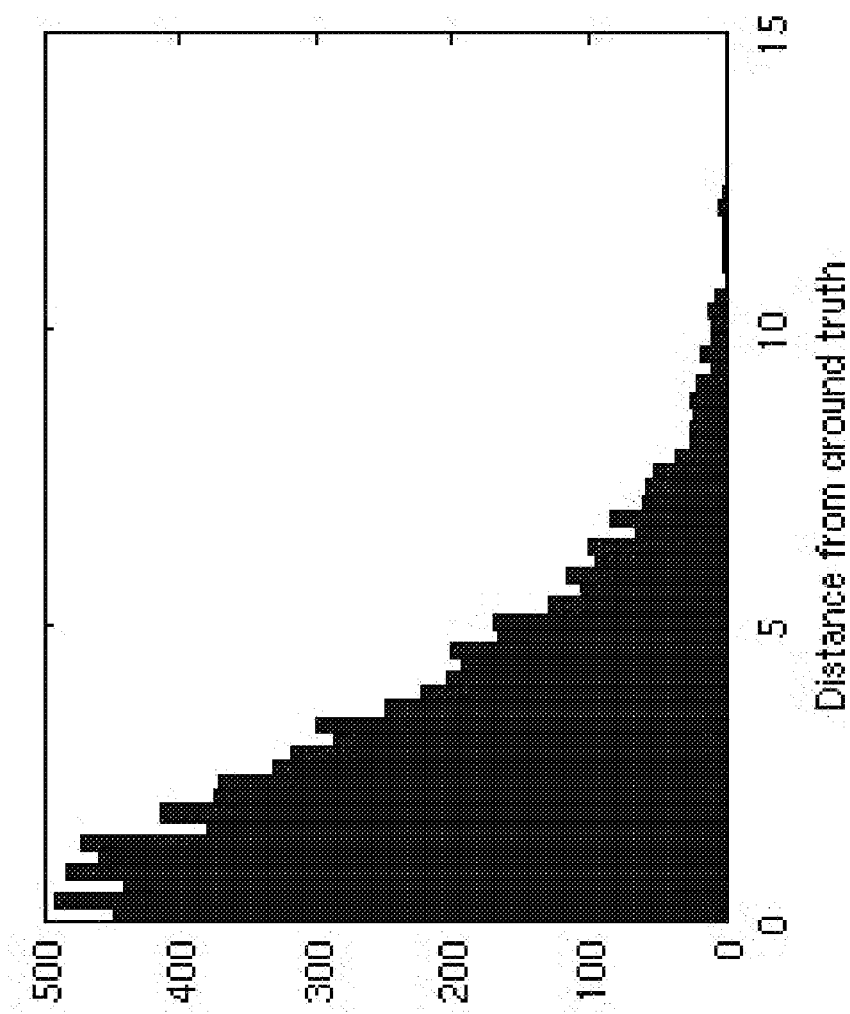
Figure # 35

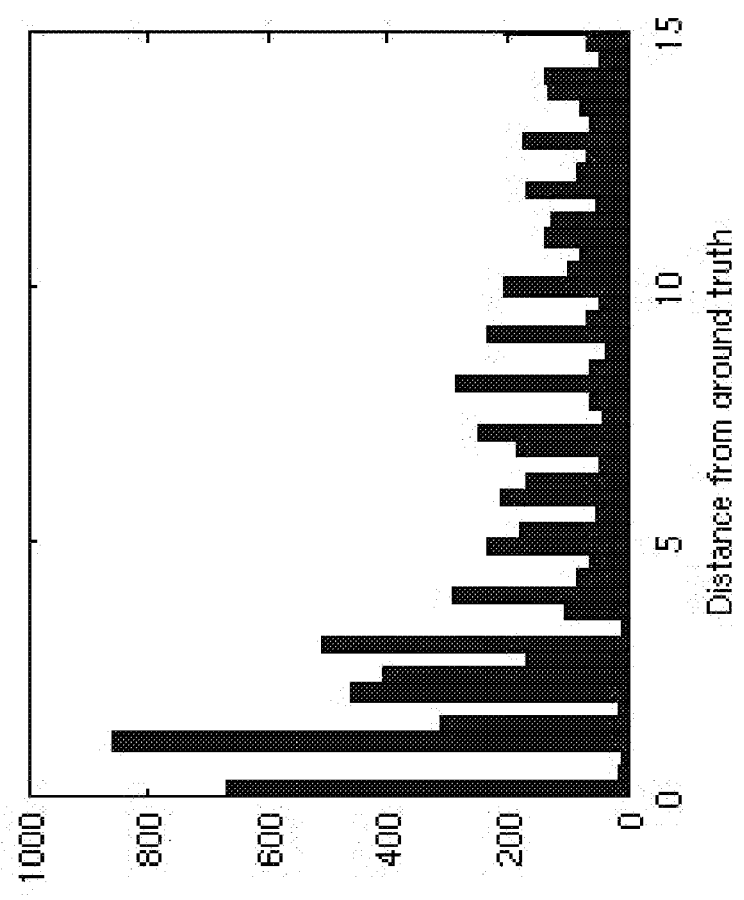
Figure # 36

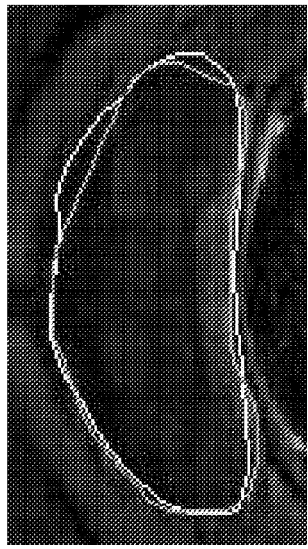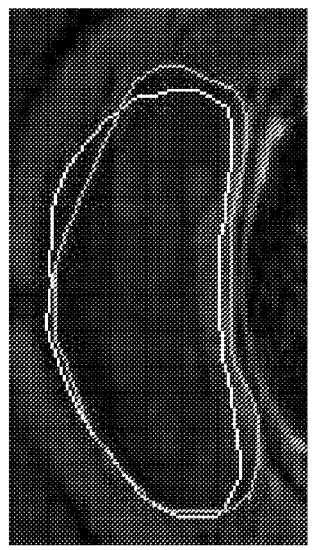
Figure # 37

COMPUTER ASSISTED DIAGNOSIS (CAD) OF CANCER USING MULTI-FUNCTIONAL, MULTI-MODAL IN-VIVO MAGNETIC RESONANCE SPECTROSCOPY (MRS) AND IMAGING (MRI)

This application is a 371 national phase application of PCT International Application No. PCT/US2008/081656 filed on Oct. 29, 2008 which claims priority from U.S. Provisional Application No. 60/983,553, filed Oct. 29, 2007. The contents of which are incorporated herein by reference.

FIELD OF INVENTION

This invention is directed to computer-assisted diagnostics and classification of cancer. Specifically, the invention is directed to in-vivo segmentation of MRI, cancer detection using multi-functional MRI (including T2-w, T1-w, Dynamic contrast enhanced, and Magnetic Resonance Spectroscopy (MRS); and their integration for a computer-aided diagnosis and classification of cancer such as prostate cancer.

BACKGROUND OF THE INVENTION

Prostatic adenocarcinoma (CAP) is the second leading cause of cancer related deaths in America, with an estimated 186,000 new cases every year (Source: American Cancer Society). Detection and surgical treatment of the early stages of tissue malignancy are usually curative. In contrast, diagnosis and treatment in late stages often have deadly results. Likewise, proper classification of the various stages of the cancer's progression is imperative for efficient and effective treatment. The current standard for detection of prostate cancer is transrectal ultrasound (TRUS) guided symmetrical needle biopsy which has a high false negative rate associated with it Over the past few years, Magnetic Resonance Spectroscopic Imaging (MRSI) has emerged as a useful complement to structural MR imaging for potential screening of prostate cancer Magnetic Resonance Spectroscopy (MRS) along with MRI has emerged as a promising tool in diagnosis and potentially screening for prostate cancer. The major problems in prostate cancer detection lie in lack of specificity that MRI alone has in detecting cancer locations and sampling errors associated with systemic biopsies. While MRI provides information about the structure of the gland, MRS provides metabolic functional information about the biochemical markers of the disease. These techniques offer a non-invasive alternative to trans-rectal ultrasound biopsy procedures.

In view of the above, there is a need in the field for a reliable method for increasing specificity and sensitivity in the detection and classification of prostate cancer.

SUMMARY OF THE INVENTION

In one embodiment, the invention provides an unsupervised method of identification of an organ cancer from a spectral dataset of magnetic resonance spectroscopy (MRS), comprising the steps of: embedding the spectral data of an initial two hundred and fifty-six dimensions in a low dimensional space; applying hierarchical unsupervised k-means clustering to distinguish a non-informative from an informative spectra in the embedded space; pruning objects in the dominant cluster, whereby pruned objects are eliminated from subsequent analysis; and identifying sub-clusters corresponding to cancer.

In another embodiment, the invention provides an unsupervised method of segmenting regions on an in-vivo tissue (T1-w or T2-w or DCE) MRI, comprising the steps of: obtaining a three-dimensional T1-w or T2-w or DCE MR dataset; correcting bias field inhomogeneity and non-linear MR intensity artifacts, thereby creating a corrected T1-w or T2-w MR scene; extracting image features from the T1-w or T2-w MR scene; embedding the extracted image features or inherent kinetic features or a combination thereof into a low dimensional space, thereby reducing the dimensionality of the image feature space; clustering the embedded space into a number of predetermined classes, wherein the clustering is achieved by partitioning the features in the embedded space to disjointed regions, thereby creating classes and therefore segmenting the embedded space.

In another embodiment, the invention provides a system for performing unsupervised classification of a prostate image dataset comprising the steps of: obtaining a magnetic resonance spectroscopy (MRS) dataset, said dataset defining a scene using MR spectral data, identifying cancer sub-clusters via use of spectral data; obtaining a T1-w or T2-w or DCE MR image scene of the said dataset; segmenting the MR image into cancer classes; integrating the magnetic resonance spectra dataset and the magnetic resonance imaging dataset (T1-w or T2-w or DCE), thereby redefining the scene; the system for analysis of the redefined scene comprising a module for identifying cancer sub-clusters from integrated spectral and image data; a manifold learning module; and a visualization module.

In one embodiment, the invention provides a method of auomatically segmenting a boundary on an T1-w or T2-w MRI image, comprising the steps of: obtaining a training MRI dataset; using expert selected landmarks on the training MRI data, obtaining a statistical shape model; using a feature extraction method on training MRI data, obtaining a statistical appearance model; using automated hierarchical spectral clustering of the embedded space to a predetermined class on a corresponding MRS dataset, obtaining region of interest (ROI); using the region of interest, the statistical shape model and statistical appearance model, initialize a segmentation method of the boundary on an MRI image, and hence automatically determine the boundary.

In one embodiment, the invention provides a method of unsupervised determination of pair-wise slice correspondences between a histology database and MRI via group-wise mutual information, comprising the steps of: obtaining a histology and an MRI dataset; automatically segmenting the boundary on a MRI image; correcting bias field inhomogeneity and non-linear MR intensity artifacts, thereby creating a corrected MR scene and pre-processing the segmented MRI data; extracting image features from the pre-processed MR scene; determining similarity metrics between the extracted image features of the MRI dataset and histology dataset to find optimal correspondences; whereby the MRI dataset is a T1-w or T2-w MRI volume and the histology database are whole mount histological sections (WMHS).

In one embodiment, the invention provides a method of supervised classification for automated cancer detection using Magnetic Resonance Spectroscopy (MRS), comprising the steps of: obtaining a multimodal dataset comprising MRI images, MRS spectra and a histology database, automatically segmenting the boundary on an MRI image; correcting bias field inhomogeneity and non-linear MR intensity artifacts, thereby creating a corrected MR scene and pre-processing the segmented MRI data; determining pair-wise slice correspondences between the histology dataset and the corrected pre-processed MR image; rigidly or non-rigidly registering the determined correspondences of WMHS and MRI slices to obtain cancerous and non-cancerous regions on MRI; using data manipulation methods, pre-processing the MRS data; from corresponding MRI and histology regions obtained in the step of registering the correspondence of whole mount histological sections (WMHS) and MRI slices determining cancer and normal MRS spectra; determining similarities between input test spectra with cancer and normal spectra, and classifying MRS data as cancerous or normal; whereby the MRI image, MRS spectra and histology database is T1-w or T2-w MRI volume, MRS volume, whole mount histological sections (WMHS) data respectively.

In one embodiment, the invention provides a method of classification for automated prostate cancer detection using T2-weighted Magnetic Resonance Imaging (T2-w MRI) comprising the steps of: obtaining a multimodal dataset comprising MRI image, histology database; automatically segmenting the prostate boundary on an MRI image; correcting bias field inhomogeneity and non-linear MR intensity artifacts, thereby creating a corrected MR scene and pre-processing the segmented MRI data; determining pair-wise slice correspondences between the histology dataset and the corrected pre-processed MR image; rigidly or non-rigidly registering the correspondence of WMHS and MRI slices to obtain cancerous and non-cancerous regions on MRI; extracting image features from the pre-processed MR scene; analyzing feature representations of MRI dataset; and classifying the MRI data with training data obtained in the step of registration as cancerous or normal; whereby the MRI image and histology database is T2-w MRI volume and whole mount histological sections (WMHS) data respectively.

In one embodiment, the invention provides a method of supervised classification for automated prostate cancer detection using Dynamic Contrast Enhanced Magnetic Resonance Imaging (DCE MRI), comprising the steps of: obtaining a DCE MRI multi-time point volume dataset; and WMHS dataset; automatically segmenting the prostate boundary on an MRI image; correcting bias field inhomogeneity and non-linear MR intensity artifacts, thereby creating a corrected MR scene and pre-processing the segmented MRI data; determining pair-wise slice correspondences between the histology dataset and the corrected pre-processed MR image; rigidly or non-rigidly registering the determined correspondences of WMHS and MRI slices to obtain cancerous and non-cancerous regions on MRI; extracting image features from the pre-processed MR scene; analyzing feature representations of MRI dataset; and classifying the MRI data with training data obtained in the step of registration as cancerous or normal; whereby the MRI image and histology database is DCE MRI multi-time point volume and whole mount histological sections (WMHS) data respectively.

In one embodiment, the invention provides a method of supervised classification for automated cancer detection using integration of MRS and MRI, comprising the steps of: obtaining a multimodal dataset comprising MRI image, MRS spectra and histology database; automatically segmenting the prostate boundary on an MRI image; correcting bias field inhomogeneity and non-linear MR intensity artifacts, thereby creating a corrected MR scene and pre-processing the segmented MRI data; determining pair-wise slice correspondences between the histology dataset and the corrected pre-processed MRI; rigidly or non-rigidly registering the determined correspondences of WMHS and MRI slices to obtain cancerous and non-cancerous regions on MRI; processing the MRS dataset; determining similarities between input MRS test spectra with cancer and normal MRS spectra; extracting image or inherent kinetic features from the pre-processed MR scene; analyzing feature representations of MRI dataset; and classifying the sets of extracted spectral similarities and image feature representation data with training data obtained in the step of registration to classify MR data as cancerous or normal; whereby the MRI image, MRS spectra and histology database is T1-w or T2-w or DCE MRI volume, MRS volume, whole mount histological sections (WMHS) data respectively.

In one embodiment, the invention provides a method of supervised classification for automated prostate cancer detection using integration of DCE MRI and T2-w MRI, comprising the steps of: obtaining a multimodal dataset comprising DCE MRI image, T2-w MRI image and histology database; automatically segmenting the prostate boundary on (DCE and T2-w) MRI images; correcting bias field inhomogeneity and non-linear MR intensity artifacts, thereby creating corrected (DCE and T2-w) MR scenes and pre-processing the segmented (DCE and T2-w) MRI data; determining pair-wise slice correspondences between the histology dataset and the corrected pre-processed (DCE and T2-w) MR images; rigidly or non-rigidly registering the determined correspondences of WMHS and MRI slices to obtain cancerous and non-cancerous regions on (DCE and T2-w) MRI; extracting image features or inherent kinetic features from the pre-processed (DCE and T2-w) MR scenes; analyzing feature representations of (DCE and T2-w) MRI datasets; and classifying the sets of extracted image features and feature representation data from (DCE and T2-w) MR data with training data obtained in the step of registration to classify MR data as cancerous or normal; whereby the DCE MRI image, T2-w MRI image and histology database is DCE multi-time point volume, T2-w MRI volume and whole mount histological sections (WMHS) data respectively.

In one embodiment, the invention provides a method of supervised classification for automated prostate cancer detection using integration of MRS, DCE MRI and T2-w MRI, comprising the steps of: obtaining a multimodal dataset comprising (DCE and T2-w) MRI images, MRS spectra and histology database; automatically segmenting the prostate boundary on an MRI image; correcting bias field inhomogeneity and non-linear MR intensity artifacts, thereby creating a corrected MR scene and pre-processing the segmented MRI data; determining pair-wise slice correspondences between the histology dataset and the corrected pre-processed MR image; rigidly or non-rigidly registering the determined correspondences of WMHS and MRI slices to obtain cancerous and non-cancerous regions on MRI and so also determining cancer and normal MRS spectra; pre-processing the MRS dataset; determining similarities between input MRS test spectra and cancer and normal MRS spectra; extracting image features from the pre-processed (DCE and T2-w) MR scenes; analyzing the image feature representations of MRI dataset; and classifying the sets of spectral similarities, extracted image features representation data with training data obtained in the step of registration to classify multimodal MR data in combination or as individual modalities as cancerous or normal; whereby the multimodal dataset is MRS volume, T2-w MRI volume, DCE multi-time point MRI volume, and the histology database is whole mount histological sections (WMHS) data.

In one embodiment, the invention provides a method of supervised classification for automated detection of different grades of prostate cancer using mutimodal datasets comprising the steps of: obtaining a multimodal dataset comprising (DCE and T2-w) MRI images, MRS spectra and histology database; automatically segmenting the prostate boundary on MRI images; correcting bias field inhomogeneity and non-linear MR intensity artifacts, thereby creating a corrected MR scene and pre-processing the segmented MRI data; determining pair-wise slice correspondences between the histology dataset and the corrected pre-processed MR image; rigidly or non-rigidly registering the correspondence of WMHS and MRI slices determined in to obtain regions of different Gleason grades on MRI; processing the MRS dataset; determining the MRS spectra corresponding to different Gleason grade MRI regions obtained in the step of registration; determining similarities between input test spectra with different Gleason grade MRS spectra obtained in the step of correspondences; extracting image features or inherent kinetic features from the pre-processed (DCE and T2-w) MR scenes; analyzing the image feature representations of (DCE and T2-w) MRI datasets; and classifying the sets of spectral similarities and extracted image feature representation data with training data obtained in the step of registration to classify individual modalities of MR data or a combination thereof into different grades of cancer; whereby the multimodal dataset is MRS volume, T2-w MRI volume, DCE multi-time point MRI volume, and the histology database is whole mount histological sections (WMHS) data.

Other features and advantages of the present invention will become apparent from the following detailed description examples and figures. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The application contains at least one drawing executed in color. Copies of this patent or patent application publication with color drawings will be provided by the Office upon request and payment of the necessary fee.

The invention will be better understood from a reading of the following detailed description taken in conjunction with the drawings in which like reference designators are used to designate like elements, and in which:

FIG. 1 shows a flowchart for segmentation algorithm, with the MRS module shown on the left and the ASM module shown on the right;

FIG. 2 shows (a) Slice of T2 weighted MR image with overlay of MRS grid (G), (b) Individual MRS spectra acquired from each u∈G, and (c) a single 256 dimensional MRS spectra (g(u)). Note that the prostate is normally contained in a 3×6 or a 3×7 grid which varies in different studies based on the prostate size. Radiologists look at relative peak heights of creatine, choline and citrate within g(u) to identify possible cancer presence;

FIG. 3 shows spectral grids for a single slice within $C^S$ are shown superimposed on T2 for (a) $\tilde{G}_0$, (b) $\tilde{G}_1$, (c) $\tilde{G}_2$, and (d) $\tilde{G}_3$. Note that the size of the grid reduces from 16×16 (a) to 6×3 (d) by elimination of non-informative spectra on the 16×16 grid on T2. In 3 (d) cancer class could clearly be discerned as the blue class, since the cancer is located in the right MG slice. Note that the right/left conventions in radiology are reversed;

FIG. 4 shows (a)-(c) represents the potential cancer locations in blue. FIGS. 4(d)-(f) shows classification results for 3 different studies with the cancer voxels shown in blue, while FIGS. 4(g)-(i) shows the z-score results. Note that for the last study in 4(f), the method has 100% sensitivity with just 2 FP voxels;

FIG. 5 is a flowchart showing different system components and overall organization;

FIG. 6(a)-(f) are example images illustrating CaP detection results on a prostate MRS study.

FIG. 6(g)-(i) are example graphs of spectra for the coprresponding detection results of FIGS. 6(a)-(f).

FIG. 7 is a flowchart illustrating the main steps of an exemplary method;

FIGS. 8(a)-(c) are examples of intensity histograms corresponding to exemplary MR images;

FIGS. 8(d)-(f) are exemplary images of MR slices after some pre-processed steps have been applied to exemplary MR slices;

FIG. 9(a) is an exemplary MR image;

FIGS. 9(b)-(d) are exemplary images upon applying gradient operations to the MR image shown in FIG. 9(a);

FIG. 10 shows (a), (e) and (i) showing corrected and standardized slices from c; (b), (f) and (j) showing RGB reconstruction of these slices with every c∈c represented by its most dominant eigenvalues from X(c); (c),(g) and (k) 3D plots of $V^1, V^2, V^3$ with each label represented with a different colour; (d),(h) and (l) labels from final clusterings $V^1, V^2, V^3$ plotted back onto the slice coloured as red, green and blue. When comparing voxel counts of these clusterings with those calculated from the "potential cancer space", the red labels are found to represent the cancer class in each case;

FIGS. 11(a)-(i) are exemplary images illustrating results of an exemplary algorithm applied on 1.5T prostate MRI studies;

FIG. 12(a) is an exemplary MR image with overlaid MRS grid;

FIG. 12(b) illustrates MRS spectra curves corresponding to FIG. 12(a) grids;

FIG. 12(c) are exemplary spectra curves;

FIG. 13 is a flow diagram of an exemplary method comprising four main modules; MRS feature extraction, MRI feature extraction, integration of MRI and MRS, and classification of integrated MRS and MRI spaces via consensus clustering;

FIG. 14(a) is an exemplary MRI section;

FIGS. 14(b)-(d) are exemplary images after gradient operators are applied on FIG. 14(a);

FIG. 15 shows how many different sampling sizes (y axis) achieved a certain metric value (x axis).

FIG. 16(a)-(h) are exemplary images of MR data after an exemplary scheme and graph embedding (GE) and non-linear dimensionality reduction (NLDR) methods are applied;

FIG. 17 shows (a)-(h) show the 8 different initialization bounding boxes obtained from the MRS data in white, overlaid on the original MR images. Note that in each case the bounding box contains the prostate;

FIGS. 18(a)-18(l) exemplary images that are useful for describing sample classification;

FIG. 18(m) illustrates the best Receiver-Operating Characteristic (ROC) curves;

FIGS. 19(a)-(c) are illustrative image intensity histograms for non-lesion areas;

FIG. 20(a) is an exemplary MR image;

FIGS. 20(b)-(d) are corresponding exemplary images after exemplary segmentation schemes are applied to the MR image of FIG. 20(a);

FIG. 21 shows that $X_3(d)$ recognizes the classes seen in $X_1(d)$ & $X_2(d)$ as belonging to 2 possible classes separate from the non-cancer class;

FIG. 22 is an exemplary flow diagram of multi-attribute, non-itializing texture reduction active shape model (MANTRA) with distinct training and segmentation;

FIG. 23 shows ROC curves when using different feature sets for classification. Note the improved ROC with $F^{feats}$;

FIG. 24 shows the modules and pathways comprising MANTRA, with the training module on the left and the testing module on the right;

FIGS. 25(a)-(c) are exemplary T2 MR images with MRS superimposed MRS grid;

FIGS. 25(d)-(f) are 3D exemplary plots with clustered features of the images shown in FIGS. 25(a)-(c);

FIGS. 26(a)-(d) are images useful for describing training landmark points before and after alignment;

FIGS. 27(a) and (b) are exemplary MR images showing outlier weights;

FIG. 28 is an example graph showing a relationship between the percentage of sampling sizes and metric value;

FIG. 29 shows Cartesian coordinates $c_i^k$ are weighted based on the $\alpha$ values, so that the new set of landmark points are given as $X^{new} = \{d_i | i \in \{1, \ldots, M\}\}$ where $d_i = [\Sigma_k(c_i^k \cdot \alpha_i^k)]/[\Sigma k\, (\alpha_i^k)]$;

FIG. 30 shows a Bar chart of the mean distance from the ground truth choosing a random set of landmarks, the traditional method of minimizing the intensities' Mahalanobis distance, and the proposed Adaboost method;

FIG. 31 shows Bar chart of the overlap of the complete segmentation system for the boosted ASM vs. the traditional ASM. In addition, a second expert's segmentations are used to demonstrate the difficulty of the task at hand;

FIGS. 32 (a)-(d) are images useful for describing landmark detection text results;

FIG. 33 is an exemplary histogram showing relationships between the Random Landmarks, Traditional ASM and boosted ASM;

FIG. 34 is an exemplary histogram showing the relationships between the expert 2, Boosted ASM and Traditional ASM;

FIG. 35 shows the relationship between MRS metavoxels and MRI voxels. The spectral grid $\hat{C}$ comprised of $\hat{c} \in 8$ metavoxels has been overlaid on an MR slice and is shown in white. Note the region outlined in red on $\hat{C}$ corresponds to the area occupied by a metavoxel $\hat{c} \in \hat{C}$, but will contain multiple MRI voxels $c \in C$ (highlighted in red);

FIG. 36 is a flowchart showing different system components and overall organization;

FIG. 37 shows (a) A 2D section from c, and corresponding 2D sections from feature scenes $\mathcal{F}_u$ for, (b) Gabor $$\left(\phi = \frac{\pi}{3}, \lambda = -1, \kappa = 5\right)$$

(c) first order statistical (range, $\kappa=3$), and (d) second order statistical (Haralick energy, $\kappa=3$, G=64, d=1);

DETAILED DESCRIPTION OF THE INVENTION

This invention relates in one embodiment to computer-assisted diagnostics and classification of prostate cancer. In another embodiment, the invention relates to segmentation of the prostate boundary on MRI images, cancer detection using multimodal multi-protocol MR data; and their integration for a computer-aided diagnosis and classification system for prostate cancer.

In another embodiment, the integration of MRS and MRI improves specificity and sensitivity for screening of cancer, such as CaP, compared to what might be obtainable from MRI or MRS alone.

In one embodiment, comparatively quantitative integration of heterogeneous modalities such as MRS and MRI involves combining physically disparate sources such as image intensities and spectra and is therefore a challenging problem. In another embodiment, a multimodal MR scene c, where for every location c, a spectral and image information is obtained. Let S(c) denote the spectral MRS feature vector at every location c and let f(c) denote the associated intensity value for this location on the corresponding MRI image. Building a meta-classifier for CaP detection by concatenating S(c) and f(c) together at location c is not a proper solution since (i) the different dimensionalities of S(c) and f(c) and (ii) the difference in physical meaning of S(c) and f(c). To improve discriminability between CaP and benign regions in prostate MRI a large number of texture features is extracted in one embodiment from the MRI image. This feature space will form a texture feature vector F(c) at every location c. In another embodiment. the spectral vector S(c) and texture feature vector F(c) will each form a high dimensional feature space at every location c in a given multimodal scene C. In another embodiment, the disparate sources of information may be combined in an embedding space, divorced from their original physical meaning.

Accordingly, in one embodiment, provided herein is a method of identification of an organ cancer from a spectral dataset of magnetic resonance spectroscopy (MRS), comprising the steps of: embedding the spectral data in two hundred and fifty-six dimensional space into a lower dimensional space; applying hierarchical unsupervised k-means clustering to distinguish a non-informative from an informative spectra in the embedded space; pruning objects in the dominant cluster, whereby pruned objects are eliminated from subsequent analysis; and identifying sub-clusters corresponding to cancer.

In another embodiment, provided herein is a method of segmenting regions on an in-vivo tissue MRI, comprising the steps of: obtaining a two-dimensional (T1-w or T2-w or DCE) MR image; correcting bias field inhomogeneity and non-linear MR intensity artifacts, thereby creating a corrected MR scene; extracting an image feature or inherent kinetic features or a combination thereof from the MR scene; embedding the extracted image feature into a low dimensional space, thereby reducing the dimensionality of the extracted image feature; clustering the embedded space to a predetermined class, wherein the clustering is achieved by partitioning the features in the embedded space to disjointed regions, thereby creating classes; and using consensus clustering, segmenting the embedded space.

In one embodiment, provided herein is a method of unsupervised classification of a prostate image dataset comprising the steps of: obtaining a magnetic resonance spectroscopy (MRS) dataset, said dataset defining a scene using MR spectra, identifying cancer sub-clusters; obtaining a MR image of the cancer sub-clusters; segmenting the MR image to predetermined cancer classes; integrating the magnetic resonance spectra dataset and the magnetic resonance imaging dataset, thereby redefining the scene.

In one embodiment, provided herein is a system for performing unsupervised classification of a prostate image dataset comprising the steps of: obtaining a magnetic resonance spectroscopy (MRS) dataset, said dataset defining a scene using MR spectral data, identifying cancer sub-clusters via use of spectral data; obtaining a T1-w or T2-w MR image scene of the said dataset; segmenting the MR image into cancer classes; integrating the magnetic resonance spectra dataset and the magnetic resonance imaging dataset (T1-w or T2-w), thereby redefining the scene; the system for analysis of the redefined scene comprising a module for identifying cancer sub-clusters from integrated spectral and image data; a manifold learning module; and a visualization module.

In one embodiment, provided herein is a method of auomatically segmenting the prostate boundary on an MRI image, comprising the steps of: obtaining a training MRI dataset; using an expert selected landmarks on the training MRI data, obtaining statistical shape model; using a feature extraction method on training MRI data, obtaining statistical appearance model; using automated hierarchical spectral clustering of the embedded space to a predetermined class on a corresponding MRS dataset, hence obtaining region of interest (ROI); using the region of interest, the statistical shape model and statistical appearance model, initialize a segmentation method of the prostate boundary on an MRI image, which shall then automatically determine the prostate boundary.

In one embodiment, provided herein is a method of unsupervised determination of pair-wise slice correspondences between histology and MRI via group-wise mutual information, comprising the steps of: obtaining a histology and an MRI Dataset; automatically segmenting the prostate boundary on an MRI image; correcting bias field inhomogeneity and non-linear MR intensity artifacts, thereby creating a corrected MR scene and pre-processing the segmented MRI data; extracting an image feature from the pre-processed MR scene; determining similarity metrics between the extracted image feature of the MRI dataset and histology dataset to find optimal correspondences; whereby the dataset and histology correspond to the MRI volume and whole mount histological sections (WMHS) respectively.

In one embodiment, provided herein is a method of supervised classification for automated cancer detection using Magnetic Resonance Spectroscopy (MRS), comprising the steps of: obtaining a multimodal dataset comprising MRI image, MRS spectra and histology database; automatically segmenting the prostate boundary on an MRI image; correcting bias field inhomogeneity and non-linear MR intensity artifacts, thereby creating a corrected MR scene and pre-processing the segmented MRI data; determining pair-wise slice correspondences between the histology dataset and the corrected pre-processed MR image; rigidly or non-rigidly registering the determined correspondences of WMHS and MRI slices to obtain cancerous and non-cancerous regions on MRI; using data manipulation methods, pre-processing the MRS data; from corresponding MRI and histology regions obtained in the step of registering the correspondence of whole mount histological sections (WMHS) and MRI slices determining cancer and normal MRS spectra; determining similarities between input test spectra with cancer and normal spectra; and classifying MRS data as cancerous or normal; whereby the MRI image, MRS spectra and histology database is T2-w MRI volume, MRS volume, whole mount histological sections (WMHS) data respectively.

In one embodiment, provided herein is a method of classification for automated prostate cancer detection using T2-weighted Magnetic Resonance Imaging (T2-w MRI) comprising the steps of: obtaining a multimodal dataset comprising MRI image, MRS spectra and histology database; automatically segmenting the prostate boundary on an MRI image; correcting bias field inhomogeneity and non-linear MR intensity artifacts, thereby creating a corrected MR scene and pre-processing the segmented MRI data; determining pair-wise slice correspondences between the histology dataset and the corrected pre-processed MR image; rigidly or non-rigidly registering the correspondence of WMHS and MRI slices to obtain cancerous and non-cancerous regions on MRI; extracting an image feature from the pre-processed MR scene; analyzing feature representation of MRI dataset; and classifying the MRI data as cancerous or normal; whereby the MRI image, MRS spectra and histology database is T2-w MRI volume, MRS volume, whole mount histological sections (WMHS) data respectively.

In one embodiment, provided herein is a method of supervised classification for automated prostate cancer detection using Dynamic Contrast Enhanced Magnetic Resonance Imaging (DCE MRI), comprising the steps of: obtaining a DCE MRI multi-time point volume dataset and WMHS dataset; automatically segmenting the prostate boundary on an MRI image; correcting bias field inhomogeneity and non-linear MR intensity artifacts, thereby creating a corrected MR scene and pre-processing the segmented MRI data; determining pair-wise slice correspondences between the histology dataset and the corrected pre-processed MR image; rigidly or non-rigidly registering the determined correspondences of WMHS and MRI slices to obtain cancerous and non-cancerous regions on MRI; extracting an image feature from the pre-processed MRI scene; analyzing feature representation of MRI dataset; and classifying the MRI data as cancerous or normal; whereby the MRI image and histology database is DCE MRI volume, MRS volume, whole mount histological sections (WMHS) data respectively.

In one embodiment, provided herein is a method of supervised classification for automated cancer detection using integration of MRS and (T1-w or T2-w or DCE) MRI, comprising the steps of: obtaining a multimodal dataset comprising MRI image, MRS spectra and histology database; automatically segmenting the prostate boundary on an MRI image; correcting bias field inhomogeneity and non-linear MR intensity artifacts, thereby creating a corrected MR scene and pre-processing the segmented MRI data; determining pair-wise slice correspondences between the histology dataset and the corrected pre-processed MR; rigidly or non-rigidly registering the determined correspondences of WMHS and MRI slices to obtain cancerous and non-cancerous regions on MRI; processing the MRS dataset; determining similarities between input MRS test spectra with cancer and normal MRS spectra; extracting an image feature or inherent kinetic feature or a combination thereof from the pre-processed MR scene; analyzing feature representation of MRI dataset; and classifying the sets of spectral similarities and extracted image feature representation data with training data obtained in the step of mutual registration between WMHS and MRI to classify MR data as cancerous or normal; whereby the MRI image, MRS spectra and histology database is (T1-w or T2-w or DCE) MRI volume, MRS volume, whole mount histological sections (WMHS) data respectively.

In one embodiment, provided herein is a method of supervised classification for automated prostate cancer detection using integration of DCE MRI and T2-w MRI, comprising the steps of: obtaining a multimodal dataset comprising DCE MRI image, T2-w MRI image and histology database; automatically segmenting the prostate boundary on (DCE and T2-w) MRI images; correcting bias field inhomogeneity and non-linear MR intensity artifacts, thereby creating corrected (DCE and T2-w) MR scenes and pre-processing the segmented (DCE and T2-w) MRI data; determining pair-wise slice correspondences between the histology dataset and the corrected pre-processed (DCE and T2-w) MR images; rigidly or non-rigidly registering the determined correspondences of WMHS and MRI slices to obtain cancerous and non-cancerous regions on (DCE and T2-w) MRI; extracting image features from the pre-processed (DCE and T2-w) MR scenes; analyzing feature representations of (DCE and T2-w) MRI datasets; and classifying the sets of extracted image features and feature representation data from (DCE and T2-w) MR data with training data obtained in the step of registration to classify MR data as cancerous or normal; whereby the DCE MRI image, T2-w MRI image and histology database is DCE multi-time point volume, T2-w MRI volume and whole mount histological sections (WMHS) data respectively.

In one embodiment, the provided herein is a method of supervised classification for automated prostate cancer detection using integration of MRS, DCE MRI and T2-w MRI, comprising the steps of: obtaining a multimodal dataset comprising (DCE and T2-w) MRI images, MRS spectra and histology database; automatically segmenting the prostate boundary on an MRI image; correcting bias field inhomogeneity and non-linear MR intensity artifacts, thereby creating a corrected MR scene and pre-processing the segmented MRI data; determining pair-wise slice correspondences between the histology dataset and the corrected pre-processed MR image; rigidly or non-rigidly registering the determined correspondences of WMHS and MRI slices to obtain cancerous and non-cancerous regions on MRI and so also determining cancer and normal MRS spectra; pre-processing the MRS dataset; determining similarities between input MRS test spectra and cancer and normal MRS spectra; extracting image features from the pre-processed (DCE and T2-w) MR scenes; analyzing the image feature representations of MRI dataset; and classifying the sets of spectral similarities, extracted image features representation data with training data obtained in the step of registration to classify multimodal MR data in combination or as individual modalities as cancerous or normal; whereby the multimodal dataset is MRS volume, T2-w MRI volume, DCE multi-time point MRI volume, and the histology database is whole mount histological sections (WMHS) data.

In one embodiment, provided herein is a method of supervised classification for automated detection of different grades of prostate cancer using mutimodal datasets comprising the steps of: obtaining a multimodal dataset comprising (DCE and T2-w) MRI images, MRS spectra and histology database; automatically segmenting the prostate boundary on MRI images; correcting bias field inhomogeneity and non-linear MR intensity artifacts, thereby creating a corrected MR scene and pre-processing the segmented MRI data; determining pair-wise slice correspondences between the histology dataset and the corrected pre-processed MR image; rigidly or non-rigidly registering the correspondence of WMHS and MRI slices determined in to obtain regions of different Gleason grades on MRI; processing the MRS dataset; determining the MRS spectra corresponding to different Gleason grade MRI regions obtained in the step of registration; determining similarities between input test spectra with different Gleason grade MRS spectra obtained in the step of correspondences; extracting image features or kinetic features or a combination thereof from the pre-processed (DCE and T2-w) MR scenes; analyzing the image feature representations of (DCE and T2-w) MRI datasets; and classifying the sets of spectral similarities, extracted image feature representation data with training data obtained in the step of registration to classify multimodal MR data in combination or as individual modalities into different grades of cancer; whereby the multimodal dataset is MRS volume, (T1-w or T2-w) MRI volume, DCE multi-time point MRI volume, and the histology database is whole mount histological sections (WMHS) data.

In one embodiment, the method of unsupervised learning schemes for segmentation of different regions on MRI described herein provide for the use of over 500 texture features at multiple scales and orientations (such ad gradient, first and second order statistical features in certain discrete embodiments) attributes at multiple scales and orientations to every spatial image location. In another embodiment, the aim is to define quantitative phenotype signatures for discriminating between different prostate tissue classes. In another embodiment, the methods of unsupervised learning schemes for segmenting different regions of MRI described herein provide for the use of manifold learning to visualize and identify inter-dependencies and relationships between different prostate tissue classes, or other organs in another discrete embodiment.

In one embodiment, the methods of unsupervised learning schemes for segmenting different regions of MRI described herein provide for the consensus embedding scheme as a modification to said manifold learning schemes to allow unsupervised segmentation of medical images in order to identify different regions, and has been applied to high resolution in vivo endorectal prostate MRI. In another embodiment, the methods of unsupervised learning schemes for segmenting different regions of MRI described herein provide for the consensus clustering scheme for unsupervised segmentation of the prostate in order to identify cancerous locations on high resolution in vivo endorectal prostate MRI.

In one embodiment, a novel approach that integrates a manifold learning scheme (spectral clustering) with an unsupervised hierarchical clustering algorithm to identify spectra corresponding to cancer on prostate MRS is presented. In another embodiment, the high dimensional information in the MR spectra is non linearly transformed to a low dimensional embedding space and via repeated clustering of the voxels in this space, non informative spectra are eliminated and only informative spectra retained. In another embodiment, the methods described herein identified MRS cancer voxels with sensitivity of 77.8%, false positive rate of 28.92%, and false negative rate of 20.88% on a total of 14 prostate MRS studies.

In one embodiment, a novel Consensus-LLE (C-LLE) scheme which constructs a stable consensus embedding from across multiple low dimensional unstable LLE data representations obtained by varying the parameter ($\kappa$) controlling locally linearity is presented. In another embodiment the utility of C-LLE in creating a low dimensional stable representation of Magnetic Resonance Spectroscopy (MRS) data for identifying prostate cancer is demonstrated. In another embodiment, results of quantitative evaluation demonstrate that the C-LLE scheme has higher cancer detection sensitivity (86.90%) and specificity (85.14%) compared to LLE and other state of the art schemes currently employed for analysis of MRS data.

In one embodiment, provided herein is a powerful clinical application for segmentation of high resolution invivo prostate MR volumes by integration of manifold learning (via consensus embedding) with consensus clustering. In another embodiment, the methods described herein enable the allow use of over 500 3D texture features to distinguish between different prostate regions such as malignant in one embodiment, or benign tumor areas on 1.5 T and 3 T resolution MRIs. In one embodiment, the methods provided herein describes a novel manifold learning and clustering scheme for segmentation of 3 T and 1.5 T in vivo prostate MRI. In another embodiment, the methods of evaluation of imaging datasets described herein, with respect to a defined "potential cancer space" show improved accuracy and sensitivity to cancer. The final segmentations obtained using the methods described herein, are highly indicative of cancer.

In one embodiment, the methods provided herein describe a powerful clinical application for segmentation of high resolution in vivo prostate MR volumes by integration of manifold learning and consensus clustering. In another embodiment, after extracting over 500 texture features from each dataset, consensus manifold learning methods and a consensus clustering algorithm are used to achieve optimal segmentations. In another embodiment a method for integration of in vivo MRI data with MRS data is provided, involving working at the meta-voxel resolution of MRS in one embodiment, which is significantly coarser than the resolution of in vivo MRI data alone. In another embodiment, the methods described herein, use rigorous quantitative evaluation with accompanying histological ground truth on the ACRIN database.

In one embodiment, provided herein is a powerful clinical application for computer-aided diagnosis scheme for detection of CaP on multimodal in vivo prostate MRI and MRS data. In another embodiment, the methods described herein provide a meta-classifier based on quantitative integration of 1.5 Tesla in vivo prostate MRS and MRI data via non-linear dimensionality reduction. In another embodiment, over 350 3D texture features are extracted and analyzed via consensus embedding for each MRI scene. In one embodiment, MRS features are obtained by non-linearly projecting the 256-point spectral data via schemes such as graph embedding in one embodiment, or locally linear embedding in another embodiment. Since direct integration of the spectral and image intensity data is not possible in the original feature space owing to differences in the physical meaning of MRS and MRI data, the embodiments describing the integration schemes used in the methods and systems described herein involve data combination in the reduced dimensional embedding space. The individual projections of MRI and MRS data in the reduced dimensional space are concatenated in one embodiment; and used to drive the meta-classifier. In another embodiment, unsupervised classification via consensus clustering is performed on each of MRI, MRS, and MRS+MRI data in the reduced dimensional embedding space. In one embodiment, the methods described herein allow for qualitative and quantitative evaluation of the scheme for 16 1.5 T MRI and MRS datasets. In another embodiment, the novel multimodal integration scheme described herein for detection of cancer in a subject, such as CaP in one embodiment, or breast cancer in another embodiment, demonstrate an average sensitivity of close to 87% and an average specificity of nearly 84% at metavoxel resolution.

In one embodiment of the methods of integrating MRS data and MRI dataset for the detection and classification of prostate cancer as described herein, a hierarchical MRS segmentation scheme first identifies spectra corresponding to locations within the prostate and an ASM is initialized within the bounding box determined by the segmentation. Non-informative spectra (those lying outside the prostate) are identified in another embodiment, as ones belonging to the largest cluster in the lower dimensional embedding space and are eliminated from subsequent analysis. The ASM is trained in one embodiment of the methods described herein, by identifying 24 user-selected landmarks on 5 T2-MRI images. By using transformations like shear in one embodiment, or rotation, scaling, or translation in other, discrete embodiment, the current shape is deformed, with constraints in place, to best fit the prostate region. The finer adjustments are made in another embodiment, by changing the shape within ±2.5 standard deviations from the mean shape, using the trained ASM. In the absence of a correct initialization, in one embodiment the ASMs tend to select wrong edges making it impossible to segment out the exact prostate boundaries.

In one embodiment, the starting position for most shape based segmentation approaches requires manual initialization of the contour. This limits the efficacy of the segmentation scheme in that it mandates user intervention. The methods of segmentation described herein use the novel application of MRS to assist and initialize the segmentation with minimal user intervention. In another embodiment, the methods described herein show that ASMs can be accurately applied to the task of prostate segmentation. In one embodiment, the segmentation methods presented herein are able to segment out the prostate region accurately.

Provided herein, is a novel, fully automated prostate segmentation scheme that integrates spectral clustering and ASMs. In one embodiment, the algorithm comprises 2 distinct stages: spectral clustering of MRS data, followed by an ASM scheme. For the first stage, a non-linear dimensionality reduction is performed, followed by hierarchical clustering on MRS data to obtain a rectangular ROI, which will serve as the initialization for an ASM. Several non-linear dimensionality reduction techniques were explored, and graph embedding was decided upon to transform the multi-dimensional MRS data into a lower-dimensional space. Graph embedding refers in one embodiment to a non-linear dimensionality reduction technique in which the relationship between adjacent objects in the higher dimensional space is preserved in the co-embedded lower dimensional space. In another embodiment, by clustering of metavoxels in this lower-dimensional space, non-informative spectra is eliminated. This dimensionality reduction and clustering is repeated in another embodiment hierarchically to yield a bounding box encompassing the organ or tissue of interest (e.g. prostate). In the second stage, the bounding box obtained from the spectral clustering scheme serves as an initialization for the ASM, in which the mean shape is transformed to fit inside this bounding box. Nearby points are then searched to find the border, and the shape is updated accordingly. The afore-mentioned limitations of the MD led to the use of mutual information (MI) to calculate the location of the prostate border. Given two images, or regions of gray values $I_1$ and $I_2$, the MI between $I_1$ and $I_2$ indicates in one embodiment, how well the gray values can predict one another. It is used in another embodiment for registration and alignment tasks.

In one embodiment MI is used to search for a prostate boundary. For each training image, a window of intensity values surrounding each manually landmarked point on the prostate boundary is taken. Those intensity values are the averaged to calculate the mean 'expected' intensity values. The advantages of using MI over MD are: (1) the number of points sampled is not dependent on the number of training images, and (2) MI does not require an underlying Gaussian distribution, as long as the gray values are predictive of one another.

Finally, once a set of pixels presumably located on the border of the tissue or organ of interest are determined (henceforth referred to as 'goal points' the shape is updated to best fit these goal points. A weighting scheme is introduced in one embodiment for fitting the goal points. The goal points are weighted using two values. The first value is the normalized MI value. MI is normalized by the Entropy Correlation Coefficient (ECC), which rescales the MI values to be between 0 and 1. The second weighting value is how well the shape fit each goal point during the previous iteration, which is scaled from 0 to 1. This is the 'outlier weight,' where if the shape model couldn't deform close to a goal point, it is given a value close to 0, and if the shape model was able to deform close to a goal point, it is given a value close to 1. These two terms are multiplied together to obtain the final weighting factor for each landmark point. It's important to note that as in traditional ASM schemes, the off-line training phase needs to only be done once, while the on-line segmentation is fully automated.

In one embodiment, the methods and systems described herein provide a fully automated scheme, by performing spectral clustering on MRS data to obtain a bounding box, used to initialize an ASM search, using MI instead of MD to find points on the prostate border, as well as using outlier distances and MI values to weight the landmark points and also, an exhaustive evaluation of the model via randomized cross validation is performed to assess segmentation accuracy against expert segmentations. In another embodiment, model parameter sensitivity and segmentation efficiency are also assessed.

In one embodiment, MRI and MRS have individually proven to be excellent tools for automated prostate cancer detection in the past. In one embodiment the novel methods of integration described herein, to integrate both the structural and the chemical information obtained from MRI and MRS to improve on the sensitivity and specificity of CAP detection. 2 novel approaches for integration of multimodal data are described herein in the methods provided. In one embodiment, the performance of classifying high dimensional feature data is compared against classifying low dimensional embeddings of high dimensional data. In one embodiment, the methods described herein show that sensitivity and specificity could be improved by integrating both modalities together. In another embodiment, MRS data performs better than MRI data when the results are compared at the metavoxel level. In another embodiment, the results obtained by fusion of MRS and MRI data, show an improvement in the PPV value as well as the FN rate as compared to MRS data; and are comparable in terms of the sensitivity to prostate cancer. In one embodiment, provided herein is a method to analyze in vivo MR data to achieve automated segmentation of prostatic structures which operates at the much finer MRI voxel level. The methods described herein operates in another embodiment, at a coarser resolution, but has clinical application in the field of cancer screening making it more robust from this perspective.

In one embodiment, provided herein is a novel comprehensive methodology for segmentation, registration, and detection of cancer, such as prostate cancer in one embodiment, from 3 Tesla in vivo DCE MR images. A multi-attribute active shape model based segmentation scheme (MANTRA) is used in another embodiment, to automatically segment the prostate from in vivo DCE and T2-w images, following which a multimodal registration algorithm, COFEMI, is used to map spatial extent of CaP from corresponding whole mount histology to the DCE-MRI slices. Owing to the presence of MR image intensity non-standardness, a non-linear DR scheme (LLE) is used, coupled with consensus clustering to identify cancerous image pixels. In another embodiment, CaP detection results, 60.72% sensitivity, 83.24% specificity, and 77.20% accuracy, and were superior compared to those obtained via the 3TP method (41.53% sensitivity, 70.04% specificity, 67.37% accuracy).

In one embodiment, provided herein is a Multi-Attribute, Non-Initializing, Texture Reconstruction Based Active Shape Model (MANTRA). In another embodiment, the MANTRA scheme described herein provides a PCA-based texture models are used to better represent the border instead of simply using mean intensities as in the traditional ASM. In one embodiment, the MANTRA scheme described herein uses CMI is as an improved border detection metric to overcome several inherent limitations with the Mahalanobis distance. In another embodiment, the use of kNN entropic graphs in the MANTRA scheme described herein makes it possible to compute CMI in higher dimensions. In another embodiment, using multiple attributes in the MANTRA scheme described herein gives better results than simply using intensities. In another embodiment, a multi-resolution approach is used to overcome initialization bias, and problems with noise at higher resolutions in the MANTRA scheme described herein, which is used in the methods and systems provided herein. In one embodiment, MANTRA was successful with different field strengths (1.5T and 3T) and on multiple protocols (DCE and T2). In another embodiment incorporation of multiple texture features increases results significantly, indicating that a multi-attribute approach is advantageous.

In another embodiment provided herein is a novel segmentation algorithm: Multi-Attribute Non-Initializing Texture Reconstruction Based ASM (MANTRA), comprising a new border detection methodology, from which a statistical shapes model can be fitted.

In one embodiment, provided herein is the use of the Adaboost method in conjunction with the prostate boundary segmentation scheme (MANTRA) to create a unique feature ensemble for each section of the object border, thus finding optimal local feature spaces. Each landmark point can therefore move in its own feature space, which is combined using a weighted average of the Cartesian coordinates to return a final new landmark point. Tests show that the method disclosed herein is more accurate than the traditional method for landmark detection, and converges in fewer iterations.

In one embodiment, provided herein is an integrated detection scheme for high resolution in vivo 3 Tesla (T) structural T2-w and functional DCE MRI data for the detection of CaP. A supervised classifier is trained using MR images on which the spatial extent of CaP has been obtained via non-rigid registration of corresponding histology and MR images. Textural representations of the T2-w data and the multiple time-point functional information from DCE data are integrated in multiple ways for classification. In another embodiment, classification based on the integration of T2-w texture data and DCE was found to significantly outperform classification based on either of the individual modalities with an average area under the ROC curve of 0.692 (as compared to 0.668 and 0.531 for the individual modalities). The methods described herein operates in another embodiment suggesting that the fusion of structural and functional information yields a higher diagnostic accuracy as compared any individual modality. In another embodiment, the methods described herein provide for the integration of such disparate modalities in a space divorced from the original phyisicality of the modalities; ensuring better diagnostic accuracy.

The term "about" as used herein means in quantitative terms plus or minus 5%, or in another embodiment plus or minus 10%, or in another embodiment plus or minus 15%, or in another embodiment plus or minus 20%.

The following examples are presented in order to more fully illustrate the preferred embodiments of the invention. They should in no way be construed, however, as limiting the broad scope of the invention.

EXAMPLES

Example 1

A Hierarchical Unsupervised Spectral Clustering Scheme for Detection of Prostate Cancer from Magnetic Resonance Spectroscopy (MRS)

Most automated analysis work for MRS for cancer detection has focused on developing fitting techniques that yield peak areas or relative metabolic concentrations of different metabolites like choline, creatine and citrate as accurately as possible. The automated peak finding algorithms suffer from problems associated with the noisy data which worsens when a large baseline is present along with low signal to noise ratio. z-score (ratio of difference between population mean and individual score to the population standard deviation) analysis was suggested as an automated technique for quantitative assessment of 3D MRSI data for glioma. A predefined threshold value of the z score is used to classify spectra in two classes: malignant and benign. Some worked on the quantification of prostate MRSI by model based time fitting and frequency domain analysis. Some researchers have applied linear dimensionality reduction methods such as independent component analysis (ICA), principal component analysis (PCA) in conjunction with classifiers to separate different tissue classes from brain MRS. However, it was previously demonstrated that due to inherent non linearity in high dimensional biomedical studies, linear reduction methods are limited for purposes of classification.

FIG. 1 illustrates the modules and the pathways comprising the automated quantitative analysis system for identifying cancer spectra on prostate MRS. In the first step, a manifold learning scheme (spectral learning or graph embedding) is applied to embed the spectral data in a low dimensional space so that objects that are adjacent in the high dimensional ambient space are mapped to nearby points in the output embedding. Hierarchical unsupervised k-means clustering is applied to distinguish non-informative (zero-padded spectra and spectra lying outside the prostate) from informative spectra (within prostate). The objects in the dominant cluster, which correspond to the spectra lying outside the prostate, are pruned and eliminated from subsequent analysis. The recursive scheme alternates between computing the low dimensional manifold of all the spectra in the 3D MRS scene and the unsupervised clustering algorithm to identify and eliminate non-informative spectra. This scheme is recursed until the sub-clusters corresponding to cancer spectra are identified. The contributions and novelty aspects of this work are, among others; the use of non-linear dimensionality reduction methods (spectral clustering) to exploit the inherent non-linearity in the high dimensional spectral data and embed the data in a reduced dimensional linear subspace; a hierarchical clustering scheme to recursively distinguish informative from non-informative spectra in the lower dimensional embedding space; the cascaded scheme that enables accurate identification of cancer spectra efficiently; and is also qualitatively shown to perform better compared to the popular z-score method.

Methods

Data Description

We represent the 3D prostate T2 weighted scene by $C=(C, f)$ where C is a 3D grid of voxels $c \in C$ and $f$ is a function that assigns an intensity value to every $c \in C$. A spectral image $C^s=(G, g)$ is also defined where G is also a 3D grid superposed on C and $G \subset C$. For every spatial location $u \in G$, there is an associated spectra $g(u)$. Hence while $f(c)$ is a scalar, to $g(u)$ is a 256 dimensional vector valued function. Note that the size of the spatial grid locations $u \in G$ is equivalent to 8×8 voxels $c \in C$.

The spectral datasets used for the study were collected during the ACRIN multi-site trial of prostate MRS acquired with 1.5 Tesla GE Medical Systems through the PROSE(c) package (voxel width 0.4×0.4×3 mm) Datasets were obtained from 14 patients having CAP with different degrees of severity. The spectral grid was contained in DICOM images from which the 16×16 grid containing N=256 spectra was obtained using IDL. Of these N spectra, over half are zero-padded or non-informative lying outside the prostate. FIGS. 2 (a)-(b) show a spectral grid superimposed on a T2 MR image and the corresponding spectra. FIG. 2(c) shows the magnified version of a single 256 dimensional MRS spectra from within G. Note that due to noise in the spectra, it is very difficult to identify individual peaks for creatine, choline and citrate from g(u).

Determining Ground Truth for Cancer Extent on Prostate MRS

Since whole mount histological sections corresponding to the MR/MRS studies were not available for the ACRIN database, it was only possible to determine approximate spatial extent of cancer within G. During the MRSI ACRIN study, arbitrary divisions were established by the radiologists to obtain a rough estimate of the location of cancer. The prostate was first divided into two regions: Left (L) and Right (R) and the slices were then further divided into three regions: Base (B), Midgland (M) and Apex (A). Thus a total of 6 potential cancer locations were defined: Left Base (LB), Left Midgland (LM), Left Apex (LA), Right Base (RB), Right Midgland (RM) and Right Apex (RA). Presence or absence of cancer in each of these 6 candidate locations, determined via needle biopsy, was recorded. The maximum diameter of the cancer was also recorded in each of the 6 candidate locations.

For a MRS scene $C^s$, with known cancer in left midgland (LM), the prostate contained in a 3×6 grid and prostate midgland extending over 2 contiguous slices, a potential cancer space $G^P \subset G$ was defined within which the cancer is present. If G is separated into two equal right and left halves of 3×3, the total number of voxels $u \in G^P$ is 18 (3×3×2). The total number of actual cancer voxels within the cancer space, $G^P$, is obtained by knowledge of maximum diameter of cancer and given as:

$$\text{No of candidate slices} \times \left\lceil \frac{(MaxDiameter)^2}{\Delta x \Delta y} \right\rceil,$$

where $\lceil \, \rceil$ refers to the ceiling operation and $\Delta x$, $\Delta y$ refer to the size of voxel u in the x and y dimensions. Hence for a study with a cancer with maximum diameter of 13.75 mm in LM, 8 voxels within $G^P$ corresponds to cancer. It is noted that the cancer ground truth determined, does not convey information regarding the precise spatial location of cancer voxels within $G^P$, only the number.

Manifold Learning Via Spectral Clustering

The spectra g(u), for $u \in G$ lies in a 256 dimensional space. Hence, the goal is to find a embedding vector $\hat{X}(u)$ for each voxel $u \in G$, and its associated class $\omega$ such that the distance between q(u) and $\omega$ is monotonically related to G in the lower dimensional space. Hence if voxels u, $v \in G$ both belong to class $\omega$, then $[\hat{X}(u)-\hat{X}(v)]^2$ should be small. To compute the optimal embedding, first a matrix W is defined, representing the similarity between any two objects u, $v \in G$ in high dimensional feature space.

$$W(u,v) = e^{\|g(u)-g(v)\|} \in R^{|G| \times |G|}, \quad (1)$$

where |G| is the cardinality of set G. The embedding vector $\hat{X}$ is obtained from the maximization of the function:

$$E_W(\hat{X}) = 2\gamma \frac{\hat{X}^T (D-W) \hat{X}}{\hat{X}^T D \hat{X}}. \quad (2)$$

where $D(u, u)=\Sigma_v W(u, v)$ and $\gamma=|G|-1$. The embedding space is defined by the eigenvectors corresponding to the smallest $\Lambda$ eigenvalues of $(D-W)\hat{X}=XDW$ for every $u \in G$, the embedding $\hat{X}(u)$ contains the coordinates of u in the embedding space and is given as, $\hat{X}(u)=[\hat{e}_A(u)||\Lambda \in \{1, 2, \ldots, \beta\}]$ where $\hat{e}_A(u)$, is a $\Lambda$ dimensional vector of eigen values associated with u.

Hierarchical Cascade to Prune Non-Informative Spectra

At each iteration t, for a subset of voxels u, $\tilde{G}_t \subset G$ is obtained by eliminating the non-informative spectra g(u). The voxels $u \in \tilde{G}_t$ are aggregated into clusters $V_T^1, V_T^2, V_T^3$ by applying k-means clustering to all $u \in G$ in the low dimensional embedding $\hat{X}(u)$. The number of clusters k=3 was chosen empirically to correspond to cancer, benign and classes whose attributes are intermediate to normal tissue and cancer (e.g. benign hyperplasia (BPH), high-grade prostatic intraepithelial neoplasia (HGPIN)). Initially, most of the locations $u \in G$ correspond to zero padded or non informative spectra and hence the scheme proceeds by eliminating the dominant cluster. Clusters corresponding to cancer and areas within the prostate only become resolvable at higher levels of the cascade scheme after elimination of the dominant non informative spectra. The algorithm below describes precisely how the methodology works.

---

Algorithm HierarclustMRSprostate
Input: g(u) for all $u \in G$, T. G
output: $\tilde{G}_T, V_T^1, V_T^2, V_T^2$
begin
  0. Initialize $\tilde{G}_0 = G$:
  1. for t = 0 to T do
  2.    Apply Graph Embedding to g(u), for all $u \in G_t$ to obtain $\hat{X}_t(u)$:
  3.    Apply k-means clustering to obtain clusters $V_t^1, V_t^2, V_t^3$;
  4.    Identify largest cluster $V_t^{max}$:
  5.    Create set $\tilde{G}_{t+1} \subset \tilde{G}_t$ by eliminating all $u \in V_t^{max}$ from $\tilde{G}_t$;
  6. endfor
end

---

Since an unsupervised learning approach is used, it is not clear which of $V_T^1, V_T^2, V_T^3$, actually represents the cancer cluster. The motivation behind the Hierarclust MRS prostate algorithm however is to obtain clusters $V_T^1, V_T^2, V_T^3$ which represent, to the extent possible, distinct tissue classes.

Results

Qualitative Results

The images in FIG. 3 demonstrate qualitative results of the hierarchical cascade scheme for distinguishing informative from non-informative spectra. FIG. 3(a) represents a spatial map of $\tilde{G}_0(16\times16)$ superimposed on the corresponding T2 weighted scene and every $u \in \tilde{G}_0$ is assigned one of three colors, in turn corresponding to one of the three classes determined based on the embedding $\hat{X}(u)$. Note that the dominant cluster (spatial locations in blue in FIG. 3(a)) has been eliminated in $\tilde{G}_1(16\times8)$ (FIG. 3(b)) and from $\tilde{G}_2(8\times4)$. The lowest level in the cascade ($\tilde{G}_3$ in 3(d)) is obtained from $\tilde{G}_2$ after the spectra on the periphery of the prostate (blue locations) have been removed. The cancer spectra are visible as a distinct cluster (blue cells) on FIG. 3(d). The cascade scheme permits the resolvability of the 3 tissue classes (one of which is cancer) which were collapsed together within the informative cluster at the higher levels in the cascade ($\tilde{G}_0, \tilde{G}_1, \tilde{G}_2$).

FIGS. 4(a)-(c) shows the potential cancer location volume within G on a single 2D slice of a T2 weighted prostate MR scene for 3 different studies and FIGS. 3(d)-(f) show the corresponding result of the hierarchical scheme. In all 3 studies, the cancer cluster can be appreciated as a distinct class on the grid, corresponding to the location specified in the pathology reports. In FIGS. 4(d)-(i) the grid maps obtained via the cascaded clustering scheme (4(d)-(f)) are compared with the corresponding plots obtained using the z-score method (4(g)-(i)), a popular MRS analysis scheme. In this method, the z-score value, z(u) is assigned to each $u \in G$. The spectra g(u) is then assigned to one of the two classes based on whether z(u) is lower or greater than a predetermined threshold. It is apparent from the plots in 4(g)-(i) that none of the classes appear to represent the cancer class. These results clearly suggest that the cascaded scheme has higher specificity compared to the z-score method.

Quantitative Results

Table 1 shows the quantitative results for 14 different studies. True positive (TP), False positive (FP) and False negative (FN) fractions for every dataset were obtained by comparing the automated results with the ground truth voxels for all the 3 classes obtained. The class which corresponded to maximum TP and minimum FP and FN rates was identified as the cancer class and the respective TP, FP and FN values were reported for that particular class. TP, FP and FN percentage values for each of the dataset were then calculated by dividing the TP, FP and FN fraction by the total number of ground truth voxels determined as described in Section 2.2. Average results over 14 studies have been reported. Clearly the scheme appears to have high cancer detection sensitivity and specificity.

TABLE 1

Table showing the average percentage values of TP, FP and FN for the automated detection scheme, averaged over a total of 14 MRS studies

| Average TP | Average FP | Average FN |
|---|---|---|
| 77.80 | 28.97 | 20.92 |

Example 2

Consensus-Locally Linear Embedding (C-LLE): Application to Prostate Cancer Detection on Magnetic Resonance Spectroscopy Due to inherent non-linearities in biomedical data, non-linear dimensionality reduction (NLDR) schemes such as Locally Linear Embedding (LLE) have begun to be employed for data analysis and visualization. LLE attempts to preserve geodesic distances between objects, while projecting the data from the high to the low dimensional feature spaces unlike linear dimensionality reduction (DR) schemes such as Principal Component Analysis (PCA) which preserve the Euclidean distances between objects. The low dimensional data representations obtained via LLE are a function of $\kappa$, a parameter controlling the size of the neighborhood within which local linearity is assumed and used to approximate geodesic distances. Since LLE is typically used in an unsupervised context for visualizing and identifying object clusters, a priori, the optimal value of $\kappa$ is not-obvious.

Roweis and Saul suggest that varying $\kappa$ over a wide range of values, still yields stable, consistent low dimensional embeddings for dense synthetic datasets. Previous experiments on real biomedical data, suggest otherwise. Further, for sparsely populated datasets, the most common failure of LLE is to map faraway points to adjacent locations in the embedding space depending on the choice of $\kappa$.

Automatically estimating $\kappa$ is largely an open problem, though an attempt was made to adaptively determine a globally optimal $\kappa$ value. However, these experiments were limited is to dense synthetic datasets. The operating assumption here is that in general, no single global optimal value of κ can be applied to learning the low dimensional manifold over the entire data space and that different values of κ are required in different regions of the data space to optimally reconstruct locally linear neighborhood.

The novel Consensus-LLE (C-LLE) algorithm creates a stable low dimensional representation of the data, in a manner analogous to building classifier ensembles such as Breiman's Bagging scheme. Instead of attempting to estimate a single globally optimal κ value as in to be applied to the entire dataset, the scheme aims to estimate the true pairwise object adjacency $D(c, d)$ in the low dimensional embedding between two objects $c, d \in C$. The problem of estimating object distances $D(c, d)$ is formulated as a Maximum Likelihood Estimation problem (MLE) from multiple approximations $D_\kappa(c, d)$ obtained by varying κ, which are assumed to be unstable and uncorrelated. The scheme disclosed herein thus differs from related work in two fundamental ways: (a) C-LLE attempts to reconstruct the true low dimensional data manifold by learning pairwise object distance across the entire data space and avoids the κ estimation problem, and (b) C-LLE learns the low dimensional manifold in a locally adaptive fashion, compared to that attempt to learn an optimal κ value which is then uniformly applied to learning the manifold across the entire data space.

Prostate MRS is a non-invasive imaging technique used to detect changes in the concentration of the specific metabolites (choline, creatine and citrate) which have been shown to be representative of prostate cancer (CaP). Peak detection algorithms to automatically determine metabolite peaks have been found to be sensitive to presence of noise and other biomedical signal artifacts. In Example 1, a novel hierarchical clustering algorithm employing NLDR was presented, for automatically distinguishing between normal and diseased spectra within the prostate. In this Example, the newly developed C-LLE algorithm is used to distinguishing between benign and cancerous MR spectra on a total of 18 studies and compare C-LLE's performance with LLE and 3 other state of the art MRS analysis methods. In addition, disclosed in this Example is the development of a novel Independent Component Analysis (ICA) algorithm to (a) automatically determine search ranges within which to perform peak detection, and (b) validating the clusters obtained via C-LLE.

Consensus-Locally Linear Embedding (C-LLE)

Issues with LLE

The objective behind LLE is to non-linearly map objects $c, d \in C$ that are adjacent in the M dimensional ambient space $(F(c), F(d))$ to adjacent locations in the low dimensional embedding $(S(c), S(d))$, where $(S(c), S(d))$ represent the m-dimensional dominant eigen vectors corresponding to $c, d (m \ll M)$. If $d$ is in the κ neighborhood of $c \in C$, then $c, d \in C$ are assumed to be linearly related. LLE attempts to non-linearly project each $F(c)$ to $S(c)$ so that the neighborhood of $c \in C$ is preserved. LLE is sensitive to the choice of κ since different values of κ will result in different low dimensional data representations.

Relationship Between C-LLE and Bagging Classifiers

The aim behind constructing ensemble classifiers such as Bagging [Breiman, 1996] is to reduce the variance and bias across weak classifiers. In Bagging, for an input object $c \in C$, a sequence of weak predictors $\phi(c, S_k)$ are generated from K bootstrapped training sets $S_k$ where $1 \leq k \leq K$. A strong Bagged classifier $\phi^{Bag}(c)$ is obtained by averaging or voting over the multiple weak classifiers $\phi(c, S_k), k \in \{1 \ldots K\}$. An analogous idea is used for C-LLE whereby several weak embeddings, $S_\kappa(c)$ are combined across different values of $\kappa \in \{1 \ldots K\}$ to obtain a comprehensive stable low dimensional data embedding, with lower variance and bias compared to individual weak embeddings. the hypothesis is that for any $c, d \in C$, the pairwise object distance in the low dimensional space is faithfully represented in the stable consensus embedding $\hat{S}(c)$, for $c \in C$.

Maximum Likelihood Estimation (MLE) of Object Adjacency

The spirit behind C-LLE is the direct determination of pairwise object adjacencies in the low dimensional embedding space as opposed to κ estimation. For each $c, d$ the aim is to find the true distance $\hat{D}^\psi(c, d)$ between $c, d \in C$ in some lower dimensional embedding space, where ψ is an appropriately defined distance metric. Given multiple lower dimensional embeddings, the distance between $c, d$ can be expressed as a distribution $D_\kappa(c, d)$ where for brevity the metric notation has been dropped. The problem of determining $\hat{D}(c, d)$ can be posed as a MLE problem. Thus this problem can be rewritten as, $$p(\varphi_D \mid \hat{D}) = \prod_{\kappa=1}^{K} p(\mathcal{D}_\kappa \mid \hat{D}): \ \forall c, d \in C, \quad (2.3.1)$$

where $\phi_D$ is a set of low dimensional distance estimates between $c, d \in C$, and based on the assumption that the lower dimensional embeddings obtained for $\kappa \in \{1, \ldots K\}$ are independent. The goal is to find the MLE of D, $\hat{D}$ that maximizes $\ln p(\phi_D | D)$ for $c, d \in C$. Intuitively this corresponds to computing the peak (mode) of the distribution $p(\phi_D | \hat{D})$.

Algorithm for C-LLE (a) Step 1. Multiple Lower Dimensional Embeddings are Generated By varying $\kappa \in \{1 \ldots K\}$ using LLE: Each embedding $S_\kappa(c)$ will hence represent adjacencies between objects $c_i, c_j \in C$, $i, j \in \{1 \ldots |C|\}$, where $|C|$ is the cardinality of C. Thus $\|S_\kappa(c_i) - S_\kappa(c_j)\|_\psi$ will vary as a function of κ.

(b) Step 2. Obtain MLE of Pairwise Object Adjacency:

A confusion matrix $W_\kappa \in \Re^{|C| \times |C|}$ representing the adjacency between any two obje $c_i, c_j \in C, i, j \in \{1, \ldots, |C|\}$ in the lower dimensional embedding representation $S_\kappa(c)$ is calculated as:

$$W_\kappa(i,j) = D_\kappa(c_i, c_j) = \|S_\kappa(c_i) - S_\kappa(c_j)\|_\psi \quad (2.4.1)$$

where $c_i, c_j \in C$, for $i, j \in \{1, \ldots, |C|\}, \kappa \in \{1, \ldots, K\}$, and ψ in the case is the L2 norm. MLE of $D_\kappa(c_i, c_j)$ is estimated as the mode of all adjacency values in $W_\kappa(i, j)$ over all κ. This $\hat{D}$ for all $c \in C$ is then used to obtain the new confusion matrix $\hat{W}$.

(c) Step 3. Multidimensional Scaling (MDS):

MDS [Venna, 2006] is applied to $\hat{W}$ to achieve the final combined embedding $\hat{S}(c)$ for $c \in C$. MDS is implemented as a linear method that preserves the Euclidean geometry between each pair of objects $c_i, c_j \in C, i, j \in \{1, \ldots, |C|\}$. This is done by finding optimal positions for the data points $c_i, c_j$ in lower-dimensional space through minimization of the least squares error in the input pairwise distances in $\hat{W}$.

Prostate Cancer Detection on MRS Via C-LLE

Notation

We define a spectral scene $C=(C, f)$ where C is a 3D grid of spatial locations. For each spatial location $c_i \in C, i \in \{1, \ldots |C|\}$, there is an associated 256-dimensional valued spectral vector $F(c) = [f_u(c) | u \in \{1 \ldots, 256\}]$, where $f_u(c)$ represents the concentration of different biochemicals (such as creatine, citrate, and choline) at every spatial location c.

Data Description

A total of 18 1.5 T in vivo endorectal T2-weighted MRI and MRS ACRIN studies[1] were obtained prior to prostatectomy. Partial ground truth for the CaP extent on MR studies is available in the form of approximate sextant locations and sizes for each study. The maximum diameter of the tumor is also recorded in each of the 6 prostate sextants (left base, left midgland, left apex, right base, right midgland, right apex). The tumor size and sextant locations were used to identify a potential cancer space used for performing a semi-quantitative evaluation of the CAD scheme. Additional details on identifying this cancer space are provided in Example 1.

[1] http://www.acrin.org/6659 protocol.html

C-LLE and Consensus Clustering for CaP Detection on MRS

FIG. 5 shows the flowchart demonstrating the different steps comprising the prostate MRS detection scheme. The adjacency matrix (W) is constructed across K embeddings of the MR spectral space so that for any $c_i$, $c_j \in C$, where i, j $\in \{1, \ldots |C|\}$, $W_\kappa(i, j)$ represents the distribution $D_\kappa(c_i, c_j)$ of the low dimensional distance between MR spectra $F(c_i)$, $F(c_j)$, for $k \in \{1, \ldots K\}$. As described in Section 2.4, the stable spectral distance matrix $\hat{W}$ is then obtained and MDS applied to obtain the stable embedding representation of the spectra, $\tilde{S}(c)$ for each $c \in C$.

To overcome the instability associated with centroid based clustering algorithms, multiple weak clusterings $V_t^1, V_t^2, V_t^3$, $t \in \{0, \ldots T\}$ are generated by repeated application of k-means clustering on the combined low dimensional manifold $\tilde{S}(c)$, for all $c \in C$. It is assumed that each prostate spectra could be classified as one of the three classes: cancer, benign and other tissue classes (e.g. benign hyperplasia (BPH)). Each cluster, $V_t$ is a set of objects which has been assigned the same class label by the k-means clustering algorithm. As the number of elements in each cluster tends to change for each such iteration of k-means, a co-association matrix H is calculated, with the underlying assumption that objects belonging to a natural cluster are very likely to be co-located in the same cluster for each iteration. Co-occurrences of pairs of objects $c_i$, $c_j \in C$ in the same cluster $V_t$ are hence taken as votes for their association. H(i, j) thus represents the number of times $c_i$, $c_j \in C$, for i, j $\in \{1, \ldots |C|\}$, were found in the same cluster over T iterations. MDS is applied to H followed by a final unsupervised classification using k-means, to obtain the final stable clusters $\hat{V}^1$, $\hat{V}^2$, $\hat{V}^3$.

Model Based Peak Integration Scheme Via Independent Component Analysis (ICA)

Peak detection on prostate MRS is a difficult problem due to noise and spectral contributions from extra-prostatic regions. A secondary contribution of this paper is a model based approach to localize choline, creatine and citrate peaks based on Independent Component Analysis (ICA). ICA is a multivariate decomposition technique which linearly transforms the observed data into statistically maximally independent components (ICs). For a set of voxels identified offline as cancer, $\chi_{CaP} \subset C$, $\Lambda$ independent components, $\mathcal{F}_\alpha^{IC}$, $\alpha \in \{1, \ldots \Lambda\}$ are obtained, which represent spectral contributions of choline, creatine and citrate for prostate cancer. The parts per million (ppm) ranges ($v_{cc}, v_{cr}$) on the X-axis are then learnt for choline+creatine and citrate from $\mathcal{F}_\alpha^{IC}$, $\alpha \in \{1, \ldots \Lambda\}$. Peak detection is then performed on C to identify choline, creatine and citrate peaks within the ranges and $v_{cc}$ and $v_{cr}$. Area under the choline+creatine peak ($V_{cc}$) and under citrate peak ($V_{cr}$) is obtained via integration for all voxels $c \in C$. Zakian index ($\gamma(c)$) is then calculated as the ratio of $V_{cc}(c)/V_{cr}(c)$. A pre-defined threshold determined by radiologists is used to classify the spectra as cancer/benign based on $\gamma(c)$ for $c \in C$.

z-Score and Principal Component Analysis (PCA)

z-score is a statistical measure defined as the ratio of the difference between the population mean and individual score to the population standard deviation. For a set of voxels, $\Phi^{tr}$ of c, $\Phi^{tr} \subset C$, the mean spectral vector $F^\mu = [f_u^\mu | u \in \{1, \ldots 256\}]$ is obtained and the corresponding standard deviation vector $F^\sigma = [f_u^\sigma | u \in \{1, \ldots 256\}]$, where $$f_u^\mu = \frac{1}{|\Phi^{tr}|} \sum_{c \in \Phi^{tr}} f_u(c) \text{ and } f_u^\sigma = \sqrt{\frac{1}{|\Phi^{tr}|} \sum_{c \in \Phi^{tr}} [f_u(c) - f^\mu(c)]^2}.$$

The z-score at each $c \in C$ is given as $$z(c) = \frac{\|F(c) - F^\mu\|_2}{\|F^\sigma\|_2},$$

where $|\Phi^{tr}|$ is the cardinality of $\Phi^{tr}$. A predefined threshold $\theta_z$ is then used to identify each $c \in C$ as cancerous or not based on whether $z(c) \geq \theta_z$. PCA attempts to find the orthogonal axes that contain the greatest amount of variance in the data using eigenvalue decomposition. Similar to the C-LLE scheme, each $c \in C$ is described by 5 principal components, $S^{PCA}(c)$ which contain 98% of the data variance. Consensus clustering is then applied on $S^{PCA}(c)$, to cluster each $c \in C$ into one of 3 classes.

Results and Discussion

Qualitative Results

FIG. 6 shows CaP detection results on a prostate MRS study via C-LLE, LLE, PCA, z-score, and ICA based peak detection. FIGS. 6(a)-(c) show the comparison of C-LLE (c) with LLE for (a) $\kappa=5$, and (b) $\kappa=7$ on a single 2D T2 weighted MRI slice. FIGS. 6(d), (e), (f) show the clustering results obtained via ICA peak detection, z-score and PCA respectively. At each spatial location on the MRI slice a spectral signature was analyzed and that corresponding location was assigned one of 3 colors (for C-LLE, PCA) and one of the two colors (for z-score, ICA based peak detection) based on clustering/classifier results. The white box superposed on 6(a)-(f) show the potential cancer space for corresponding slices. In each of FIGS. 6(a)-(f) the red cluster represents the one identified as cancer by each of the different methods. Note in FIG. 6(c) that the C-LLE result shows excellent sensitivity and specificity and also appears to reduce the variance and instability in the individual weak embeddings shown in 6(a), (b). FIGS. 6(d)-(f) corresponding to results obtained via ICA-based peak detection, z-score method and PCA respectively, show low sensitivity and specificity compared to the C-LLE scheme (FIG. 6(c)). To assess the validity of C-LLE and PCA, ICA is used to isolate independent components (IC) from clusters identified as CaP by the two schemes. FIG. 6(h) shows an IC obtained from the cluster identified as CaP by C-LLE (shown as red in 6(c)); FIG. 6(i) shows the corresponding result obtained via PCA. Note the strong correlation between the ICs obtained via C-LLE (6(g)) and a known CaP MRS signature 2(h) according to the 5-point scale. Also noted, is the dissimilarity between the spectra obtained by PCA and shown in 6(i) compared to those in 6(g), (h).

Quantitative Results

Table 1 shows average CaP detection sensitivity and specificity over 18 studies obtained from C-LLE (m=4), ICA based peak detection, PCA and z-score. Table 1 (b) shows the sensitivity and specificity results averaged across 18 datasets for C-LLE (m=3, 4, 5) compared to LLE by varying the number of dimensions. Note that the C-LLE scheme has a higher sensitivity and specificity across all dimensions which suggests the efficacy of the scheme. The effectiveness of the scheme for detection of prostate cancer is evident from the quantitative results (Table 1) with both sensitivity and specificity of close to 87% and 85% respectively compared to current state of the art methods peak detection, PCA and z-score. Table 1(b) reveals that C-LLE consistently outperforms traditional LLE across multiple dimensions (m=3, 4, 5).

(a)

| Method | Sensitivity | Specificity |
|---|---|---|
| C-LLE | 86.90 | 85.14 |
| Peak detection | 45.29 | 76.62 |
| PCA | 66.95 | 77.89 |
| z-score | 74.74 | 49.75 |

(b)

| | Sensitivity | | Specificity | |
|---|---|---|---|---|
| m | C-LLE | LLE | C-LLE | LLE |
| 3 | 83.20 | 82.07 | 84.81 | 81.89 |
| 4 | 86.90 | 83.38 | 85.14 | 81.77 |
| 5 | 84.88 | 82.10 | 85.60 | 81.70 |

Table 2: (a) Average CaP detection Sensitivity and Specificity of C-LLE (m=4), compared to ICA based peak detection, z-score, and PCA, averaged over a total of 18 MRS studies using the top 7 eigen values. Table 1(b). Average CaP detection Sensitivity and Specificity results of C-LLE compared to LLE for dimensions 3, 4 and 5.

Example 3

Multi-Modal Prostate Segmentation Scheme by Combining Spectral Clustering and Active Shape Models In many CAD systems, segmentation of the object of interest is a necessary first step, yet segmenting the prostate from in vivo MR images is a particularly difficult task. The prostate is especially difficult to see in in vivo imagery because of poor tissue contrast on account of MRI related artifacts such as background inhomogeneity. While the identification of the prostate boundary is critical for calculating the prostate volume, for creating patient specific prostate anatomical models, and for CAD systems, accurately identifying the prostate boundaries on an MR image is a tedious task, and manual segmentation is not only laborious but also very subjective.

Previous work on automatic or semi-automatic prostate segmentation has primarily focused on TRUS images. Only a few prostate segmentation attempts for MR images currently exist. Segmenting prostate MR images was suggested, based on nonrigid registration, where they register a series of training 'atlas' images to the test image, and the set of atlas images are chosen that best match (based on mutual information) the test image. The selected atlas images are then averaged to achieve a segmentation of the prostate in the test image. A 3D method for segmenting the prostate and bladder simultaneously was suggested to account for inter-patient variability in prostate appearance. A major limitation with previous prostate segmentation attempts is that the prostate varies widely between patients in size, shape, and texture.

A popular segmentation method is the Active Shape Model (ASM), a statistical scheme first developed in the mid-90's. ASMs use a series of manually landmarked training images to generate a point distribution model, and principal component analysis is performed on this point distribution model to generate a statistical shape model. Then, the Mahalanobis distance (MD) between possible gray values and the mean gray values (determined from the training images) is minimized to identify the boundary of an object. The MD is a statistical measurement used to determine similarity between sets, and is valid as long as the gray values of the training data have a normal distribution. At this point, the shape model is deformed to best fit the boundary points, and the process is repeated until convergence. While ASMs have been used for different applications, results of prostate segmentation yielded highly variable results, with overlap coefficients ranging from about 0.15 to about 0.85. One of the main shortcomings of the ASM is that it requires careful initialization. This is usually done by manual intervention, which can be tedious, and subject to operator variability. Another method is to start at a very low resolution of the image, overlay the starting shape on it, and then increase the resolution, performing the segmentation at each resolution. While this can work, it is not always guaranteed to work. Also, since the object of interest could be anywhere in the image, very computationally expensive searches could be required for initialization, contributing to a slow overall convergence time. One such search used a shape-variant Hough transform to initialize the segmentation. A highly promising segmentation scheme which searches the entire image was suggested, yet it was stated that properly initialized regions of interest (ROIs), such as those described in the examples provided herein, would greatly improve their algorithm's efficiency. Another limitation of ASMs lies with the inherent limitations in using the MD to find the object of interest. Normally, the point with the minimum MD between its surrounding gray values and the mean gray values is assumed to lie on the border of the object. To compute the MD, a covariance matrix of the training gray values is constructed during the training phase, and the MD calculation uses the inverse of that covariance matrix. However, if the covariance matrix is sparse, then the inverse matrix will be undefined, and consequently the MD will be undefined. If the number of pixels sampled is greater than the number of training images, the covariance matrix will become sparse. For example, at least 225 training images would be required to sample a 15×15 window of gray values. Therefore, either having limited training data or attempting to sample a large number of pixels would prove problematic. Also, the MD assumes that the texture training data has an underlying Gaussian distribution, which is not always guaranteed.

This novel, fully automated prostate segmentation scheme integrates spectral clustering and ASMs consists of an algorithm comprising 2 distinct stages: spectral clustering of MRS data, followed by an ASM scheme. For the first stage, non-linear dimensionality reduction is performed, followed by hierarchical clustering on MRS data to obtain a rectangular Region of Interest (ROI), which will serve as the initialization point for an ASM.

Several non-linear dimensionality reduction techniques were explored, and graph embedding was decided upon to transform the multi-dimensional MRS data into a lower-dimensional space. Graph embedding is a non-linear dimensionality reduction technique in which the relationship between adjacent objects in the higher dimensional space is preserved in the co-embedded lower dimensional space. By clustering of metavoxels in this lower-dimensional space, non-informative spectra can be eliminated. This dimensionality reduction and clustering is repeated hierarchically to yield a bounding box encompassing the prostate. In the second stage, the prostate bounding box obtained from the spectral clustering scheme serves as an initialization for the ASM, in which the mean shape is transformed to fit inside this bounding box. Nearby points are then search to find the prostate border, and the shape is updated accordingly. The afore-mentioned limitations of the MD led to the use of mutual information (MI) to calculate the location of the prostate border. Given two images, or regions of gray values $T_1$ and $T_2$, the MI between $T_1$ and $T_2$ is an indication of how well the gray values can predict one another. It is normally used for registration and alignment tasks, but in this Example, MI is used to search for the prostate boundary. For each training image, a window of intensity values surrounding each manually landmarked point on the prostate boundary is taken. Then those intensity values are averaged to calculate the mean 'expected' intensity values. The idea behind the method is that if a pixel lies on the prostate border, then the MI between its surrounding gray values the mean intensity values of the border will be maximum. The advantages of using MI over MD are the following: (1) the number of points sampled is not dependent on the number of training images, and (2) MI does not require an underlying Gaussian distribution, as long as the gray values are predictive of one another. Finally, once a set of pixels presumably located on the prostate border are determined (henceforth referred to as 'goal points'), the shape is updated to best fit these goal points. A weighting scheme is introduced for fitting the goal points. The goal points are weighted using two values. The first value is the normalized MI value. MI is normalized by the Entropy Correlation Coefficient (ECC), which rescales the MI values to be between 0 and 1. The second weighting value is how well the shape fit each goal point during the previous iteration, which is scaled from 0 to 1. This is termed the 'outlier weight,' where if the shape model couldn't deform close to a goal point, it is given a value close to 0, and if the shape model was able to deform close to a goal point, it is given a value close to 1. These two terms are multiplied together to obtain the final weighting factor for each landmark point. It's important to note that as in traditional ASM schemes, the off-line training phase needs to only be done once, while the on-line segmentation is fully automated.

The primary contributions and novel aspects of this work are:
  A fully automated scheme, by performing spectral clustering on MRS data to obtain a bounding box, used to initialize an ASM search.
  Using MI instead of MD to find points on the prostate border.
  Using outlier distances and MI values to weight the landmark points.

Finally, an exhaustive evaluation of the model via randomized cross validation is performed to assess segmentation accuracy against expert segmentations. In addition, model parameter sensitivity and segmentation efficiency are also assessed.

System Overview

Notation

A spectral scene $\hat{C}=(\hat{C}, \hat{f})$ is defined, where $\hat{C}$ is a 3D grid of metavoxels. For each spatial location $\hat{c} \in \hat{C}$ there is an associated 256-dimensional valued spectral vector $\hat{F}(\hat{c})=[\hat{f}_j(\hat{c}) | j \in \{1, \ldots, 256\}]$, where $\hat{f}_j(\hat{c})$ represents the concentration of different biochemicals (such as creatinine, citrate, and choline). The associated MR intensity scene $C=(C, f)$ is defined, where C represents a set of spatial locations, and $f(c)$ represents a function that returns the intensity value at any spatial location $c \in C$. It's important to note that the distance between any two adjacent metavoxels $\hat{c}, \hat{d} \in \hat{C}$, $\|\hat{c}-\hat{d}\|$, (where $\|\cdot\|$ denotes the $L_2$ norm) is roughly 16 times the distance between any two adjacent spatial voxels $c, d \in C$. A $\kappa$-neighborhood centered on $c \in C$ is defined as $N_\kappa(c)$ where for $\forall d \in N_\kappa(c)$, $\|d-c\| \leq \kappa$, $c \notin N_\kappa(c)$. In addition, the set of pixel intensities for the $\kappa$-neighborhood centered on c is defined as $F_\kappa(c)=[f(d) | d \in N_\kappa(c)]$. Finally, for any set C, $|C|$ is defined as the cardinality of C.

Data Description

The spectral datasets (consisting of both MRI and MRS data) used for the study were collected during the ACRIN multi-site trial (http://www.acrin.org/6659_protocol.html). All the MRS and MRI studies were 1.5 Tesla. The MRI studies were axial T2 images obtained from 19 patients. The 19 3D studies comprised a total of 148 image sections. These sections correspond to either the base, midgland, or apex of the prostate. Three distinct 2D ASM models were constructed, one each for the base, midgland, and apex. The ground truth was determined by manual outlining of the prostate border on each section by an expert radiologist.

Brief Outline of Methods

FIG. 24 illustrates the modules and the pathways comprising the automated segmentation system. The first step consists of performing non-linear dimensionality reduction (graph embedding) on spectra $\hat{F}(\hat{c})$ to embed these spectra non-linearly in a lower dimensional space. The embedded spectra, represented now as their corresponding dominant Eigenvectors, are clustered into clusters corresponding to informative (within or around the prostate) and non-informative spectra (background spectra lying outside the prostate). The spectra in the dominant, non-informative cluster are eliminated. This process repeats until a bounding box containing the prostate is obtained. At this point, the set of prostate training images are manually landmarked, from which the shape and intensity information is obtained. This landmarking can be done off-line, and only needs to be done once to construct a trained ASM model consisting of both shape and intensity information. The mean shape is then transformed to the bounding box previously obtained from the MRS data, which serves as the landmark points for the first iteration. Then, for each iteration, a technique maximizing MI is performed to find pixels on the prostate border. Finally, these landmarks are weighted, and the shape is updated to best fit the points on the border, yielding the next iteration's landmark points. The process is repeated until convergence is obtained, resulting in a segmentation of the prostate.

MRS Methodology

Non-Linear Dimensionality Reduction Via Graph Embedding

The spectra $\hat{F}(\hat{c})$, for $\hat{c} \in \hat{C}$, lie in a 256 dimensional space. Hence, the goal is to find an embedding vector $G(\hat{c})$ for $\forall \hat{c} \in \hat{C}$, and its associated class $\omega$ (informative or non-informative) such that if the distances between elements of $\omega$ are well preserved in the lower dimensional space. Hence if metavoxels $\hat{c}, \hat{d} \in \hat{C}$ both belong to class $\omega$, then $\|G(\hat{c})-G(\hat{d})\|$ should be small. To compute the optimal embedding, first a matrix $W \in \mathfrak{R}^{|\hat{C}| \times |\hat{C}|}$ is defined, representing the similarity between all objects in $\hat{C}$. For $\forall \hat{c}, \hat{d} \in \hat{C}$, W is defined as $$W(L(\hat{c}), L(\hat{d})) = e^{-\|\hat{F}(\hat{c})-\hat{F}(\hat{d})\|} \quad (55.11.1)$$

where $SL(\hat{c})$ represents a unique index position of $\hat{c}=(x, y, z)$ derived from its x, y, z coordinates in 3D space. The embedding vector G is obtained from the maximization of the function $$E_W(G) = 2\gamma \frac{G^T(D-W)G}{G^TDG}. \qquad (55.11.2)$$

where $\gamma=|\hat{C}|-1$. In addition, D is a diagonal matrix where for $\forall \hat{c} \in \hat{C}$, the diagonal element $L(\hat{c})$. $L(\hat{c}))$ is defined as $D(L(\hat{c}), L(\hat{c}))=\Sigma_{\hat{d}\in\hat{C}}W(L(\hat{c}), L(\hat{d}))$. The embedding space is defined by the Eigenvectors corresponding to the smallest $\beta$ Eigenvalues of $(D-W)G=\lambda DC$. A matrix $M \in \Re^{|\hat{C}|\times\beta}$ of the first $\beta$ Eigenvectors is constructed, and for $\forall \hat{c}\in\hat{C}$, $G(\hat{c})$ is defined as row $L(\hat{c})$ of M. $G(\hat{c})$ is therefore a vector consisting of element number $L(\hat{c})$ from each of the first $\beta$ Eigenvectors, which represents the $\beta$-dimensional Cartesian coordinates. The graph embedding algorithm is summarized below.

---
Algorithm GraphEmbedding
---

Input: $\hat{C}$, $\hat{F}(\hat{c})$ for $\forall \hat{c} \in \hat{C}$
Output: $G(\hat{c})$ for $\forall \hat{c} \in \hat{C}$
begin
  0. Define a unique element mapping L, where $1 \leq L(\hat{c}) \leq |\hat{C}|$ and $L(\hat{c}) \neq L(\hat{d})$ for $\forall \hat{c}, \hat{d} \in \hat{C}$;
  1. Define a $|\hat{C}| \times |\hat{C}|$ matrix W, where $W(L(\hat{c}), L(\hat{d})) = e^{||\hat{F}(\hat{c})-\hat{F}(\hat{d})||}$ for $\forall \hat{c}, \hat{d} \in \hat{C}$;
  2. Define a $|\hat{C}| \times |\hat{C}|$ matrix D, where each diagonal element has a value of $D(L(\hat{c}), L(\hat{c})) = \Sigma_{\hat{d}\in\hat{C}} W(L(\hat{c}), L(\hat{d}))$:
  3. Calculate the Eigenvalues and Eigenvectors of $(D - W)G = \lambda DG$;
  4. Construct a $|\hat{C}| \times \beta$ matrix M of the first $\beta$ Eigenvectors. where each column is an Eigenvector;
  5. For $\forall \hat{c} \in \hat{C}$, define the vector $G(\hat{c})$ as row $L(\hat{c})$ of M;
end Hierarchical Cascade to Prune Non-Informative Spectra At each iteration h, a subset of metavoxels $\hat{C}_h \subset \hat{C}$ is obtained by eliminating the non-informative spectra. The metavoxels $\hat{c} \in \hat{C}_h$, are aggregated into clusters $V_h^1, V_h^2, V_h^3$ by applying k-means clustering to all $\hat{c} \in \hat{C}_h$, in the low dimensional embedding $G_h(\hat{c})$. Initially, most of the locations $\hat{c} \in \hat{C}_h$, correspond to zero padded or non informative spectra. Therefore, while the unsupervised clustering results in 3 clusters, the dominant cluster (the cluster with the most number of elements) is non-informative and is eliminated. FIG. 25 represents a 16×16 MRS grid, superimposed on the corresponding T2 MR image. After the first iteration, the outer voxels containing zero padded spectra are removed, and the grid becomes an 8×16 grid. The scheme is recursed until a final set of metavoxels $\hat{C}_H$ is obtaining, serving as an ROI containing the prostate. While H can represent a constant number of iterations, the MR data actually contains the information about the size of the prostate, thereby allowing the desired value of $|C_H|$ to be known beforehand. The algorithm below describes precisely how the methodology works. Also note that while it is presented with a constant H as an input, it is readily extendable to include prior information about the desired value of $|\hat{C}_H|$.

---
Algorithm Hierarclust M RSprostate
---

Input: $\hat{F}(\hat{c})$ for $\forall \hat{c} \in \hat{C}$, H
Output: $\hat{C}_H$
begin
  0. Initialize $\hat{C}_0 = \hat{C}$;
  1. for h = 0 to (H - 1) do
  2.   Calculate $G_h(\hat{c})$ for $\forall \hat{c} \in \hat{C}_h$ as $G_h = \text{GraphEmbedding}(\hat{C}_h, \hat{F})$;
  3.   Apply k-means clustering on $G_h(\hat{c})$ for $\forall \hat{c} \in \hat{C}$ to obtain clusters $V_h^1, V_h^2, V_h^3$:

---
-continued

Algorithm Hierarclust M RSprostate
---

4.   Identify largest cluster $V_h^{max}$;
  5.   Create set $\hat{C}_{h+1} \subset \hat{C}_h$ by eliminating all $\hat{c} \in V_h^{max}$ from $\hat{C}_h$;
  6. endfor
end ASM Methodology Training the Shape Model and Expected Gray Values Step 1: The training phase begins by using training images of oblique axial slices and manually selecting M landmarks on the prostate boundary. The set of K training images is denoted as $S^t=\{C^\alpha | \alpha \in \{1, \ldots, K\}\}$. The apex and the 2 posterolateral-most points on the prostate are landmarked, and the remaining (M−3) landmarks are equally spaced between these landmarks. Therefore, each training image $C^\alpha \in S^t$ has a corresponding set of landmarks $X^\alpha \in C^\alpha$, where $X^\alpha = \{c_m^\alpha | m \in \{1, \ldots, M\}\}$, and where $c_m^\alpha = (x_m^\alpha, y_m^\alpha)$ denotes the coordinates of the $m^{th}$ landmark point in $C^\alpha$.

Step 2: These shapes are aligned using a modified Procrustes analysis. FIG. 26 shows the training landmark points before and after alignment. Once the training shapes have been aligned, the mean shape $\overline{X}$ is defined as $\overline{X}=\{\overline{c}_m | m \in \{1, \ldots, M\}\}$, where $$\overline{c}_m = (\overline{x}_m \cdot \overline{y}_m) \text{ and } \overline{x}_m = \frac{1}{K}\sum_\alpha x_m^\alpha \text{ and } \overline{y}_m = \frac{1}{K}\sum_\alpha y_m^\alpha.$$

Then, principal component analysis is performed, so that any valid prostate shape X can be represented as $$X=T(\overline{X}+P\cdot b) \qquad (66.11.1)$$

where T is an affine transformation mapping, b is the variable controlling the shape, and P is a matrix with each column representing an Eigenvector. Out of the M Eigenvectors, only the first z are needed to explain most (98%) of the training variation, where if $\lambda_r$ is the $r^{th}$ Eigenvalue, z is as small as possible such that $(\Sigma_{r=1}^z \lambda_r) \geq (0.98 \cdot \Sigma_{r=1}^M \lambda_r)$. Therefore, $|b|=z$, and P is a matrix consisting of only the first z Eigenvectors. In these experiments, valid prostate shapes are represented as vector b of length 18, with each element in b constrained between ±2.5 standard deviations, with one standard deviation for the $r^{th}$ element in b given as $\sqrt{\lambda_r}$.

Step 3: The mean gray values must now be calculated for each landmark point, which will represent the expected gray values for the prostate border. First, the $\kappa$-neighborhood centered on each $c_m^\alpha$ as $N_\kappa(c_m^\alpha)$ is taken, where $\alpha \in \{1, \ldots K\}$. Then, for $\forall d_u^\alpha \in N_\kappa(c_m^\alpha)$, the function $$\overline{f}(d_u) = \frac{1}{K}\sum_\alpha f(d_u^\alpha)$$

is defined where $u \in \{1, \ldots, |N_\kappa(c_m)|\}$ Finally, the expected gray values are defined as $\overline{g}_m = \overline{F}_\kappa(c_m)$ where $\overline{F}_\kappa(c_m) = [\overline{f}(d_u) | u \in \{1, \ldots |N_\kappa(c_m)|\}]$. This concludes the off-line training phase of the segmentation system, with the variables $\overline{X}$, P, and $\overline{g}_m$, $m \in \{1, \ldots, M\}$ comprising a trained ASM model.

Initializing the ASM and Using Mutual Information to Find the Prostate Border

At this point, a new image is defined, to search for the prostate as the scene C=(C, $f$) where C∈S'. The very first step of the system is to initialize the landmarks for the first iteration, $X^1$ (where $X^1 \subset C$). To do this, the smallest rectangle containing $\overline{X}$, shown in FIG. 26, has its corners aligned to the corners of the bounding box obtained from the MRS data. The scaling and translation transformations T used to align the two rectangles are applied to $\overline{X}$, yielding the initial landmark points as $X^1=T(\overline{X})$. FIG. 26 shows $X^1$ initialized to the MRS rectangle.

A set of points presumed to lie on the prostate border must now be calculated. For the $n^{th}$ iteration, the current landmark points $c_m^n$, m∈{1, ..., M} are denoted by the set $X^n$ and the set of points $\tilde{c}_m^n$, m∈{1, ..., M}} presumed to lie on the prostate border is denoted by the set $\tilde{X}^n$. The pixels surrounding each $\tilde{c}_m^n$, denoted as $N_\nu(\tilde{c}_m^n)$, are all possible locations for the prostate border. For $\forall c_j \in N_\nu(\tilde{c}_m^n)$, a set of nearby intensity values $F_\kappa(c_j)$ is compared with using mutual information (MI). One common way to calculate a normalized MI value is by calculating the Entropy Correlation Coefficient (ECC) between 2 sets of values. If a and b are 2 sets of intensity values, the normalized MI value between them is denoted as (a, b). The location $c_j$ with the highest mutual information (MI) value between $F_\kappa(c_j)$ and $\overline{g}_m$ is denoted as $\tilde{c}_m^n$. Therefore, the set of goal points is now defined as $\tilde{X}^n = \{\tilde{c}_m^n | m \in \{1, ..., M\}\}$ where $$\tilde{c}_m^n = \text{argmax}_{c_j}((F_\kappa(c_j), \overline{g}_m) \quad (66.22.1)$$

and $c_j \in N_\nu(c_m^n)$. FIG. 27 shows the MI values for each $c_j \in N_\nu(c_m^n)$ as pixel intensities, with the brightest pixel representing $\tilde{c}_m^n$. Ideally, $\tilde{c}_m^n$ (would lie exactly on the border of the prostate. It is important to note that the number of pixels sampled ($|F_\kappa|$ and $|\overline{g}_m|$) need not necessarily equal the number of pixels to search ($|N_\nu|$). In fact, the windows don't even have to be the shame shape, although for the purposes of the present Example, rectangles are consistently used, as seen in FIG. 25.

Updating the Shape $X^n$ must now be deformed to $\tilde{X}^n$. At this point a weighting scheme is introduced for updating the shape. The vector of weights is denoted as $\Gamma^n = \{\Gamma_m^n | m \in \{1, ..., M\}\}$, where each is a weight associated with the landmark point $c_m^n$. First, the MI values for each goal point $\tilde{c}_m^n \in \tilde{X}^n$ are compared to one another. The goal point with the highest MI value between $F_\kappa(\tilde{c}_m^n)$ and $\overline{g}_m$ is given a weight of 1, the goal point with the lowest MI value is given a weight of 0, and the remaining points are linearly rescaled to lie between 0 and 1. The reasoning is that a high normalized MI value indicates that the intensity values surrounding the goal point are highly predictive of the mean of the training data, and should be weighted heavily. After the first iteration, each MI weight value is multiplied by an 'outlier weight,' which is based on how well the shape model was able to deform to the goal points during the previous iteration. Each MI weight value is multiplied by a number between 0 and 1, which is calculated as a linear rescaling of $\|\tilde{c}_m^n - c_m^n\|^{-1}$. This product is the final weight for each landmark point, $\Gamma_m^n$. FIG. 27 shows several outlier weights where $\tilde{c}_m^{n-1}$ are shown as white diamonds and all $c_m^n$ are indicated by the white line. Most ASM systems don't allow the current iteration to deform completely to the goal points. Instead a choice was made to linearly rescale $\Gamma$ so that $\min_m(\Gamma)=0.25$ and $\max_m(\Gamma)=0.75$. This will prevent the shape model from completely fitting the goal points, as each landmark point can only possibly move between 25% and 75% the distance to its corresponding goal point. These numbers don't necessarily have to be 0.25 and 0.75, but an assessment was made and it was determined that these were reasonable constraints. Next, the landmarks $X^n$ are aligned to the goal points $\tilde{X}^n$ using affine transformations. This is done using a weighted Procrustes analysis, with the weight for the $m^{th}$ landmark defined as $\Gamma_m^n$, resulting in an affine transformation mapping T. However, only using a global affine transformation is not enough to optimally reach the goal points, which is why statistical shape models are generated. The shape parameter for the $n^{th}$ iteration is defined as $$b^n = \begin{cases} \emptyset & \text{if } n = 0, \\ b^{n-1} + P^{-1} \cdot dx & \text{if } n > 0, \end{cases} \quad (66.33.1)$$

where $dx = \{dx_m | m \in \{1, ..., M\}\}$ and $dx_m = \|\tilde{c}_m^n - T(c_m^n)\| \cdot \Gamma_m$, which allows the weights to be taken into account when updating the shape. Finally, the affine transformations T are applied to this new shape, yielding the next iteration's landmarks as $$X^{n+1} = T(\overline{X} + P \cdot b^n). \quad (66.33.2)$$

The system then repeats searching for new goal points and updating the shape, until the mean Euclidean distance between $X^n$ and $X^{n-1}$ is less than 0.2 pixels, at which time convergence is assumed.

Evaluation Methods

Once the final landmarks have been determined, this shape is compared to a manually outlined expert segmentation. The area based metrics used to evaluate the segmentation system are positive predictive value (PPV), specificity, sensitivity, and global overlap coefficient, with values closer to 1 indicating better results. The edge based metric used to evaluate the system are mean absolute distance (MAD) and Hausdorff distance, which are given in units of pixels with values closer to 0 indicating better results. To evaluate the system, the optimal parameters are first computed, which is followed by a randomized cross validation. To perform the cross validation, the variable q is allowed to represent the number of images to test with, and P is allowed to represent the total number of images in a certain group (either apex, midgland, or base). For each group, q images are randomly selected to test with, and generate an ASM model with (P−q) images. Averaging the metric results for those q images gives a set of mean values (μ) for sensitivity, specificity, overlap, PPV, MAD, and Hausdorff distance. This is repeated 50 times and the mean metric values ($\overline{\mu}$'s), and the standard deviations (σ's) are reported over the 50 iterations.

Parameter Selection and Sensitivity Analysis

To evaluate the system, the optimal parameter values must be computed. First, the search area ($N_\nu$) was set as a 15×3 rectangle, centered on the current landmark point and rotated to face in the normal direction of the shape at that point, as shown in FIG. 25. This was assumed to be large enough to encompass the prostate border given a decent initialization, without compromising computational costs. Using this search size, the best sampling sizes ($N_\kappa$) were determined for each group of images. For sampling, rectangles rotated in the same direction as the search rectangles were used. The parameters that were tested were the sampling rectangle's height and width, each varied between 1 and 50 pixels. The best sampling rectangle sizes were determined to be 7×13, 37×39, and 33×31 pixels for the base, midgland, and apex respectively. After performing the repeated segmentations with different sampling lengths and widths, a comparison was made of how many different values gave at least a minimum metric value, shown in FIG. 26. For example, 100% of the sampling sizes tested (y-axis) achieved sensitivity values of at least 0.60 x-axis), while only 3% of the sampling sizes (y-axis) achieved sensitivity values of at least 0.88 x-axis).

Once the optimal parameters were determined, the importance of a correct initialization was evaluated by randomly changing the initialization bounding box. Random ROIs were selected for initializing the ASM system, and these were compared to the ROIs obtained from the MRS data. FIG. 28 shows the effects of changing the initialization, where the distance between the corners of the MRS ROI and the random ROI is plotted on the x-axes. The downward slopes in FIG. 28 show that the segmentation becomes worse as the initial ROI is moved further away from the MRS box, suggesting that a proper initialization is vital for an accurate segmentation, and that the spectral clustering of MRS data can provide this required initialization.

Results and Discussion
Qualitative Results

Several qualitative results for the MRS initialization are shown in FIG. 27. In each of these images, the final bounding box from the MRS spectral clustering scheme is shown in white, overlaid on the original MR images. In all of the results, the bounding box obtained from MRS data accurately encompassed the prostate, validating the use of spectral clustering on MRS data for initializing a segmentation system. Qualitative results for the resulting segmentation are shown in FIG. 28. In these images, the ground truth (as determined by an expert) are shown in black, and the results from the automatic segmentation system are shown in white. The prostate images shown in FIG. 27 don't correspond to the prostate images in FIG. 31, but in both figures there is at least one image from the base, midgland, and apex.

Quantitative Results

Table 2 shows the results from the randomized cross validation. A confidence interval for the mean values was also calculated, which is derived from the Student's t-distribution and the standard error. So for any of the metric values, after repeating 50 times, the 99% confidence interval is given as $\bar{\mu} \pm 0.37870\sigma$. The images from the base had the best results, yielding sensitivity, specificity, overlap, and PPV values as high as 0.89, 0.86, 0.83, and 0.92 respectively, and MAD and Hausdorff distance as low as 2.6 and 8.2 pixels respectively. The apex, however, yielded the worst results due to high variability in appearance between images, as well as the close proximity to surrounding tissues. Also, since q represents the number of images to test with ($q \in \{3, 5, 10\}$), a higher value of q indicates less images to train with, which was shown to slightly decrease accuracy for each group. Finally, the PPV values were consistently the highest values, suggesting that the segmentations tended to have minimal false positive area.

Example 4

Multi-Attribute Non-Initializing Texture Reconstruction Based Active Shape Model (MANTRA)

The Active Shape Model (ASM) and Active Appearance Model (AAM) are both popular methods for segmenting known anatomical structures. The ASM algorithm involves an expert initially selecting landmarks to construct a statistical shape model using Principal Component Analysis (PCA). A set of intensity values is then sampled along the normal in each training image. During segmentation, any potential pixel on the border also has a profile of intensity values sampled. The point with the minimum Mahalanobis distance between the mean training intensities and the sampled intensities presumably lies on the object border. Finally, the shape model is updated to fit these landmark points, and the process repeats until convergence. However, there are several limitations with traditional ASMs with regard to image segmentation. (1) ASMs require an accurate initialization and final segmentation results are sensitive to the user defined initialization. (2) The border detection requires that the distribution of intensity values in the training data is Gaussian, which need not necessarily be the case. (3) Limited training data could result a near-singular covariance matrix, causing the Mahalanobis distance to not be defined.

Alternatives and extensions to the traditional ASM algorithm have been proposed. In an alternative classifier-based method Taylor-series gradient features are calculated and the features that improve classification accuracy during training are used during segmentation. Then, the classifier is used on the features of the test image to determine border landmark points. The classifier approach provides an alternative to the Mahalanobis distance for finding landmark points, but requires an offline feature selection stage. One segmentation algorithm presented implemented a multi-attribute based approach and also allowed for multiple landmark points to be incorporated; however, it still relies on the Mahalanobis distance for its cost function which is not be optimal under certain pertinent circumstances.

MANTRA differs from the traditional AAM in that AAMs employ a global texture model of the entire object, which is combined with the shape information to create a general appearance model. For several medical image tasks however, local texture near the object boundary is more relevant to obtaining an accurate segmentation instead of global object texture, and MANTRA's approach is to create a local texture model for each individual landmark point.

MANTRA comprises of a new border detection methodology, from which a statistical shapes model can be fitted.

| Group | q | Sensitivity | | Specificity | | Overlap | | PPV | | MAD | | Hausdorff | |
|---|---|---|---|---|---|---|---|---|---|---|---|---|---|
| | | $\bar{\mu}$ | $\sigma$ | $\bar{\mu}$ | $\sigma$ | $\bar{\mu}$ | $\sigma$ | $\bar{\mu}$ | $\sigma$ | $\bar{\mu}$ | $\sigma$ | $\bar{\mu}$ | $\sigma$ |
| Base | 3 | 0.892 | 0.048 | 0.863 | 0.056 | 0.826 | 0.036 | 0.924 | 0.035 | 2.625 | 0.599 | 8.192 | 1.912 |
| | 5 | 0.884 | 0.052 | 0.852 | 0.05 | 0.818 | 0.047 | 0.917 | 0.044 | 2.624 | 0.551 | 8.298 | 1.727 |
| | 10 | 0.883 | 0.031 | 0.855 | 0.032 | 0.815 | 0.028 | 0.92 | 0.024 | 2.804 | 0.371 | 8.791 | 1.074 |
| Midgland | 3 | 0.846 | 0.073 | 0.863 | 0.061 | 0.785 | 0.062 | 0.925 | 0.037 | 3.467 | 1.222 | 9.594 | 2.597 |
| | 5 | 0.872 | 0.038 | 0.864 | 0.045 | 0.81 | 0.034 | 0.926 | 0.029 | 3.012 | 0.641 | 9.008 | 1.646 |
| | 10 | 0.851 | 0.03 | 0.862 | 0.03 | 0.789 | 0.027 | 0.924 | 0.019 | 3.367 | 0.543 | 9.556 | 1.451 |
| Apex | 3 | 0.847 | 0.075 | 0.817 | 0.079 | 0.749 | 0.064 | 0.881 | 0.067 | 3.821 | 1.085 | 11.06 | 3.106 |
| | 5 | 0.824 | 0.056 | 0.823 | 0.059 | 0.733 | 0.05 | 0.887 | 0.046 | 3.927 | 0.758 | 11.06 | 1.863 |
| | 10 | 0.833 | 0.05 | 0.81 | 0.049 | 0.73 | 0.037 | 0.876 | 0.039 | 4.004 | 0.581 | 11.24 | 1.514 |

(a) Local Texture Model Reconstruction: To overcome the limitations associated with using the Mahalanobis distance, MANTRA performs PCA on pixel neighborhoods surrounding the object borders of the training images to create a local texture model for each landmark point. Any potential border landmark point of the test image has a neighborhood of pixels sampled, and the PCA-based local texture model is used to reconstruct the sampled neighborhood in a manner similar to AAMs. These training reconstructions are compared to the original pixels values to detect the object border, where the location with the best reconstruction is presumably the object border.

(b) Use of Multiple Attributes with Combined Mutual Information: Since mutual information (MI), a metric that quantifies the statistical interdependence of multiple random variables, operates without assuming any functional relationship between the variables, it is used as a robust image similarity measure to compare the reconstructions to the original pixel values. In order to overcome the limitations of using image intensities to represent the object border, 1st and 2nd order statistical features are generated from each training image. These features have were shown to be useful in both computer aided diagnosis systems and registration tasks. To integrate multiple image attributes, a Combined MI (CMI) is used, because of its property to incorporate non-redundant information from multiple sources, and its previous success in complementing similarity measures with information from multiple feature calculations. Since CMI operates in higher dimensions, histogram-based estimation approaches would become too sparse when more than 2 features are used. Therefore, the k nearest neighbor (kNN) entropic graph technique is used to estimate the CMI. The values are plotted in a high dimensional graph, and the entropy is estimated from the distances to the k nearest neighbors, which is subsequently used to estimate the MI value.

(c) Non-requirement of Model Initialization: Similarly to several other segmentation schemes, MANTRA is cast within a multi-resolution framework, in which the shape is updated in an iterative fashion and across image resolutions. At each resolution increase, the area of the search neighborhood decreases, allowing only fine adjustments to be made in the higher resolution. This overcomes the problem of noise near the object boundary and makes MANTRA robust to different initializations.

The experiments were performed on nearly 230 images comprising 3 MR protocols and 2 body regions. Three different 2D models were tested: MANTRA, the traditional ASM, and ASM+MI (a hybrid with aspects of both MANTRA and ASM). Quantitative evaluation was performed against expert delineated ground truth via 6 metrics.

Brief Overview of MANTRA

MANTRA comprises of a distinct training and segmentation step (FIG. 22).

Training

1. Select Landmark Points of object border on each training image.
2. Generate Shape Model Using PCA as in traditional ASMs.
3. Generate Texture Features: K statistical texture feature scenes are generated for each of the N training images, which include gradient and second order co-occurrence features.

Then, a neighborhood surrounding each landmark point is sampled from each of the K feature scenes for all N training images.

4. Generate Texture Model Using PCA: Each landmark point has K texture models generated by performing PCA on all N neighborhood vectors for each given feature.

Segmentation

5. Overlay Mean Shape on test image to anchor the initial landmark points.
6. Generate Texture Features: The same texture features used for training (gradient and second order co-occurrence are generated from the test image.
7. Reconstruct Patches Using Texture Model: A neighborhood is searched near each landmark point, and the search area size is inversely related to the resolution, so that only fine adjustments are made at the highest resolution. For any potential border landmark point, its surrounding values are reconstructed from the training PCA models.
8. Use kNN Entropic Graphs to Maximize CMI: kNN entropic graphs are used to estimate entropy, and then CMI. The location with the highest CMI value between its reconstructed values and its original values is the new landmark point.
9. Fit Shape Model To New Landmark Points: Once a set of new landmarks points have been found, the current shape is updated to best fit these landmark points, and constrained to +/−2.5 standard deviations from the mean shape. The resolution is then doubled at each iteration until convergence is obtained.

Methodology

Generating Texture Models

The set of N training images is defined as $S_{tr}=\{C^\alpha|\alpha\in\{1\ldots N\}\}$, where $C^\alpha=(C,f^\alpha)$ is an image scene where $C\in\Re^2$ represents a set of 2D spatial locations and $f^\alpha(c)$ represents a function that returns the intensity value at any $c\in C$. For $\forall C^\alpha\in S_{tr}$, $X^\alpha\subset C$ is a set of M landmark points manually delineated by an expert, where $X^\alpha=\{c_m^\alpha|m\in\{1,\ldots M\}\}$. For $\forall C^{\alpha\in S}{}_{tr}$, K features scenes $\mathcal{F}^{\alpha,k}=(C,f^{\alpha,k})$, $k\in\{1,\ldots,K\}$ are then generated. For implementation in the methods disclosed herein, the gradient magnitude, Haralick inverse difference moment, and Haralick entropy texture features are used. For each training image $C^\alpha$, and each landmark point $c_m^\alpha$, a $\kappa$-neighborhood $N_\kappa(c_m^\alpha)$ (where for $\forall d\in N_\kappa(c_m^\alpha)$, $\|d-c_m^\alpha\|_2\leq\kappa$, $c_m^\alpha\in N_\kappa(c_m^\alpha)$) is sampled on each feature scene $\mathcal{F}^{\alpha,k}$ and normalized. For each landmark point m and each feature k, the normalized feature values for $\forall d\in N_\kappa(c_m^\alpha)$ are denoted as the vector $g_m^{\alpha,k}=[f^{\alpha,k}(d)/\Sigma_d f^{\alpha,k}(d)|d\in N_\kappa(c_m^\alpha)]$. The mean vector for each landmark point m and each feature k is given as $$\bar{g}_m^k = \left[\frac{1}{N}\sum_\alpha f^{\alpha,k}(d)\,\bigg|\,\alpha\in\{1,\ldots,N\},\,d\in\mathcal{N}_\kappa(c_m^\alpha)\right]$$

and the covariance matrix of $g_m^{\alpha,k}$ over $\forall\alpha\in\{1\ldots N\}$ is denoted as $\phi_m^k$. Then, PCA is performed by calculating the Eigenvectors of $\phi_m^k$ and retaining the Eigenvectors that account for most (~98%) of the variation in the training data, denoted as $\Phi_m^k$.

Reconstructing Local Image Texture

We define a test image as the scene $C_{te}$, where $C_{te}\in S_{tr}$, and its corresponding K feature scenes as $\mathcal{F}^k$, $k\in\{1,\ldots,K\}$. The M landmark points for the current iteration j are denoted as the set $X_{tc}=\{c_m|m\in\{1\ldots,M\}\}$. A $\gamma$-neighborhood $N_\gamma$ (where $\gamma\neq\kappa$) is searched near each current landmark point $c_m$ to identify a landmark point $\tilde{c}_m$ which is in close proximity to the object border. For j=1, $c_m$ denotes the initialized landmark point, and for j≠1, $c_m$ denotes the result of deforming to $\tilde{c}_m$ from iteration (j−1) using the statistical shape model. For $\forall e \in N_\gamma(c_m)$, a κ-neighborhood $N_\kappa(e)$ is sampled on each feature scene $\mathcal{F}^k$ and normalized, denoted as the vector $g_e^k = \{f^k(d)/\Sigma_d f^k(d) | d \in N_\kappa(c)\}$. Then, for each e (which is a potential location for $\tilde{c}_m$), the K vectors $g_e^k$, k∈{1, ..., K} are reconstructed from the training PCA models, where the vector of reconstructed pixel values for feature k is given as $$R_e^k = \bar{g}_m^k + \Phi_m^k \cdot (\Phi_m^k)^T \cdot (g_e^k - \bar{g}_m^k). \quad (7.2.1)$$

Identifying New Landmarks in 3 Models: ASM, ASM+MI, and MANTRA

We wish to compare three different methods for finding new landmark points. The first is the traditional ASM method, which minimizes the Mahalanobis distance. The remaining 2 methods utilize the Combined Mutual Information (CMI) metric to find landmark points. The MI between 2 vectors is a measure of how predictive they are of each other, based on their entropies. CMI is an extension of MI, where 2 sets of vectors can be compared intelligently by taking into account the redundancy between the sets. For 2 sets of vectors $\{A_1 \ldots A_n\}$ and $\{B_1 \ldots B_n\}$, where each A and B is a vector of the same dimensionality, the MI between them is given as $I(A_1 \ldots A_n, B_1 \ldots B_n) = H(A_1 \ldots A_n) + H(B_1 \ldots B_n) - H(A_1 \ldots A_n B_1 \ldots B_n)$ where H denotes the joint entropy. To estimate this joint entropy, k-nearest-neighbor (kNN) entropic graphs are used, where H is estimated from average kNN distance 1. ASM: To use the Mahalanobis distance with features, the Mahalanobis distance is averaged for each feature, which yields the $m^{th}$ landmark point of the ASM method as $$\tilde{c}_m = e \in \mathcal{N}_\alpha(c_m) \frac{1}{K} \sum_{k=1}^{K} [(g_e^k - \bar{g}_m^k)^T \cdot (\varphi_m^k)^{-1} \cdot (g_e^k - \bar{g}_m^k)]. \quad (7.3.1)$$

2. MANTRA: The MANTRA method maximizes the CMI between the reconstructions and original vectors to find landmark points, so that the $m^{th}$ landmark point is given as $$\tilde{c}_m = e \in N_\gamma(c_m) I(R_e^1 \ldots R_e^K, g_e^1 \ldots g_e^K). \quad (7.3.2)$$

3. ASM+MI: Finally, to evaluate the effectiveness of using the reconstructions, the ASM+MI method maximizes the CMI between $g_c$ and $\bar{g}_m$ instead of between $g_e$ and $R_e$, so that the $m^{th}$ landmark point is defined as $$\tilde{c}_m = e \in N_\gamma(c_m) I(\bar{g}_m^1 \ldots \bar{g}_m^K, g_e^1 \ldots g_e^K). \quad (7.3.3)$$

Results

The data consisted of 128 1.5 Tesla (T), T2-weighted in vivo prostate MR slices, 21 3T T1-weighted DCE in vivo prostate MR slices, and 78 1.5T T1-weighted DCE MR breast images. To evaluate the methods, a 10-fold cross validation was performed on each of the datasets for the MANTRA, ASM+MI, and ASM methods, in which 90% of the images were used for training, and 10% were used for testing, which was repeated until all images had been tested.

Quantitative Results

For nearly 230 clinical images, MANTRA, ASM, and ASM+MI were compared against expert delineated segmentations (Expert 1) in terms of 6 error metrics, where PPV and MAD stand for Positive Predictive Value and Mean Absolute Distance respectively. The segmentations of an experienced radiologist (Expert 1) were used as the gold standard for evaluation. Also shown in Table 1 is the segmentation performance of a radiologist resident (Expert 2) compared to Expert 1. Note that MANTRA performs comparably to Expert 2, and in 78% of the 18 scenarios (6 metrics, 3 tests), MANTRA performs better than ASM and ASM+MI. The scenarios in which it failed (specificity and PPV of the prostate) did not take into account false negative area. Using the proposed ASM+MI algorithm performed better than the ASM method but worse than the MANTRA method, suggesting that MI is a more effective metric than the Mahalanobis distance for border detection, but also justifying the use of the reconstructions in MANTRA. In addition, using statistical texture features improved the performance of all results, showing the effectiveness of the multi-attribute approach. For breast segmentation task, all 3 methods performed equivalently, indicating that the new method is as robust as the traditional ASM method in segmenting a variety of medical images.

TABLE 3

Quantitative results for all test performed (ASM, ASM + MI, MANTRA) as mean ± standard deviation.

| Object | Method | Overlap | Sensitivity | Specificity | PPV | MAD | Hausdorff |
|---|---|---|---|---|---|---|---|
| Prostate | MANTRA | .752 ± .118 | .880 ± .115 | .765 ± .131 | .849 ± .113 | 4.3 ± 2.1 | 11.6 ± 5.0 |
| with | ASM + MI | .731 ± .128 | .831 ± .130 | .813 ± .151 | .879 ± .139 | 4.5 ± 2.2 | 12.3 ± 5.8 |
| Intensities | ASM | .668 ± .165 | .737 ± .187 | .855 ± .149 | .903 ± .134 | 5.6 ± 3.1 | 13.7 ± 6.8 |
| Prostate | MANTRA | .840 ± .096 | .958 ± .041 | .784 ± .098 | .873 ± .106 | 2.6 ± 1.1 | 8.1 ± 3.3 |
| with | ASM + MI | .818 ± .094 | .925 ± .055 | .796 ± .113 | .881 ± .111 | 2.9 ± 1.2 | 8.7 ± 3.4 |
| Features | ASM | .766 ± .144 | .814 ± .163 | .888 ± .087 | .933 ± .099 | 3.6 ± 1.9 | 10.0 ± 3.8 |
| Prostate | Expert 2 | .858 ± .101 | .961 ± .089 | .778 ± .119 | .886 ± .083 | 2.4 ± 1.7 | 7.7± |
| Breast | MANTRA | .925 ± .102 | .952 ± .102 | .935 ± .044 | .970 ± .022 | 4.9 ± 6.7 | 16.3 ± 11.6 |
|  | ASM + MI | .925 ± .098 | .954 ± .098 | .930 ± .042 | .968 ± .021 | 4.9 ± 6.6 | 16.6 ± 11.3 |
|  | ASM | .924 ± .104 | .952 ± .104 | .934 ± .041 | .970 ± .020 | 5.0 ± 7.1 | 16.9 ± 12.3 |

Qualitative Results

In FIG. 23 are shown the results of qualitatively comparing the ground truth in the first column, MANTRA in the second column, ASM+MI in the third, and ASM in the fourth. Rows 1 and 2 show the results of the models on 1.5T T2-weighted prostate slices, row 3 shows 3T T1-weighted prostate slices results, and finally row 4 shows 1.5T DCE breast results. In all the cases, the MANTRA segmentation is most similar to the ground truth segmentation. The false edges that sometimes cause the models to deviate from the true prostate edge can be seen in FIG. 23, as well as situations in which the lack of a clear prostate edge at the top prevents the ASM+MI and ASM from finding the correct object border.

Example 4

A Boosted Ensemble Scheme for Accurate Landmark Detection for Active Shape Models Many segmentation algorithms are derivatives of the popular Active Shape Model (ASM) segmentation system, which were previously (Example 1-3 e.g.) used to segment prostate MR images. ASM systems start with an initial shape defined by landmarks, to and then find new landmarks for which to update the shape. The new landmarks are found by minimizing the Mahalanobis distance metric between the testing and training intensity values. However, this is by no means a solved problem, as many times the point with the minimum Mahalanobis distance is not actually the object border. This can be caused by a non-Gaussian distributions of intensity values, or artifacts such as bias field (in MR images) and intensity inhomogeneities. Recently, segmentation algorithms have begun to incorporate multiple statistical texture features to overcome problems with using intensities. One example is ASM with Optimal Features (ASMOF), in which the new landmark points are identified by classifying pixels as inside or outside the object border, and finding features which most accurately perform this classification. This bypasses the requirement of using the Mahalanobis distance completely. Another system is "Minimal shape and intensity cost path segmentation", which combines the Mahalanobis distance of multiple features and finds the set of landmarks that best match the expected shape of the object. Here select feature ensembles for different regions of the object boundary are selected based on the Adaboost feature selection algorithm. This allows each section of the object boundary to have its own unique strong classifier. Adaboost intelligently selects features based on the types of errors they make and combine several weak classifiers to create a unified strong classifier. For example, if 2 features don't do well individually, but complement each other well by performing different errors, they will be chosen by Adaboost.

Methodology:

There is a distinct offline training phase and an online testing phase, which are outlined below.

1. Training (Offline):
   (a) Feature Extraction:
   K statistical texture features are generated for each of the N training images. For implementation here, first and second order statistical texture features such as mean, median, Sobel gradient, and Haralick entropy were used.
   (b) Building Boosted Ensembles for Each Landmark:
   Given a set of M ground truth landmarks $X^{GT}=\{c_i^{GT}|i\in\{1,\ldots,M\}\}$, $c\in R^2$, each feature $k\in\{1,\ldots,K\}$ has a set of "new" landmark points $X^k=\{c_i^k|i\in\{1,\ldots,M\}\}$, where each $c_i^k$ is the location with the minimum Mahalanobis distance to the training data in the same manner as traditional ASM's, but using feature k instead of intensities. Only 15 pixels on either side of $c_i^{GT}$ are searched, so that $\|c_i^k-c_i^{GT}\|_2 \leq 15$. For all N training images and all K features, $\|c_i^k-c_i^{GT}\|_2$ is calculated and used to create the classification function $$B_k(c_i)=\{1 \text{ if } \|c_i^k-c_i^{GT}\|_2<7.5 \text{ 0 if } \|c_i^k-c_i^{GT}\|_2>7.5\}$$

which is used to quantify if, for a given landmark point, feature k properly classified the current training image. This classification function is used by the Adaboost algorithm to determine a weight $\alpha_i^k$ for each feature and each landmark. This is done by first selecting the feature with the highest classification accuracy for a given landmark (the most number of training images correctly classified). Then, the training images that feature 1 incorrectly classified are weighted more heavily, so that the next selected feature will be one that correctly classifies landmarks that feature 1 couldn't properly classify. This yields a set of features and corresponding weights.

2. Testing (Online)
   (a) Eature Extraction
   The K statistical texture features are generated from the test image.
   (b) Use Previously Obtained Boosted Ensembles to Detect Landmarks
   Given a set of landmark points for the current iteration, $X=\{c_i|i\in\{1,\ldots,M\}\}$, a set of new landmark points are calculated from each feature $X^k=\{c_i^k|i\in\{1,\ldots,M\}\}$ by using th\at feature in the Mahalanobis distance minimization.
   (c) Update Cartesian Coordinates to Determine New Landmark Point
   The Cartesian coordinates $c_i^k$ are weighted based on the $\alpha$ values, so that the new set of landmark points are given as $X^{new}=\{d_i|i\in\{1,\ldots,M\}\}$ where $d_i=[\Sigma_k(c_i^k\cdot\alpha_i^k)]/[\Sigma_k(\alpha_i^k)]$ as shown below.

Results:

Shown in FIG. 32 are the results from the landmark detection test. A is randomized 10-fold cross validation was performed by training with 90% of the data. the data consisted of 128 prostate MR images, with an expert radiologist providing the ground \truth. 15 pixels were searched in either direction from the ground truth landmark, and a "new" landmark was found for one iteration. Ideally, this new landmark would be exactly the location of the ground truth landmark, but as can be seen in FIG. 31, only the Adaboost method achieved reasonable results. In addition, the 2 histograms of the methods' results are shown in FIGS. 33 and 34. FIGS. 32 and 35 show the quantitative and qualitative result respectively from an actual segmentation task (not one iteration). For the segmentation task, all shape models were initialized at the ground truth, and the 2 methods were compared to see which diverged less from the initialization. Also, a second expert's segmentations were compared to the ground truth landmarks to demonstrate the difficulty of the task at hand and the high inter-expert variability. Finally, Table 1 compares the efficiency of the 2 methods, as the new Adaboost method is much more complex than the traditional method. It can be seen that the new method takes longer overall, but converges in fewer iterations.

TABLE 1

Efficiency comparison between traditional and boosted ensemble schemes for finding landmarks:

|  | Traditional | Adaboosted |
|---|---|---|
| Feature Extraction | n/a | 61 sec. |
| Time per iteration | 0.5 sec. | 2.5 sec. |
| Mean Iterations To Convergence | 29 iterations | 17 iterations |
| Total Time | 14.5 sec. | 103 sec. |

Example 5

A Consensus Embedding Approach for Segmentation of High Resolution in Vivo Prostate Magnetic Resonance Imagery The use of computer aided diagnosis (CAD) schemes for early detection and classification of CaP has recently been explored. A novel supervised CAD scheme for detection of CaP from 4 T ex vivo prostate MRI was presented (See e.g. Examples herein). A weighted feature ensemble scheme was used to integrate multiple 3D texture features to generate a likelihood scene in which the intensity at every spatial location corresponded to the probability of cancer being present. Improvements to the method via use of non-linear dimensionality reduction (graph embedding) and multiple classifier systems are reported herein. A multimodal statistical classifier was suggested, which integrated texture features from multi-protocol 1.5 T in vivo MRI to generate a statistical probability map representing likelihoods of cancer for different regions within the prostate was presented. Area under the Receiver-Operating Characteristic (ROC) curve (AUC) was used to estimate the classifier accuracy. A maximum AUC of 0.839 was reported.

In this example a novel unsupervised scheme is presented to segment different regions within 1.5 T endorectal in vivo MR prostate imagery. First corrections for MR related artifacts, bias field inhomogeneity ITK and intensity non-standardness are made. This is followed by extraction of over 350 3D texture features at every spatial location within the MRI image. These features have been previously shown to be able to differentiate cancerous and non-cancerous regions. To avoid the curse of dimensionality associated with high dimensional feature spaces, the textural data at every spatial location is projected non-linearly into a lower dimensional space where the objects (MR voxels in this case) can be clustered into distinct classes. Due to inherent non-linearities in biomedical data, linear dimensionality reduction schemes such as Principal Component Analysis (PCA) have been shown to perform poorly compared to non-linear dimensionality reduction (NLDR) schemes such as Locally Linear Embedding (LLE) and Graph Embedding (GE) in unraveling object clusters while preserving class relationships.

While the group has had success in the use of NLDR for the automated classification of prostate magnetic resonance spectroscopy (MRS) data as well as protein and gene expression data, methods such as LLE and GE are sensitive to the choice of parameters. NLDR schemes attempt to preserve geodesic distances between objects from the high- to the low-dimensional spaces unlike PCA which preserves Euclidean distances. Methods such as LLE estimate object distances by assuming that within a small local neighborhood objects are linearly related. The geodesic estimate is thus a function of the size of the neighborhood within which local linearity is assumed. These NLDR schemes are also sensitive to the high dimensional feature space within which geodesic distances are computed since relative object adjacencies may change from one feature space to another. As an example, consider a feature vector $F_1(u)$ associated with each object u in a set C. Let the lower dimensional co-ordinates of three objects u, v, w∈C, based on $F_1$, be given by $X_1(u)$. $X_1(v)$. $X_1(w)$, where $X_1$ is the principal Eigenvector obtained via application of NLDR to $F_1$. Let's assume that of the 3 objects, u, v. belong to class $\omega_1$ while w belongs to class $\omega_2$. Assuming that the data has been properly projected into the lower dimensional space, then it should follow that $\|X_1(u)-X_1(v)\|_2 < \|X_1(u)-X_1(w)\|_2$, where $\|\cdot\|_2$ represents the Euclidean norm. Note that the above is true only if $F_1$ accurately encapsulates the class related information regarding u, v, w∈C. However, this may not hold for another feature set $F_2$ which on account of noisy or missing attributes may result in low dimensional projections in $X_2$ such that $\|X_2(u)-X_2(v)\|_2 > \|X_2(u)-X_2(w)\|_2$. In order to represent the true relationship between u, v, w, the adjacency between objects in these lower dimensional embedding spaces is then represented as a function of the distance between the objects along the lower-dimensional manifold. In this Example a scheme is disclosed, wherein multiple such representations are combined to obtain a stable embedding representing the true class relationship between objects in high dimensional space. Analogous to classifier ensemble schemes for creating strong stable classifiers by combining multiple weak unstable classifiers with large bias and variance, the consensus embedding scheme will yield a more stable data embedding by reducing the variance in the individual embedding spaces. This is done by computing a consensus distance matrix W which reflects the averaged relative object adjacencies between u, v, w∈C in multiple low dimensional data projections. Multidimensional scaling (MDS) is applied to W to obtain the final stable data embedding. Consensus clustering is then applied to segregate objects into distinct categories in an unsupervised fashion. FIG. 7 illustrates the main steps in the system as a flowchart.

Experimental Design

Data Description and Notation

A total of 18 1.5 T in vivo endorectal MRI and MRS datasets were collected from the American College of Radiology Imaging Network (ACRIN) multi-site prostate trial[2]. For each patient, MRI data (T2 imaging protocol) was acquired prior to radical prostatectomy. Following resection, the gland was quartered and stained. These sections were then manually examined for CaP to constitute the ground truth on histology. These regions were then manually mapped onto the MRI images to estimate CaP presence and extent.

We define a 3D MRI scene C=C, $f$) where C is a set of spatial locations $c_i \in C$, i∈{1 ... |C|}, |C| is the cardinality of any set C and $f(c)$ is a function that assigns an intensity value to every c∈C. This 3D image at MRS metavoxel resolution is defined as $\hat{C}=(\hat{C}, \hat{f})$, where $\hat{C}$ is a 3D grid of metavoxels at locations $\hat{c}_j \in \hat{C}$, i∈{1, ... |$\hat{C}$|}. It is important to note that the distance between any two adjacent metavoxels $\hat{c}_i$. $\hat{c}_j \in \hat{C}$, $\|\hat{c}_i-$ $\hat{c}_j\|_2$, (where $\|\cdot\|2$ denotes the $L_2$ norm) is roughly 16 times the distance between any two adjacent voxels $c_i$, $c_j \epsilon C$. Accordingly $\hat{f}(\hat{c}_i)$, $\forall \hat{c}_i \epsilon \hat{C}$ is defined.

Determination of Approximate Ground Truth for CaP on MRI

Partial ground truth for the 1.5 T MR datasets in the ACRIN database is available in the form of approximate sextant locations and sizes of cancer for each dataset as described previously. In the previous Examples, an algorithm for the registration of ex vivo MRI and whole-mount histological (WMH) images were developed for accurate mapping of the spatial extent of CaP from WMH sections onto MRI. However most of the histology data in the ACRIN study are not WMH, but small sections of the gland which makes it difficult for them to be reconstituted into WMH sections. Hence the CaP ground truth estimate on the MRI sections is obtained in the following manner. The MR image of the prostate is visually divided into two lateral compartments: Left (L) and Right (R); and further divided into 3 regions longitudinally: Base (B), Midgland (M) and Apex (A). Presence of CaP (potential cancer space) has been previously determined in one or more of these six regions: Left Base (LB), Left Midgland (LM), Left Apex (LA), Right Base (RB), Right Midgland (RM) and Right Apex (RA) via manual mapping of CaP from histology onto the corresponding MRI sections. The maximum diameter of the tumor is also recorded in each of the 6 candidate locations and is denoted as MaxDiameter. The total number of possible cancer voxels $c \epsilon C$ at the MR voxel resolution within the cancer space is given as:

$$No. \text{ of candidate slices} \times \left\lceil \frac{MaxDiameter^2}{\Delta x \Delta y} \right\rceil,$$

where [ ] refers to the ceiling operation and $\Delta x$, $\Delta y$ refer to the dimensions of the MR voxel c in the X and Y dimensions. Similarly, the number of possible cancer metavoxels $\hat{c} \epsilon \hat{C}$ at the MRS metavoxel resolution was calculated as:

$$No. \text{ of candiate slices} \times \left\lceil \frac{MaxDiameter^2}{\Delta \hat{x} \Delta \hat{y}} \right\rceil,$$

where $\Delta \hat{x}$, $\Delta \hat{y}$ refer to the dimensions of the MRS metavoxel $\hat{c}$ in the X and Y dimensions. Note that the exact spatial location of CaP voxels on a particular slice is not available, only the size and sextant within which it occurs. This potential cancer space nonetheless serves as a basis to perform a semi-quantitative evaluation of the CAD scheme.

Correcting Bias Field and Non-Linear MR Image Intensity Artifacts

Image intensity variations due to radio frequency (RF) field inhomogeneities may be caused due to a number of different factors including poor RF field uniformity, static field inhomogeneity and RF penetration. The ITK toolkit's BiasCorrector algorithm was used to correct the original 3D MR scenes for bias field inhomogeneity and an interactive version of the image intensity standardization algorithm previously presented to correct for non-linearity of image intensities. FIGS. 8(d), (e), (f) shows the results of these pre-processing steps on a sample MR slice. FIG. 8(e) shows the effect of bias field correction on FIG. 8(d). FIG. 8(f) then shows the effect of intensity standardization on the slice shown in FIG. 8(e).

Image intensity standardization is a post-MR acquisition processing operation designed for correcting inter-acquisition signal intensity variations (non-standardness). Such grayscale intensities do not have a fixed tissue-specific meaning within the same imaging protocol, the same body region, or even within the same patient. When the histograms for different prostate studies (in different colors) are plotted together (as seen in FIG. 8(a)) the intensity distributions have different intensity ranges and are not in alignment. To lend meaning to corresponding gray values in the MR images their intensity scales was non-linearly mapped to a common scale, known as the standard scale. This is done by choosing one of the datasets to be the standard image; the intensity profile of this dataset is then used as the standard intensity scale. Landmarks are first manually identified on the intensity histograms for each of the studies (FIG. 8(a)). These landmarks are then non-linearly mapped to corresponding landmarks manually identified on the standard intensity scale shown in black on FIG. 8(c). Note that this process is different from simple linear scaling of image intensities which does not address the non-standardness issue (FIG. 8(b)).

Note that before intensity standardization as well as for the result of the linear technique, the intensity histograms are misaligned (FIG. 8(a),(b)), but are correctly aligned (FIG. 8(c)) after intensity standardization.

Feature Extraction

Over 350 3D texture feature scenes, corresponding to three different texture classes were extracted from each MRI scene. These feature representations were chosen since they have been demonstrated to be able to discriminate between the cancer and non-cancer classes. The feature scenes $\mathcal{F}_u = (C, f_u)$ for each C are calculated by applying the feature operators $\Phi_u$, $u \epsilon \{1, \ldots, 373\}$ within a local neighborhood associated with every $c \epsilon C$. Hence $f_u(c)$ is the feature value associated with feature operator $\Phi_u$ at voxel c. Therefore, it is possible to define a feature vector associated with each $c \epsilon C$ as $F(c) = [f_u(c) | u \epsilon \{1, \ldots 373\}]$. A $\kappa$-neighborhood centered on $c_i \epsilon C$ as $N_\kappa(c_i)$ is defined, where $\Lambda c_j \epsilon N_\kappa(c_i)$, $\|c_j - c_i\| \leq \kappa$, $i, j \epsilon \{1, \ldots, |C|\}$, $c_i \not\epsilon N_\kappa(c_i)$. Similarly, a $\kappa$-neighborhood $N_\kappa(\hat{c}_i)$ for $\hat{c}_i \epsilon \hat{C}$ is defined, where $\Lambda c_j \epsilon N_\kappa(\hat{c}_i)$, $\|c_j - \hat{c}_i\| \leq \kappa$, $\hat{i} \epsilon \{1, \ldots, |\hat{C}|\}$, $j \epsilon \{1, \ldots, |C|\}$, $c_j \neq \hat{c}_i$. Based on the definition provided herein for a metavoxel, it is possible to similarly define a feature attribute for each metavoxel $\hat{c} \epsilon \hat{C}$ as the median $\hat{f}_u(\hat{c}_i) = \text{MEDIAN}_{c_a \epsilon N_\kappa(\hat{c}_i)}[f_u(c_a)]$, $a \epsilon \{1, \ldots, |C|\}$, $\hat{i} \epsilon \{1, \ldots, |\hat{C}|\}$. The corresponding feature vector is then given as $\hat{F}(\hat{c}) = [\hat{f}_u(\hat{c}) | u \epsilon \{1, \ldots, 373\}]$, $\Lambda \hat{c} \epsilon \hat{C}$ as earlier.

Gradient Features

Gradient features are calculated using steerable and non-steerable linear gradient operators. Eleven non-steerable gradient features were obtained using Sobel, Kirsch and standard derivative operations. Gabor gradient operators comprising the steerable class of gradient calculations were defined for every $c \epsilon C$ where $c = (x, y, z)$, $$f_u(c) = \frac{1}{2^{\frac{3}{2}} \sigma_X \sigma_Y \sigma_Z} e^{-\frac{1}{2}\left[\frac{x^2}{\sigma_X^2} + \frac{y^2}{\sigma_Y^2} + \frac{z^2}{\sigma_Z^2}\right]} \cos(2\pi\omega x), \quad (99.44.1)$$

where $\omega$ is the frequency of a sinusoidal plane wave along the X-axis, and $\sigma_X$, $\sigma_Y$, and $\sigma_Z$ are the space constraints of the Gaussian envelope along the X, Y, and Z directions respectively. The orientation of the filter, $\theta$, is affected by the coordinate transformations: $x^1 = r(x \cos \theta + y \sin \theta)$, $y^1 = r(-x \sin \theta + y \cos \theta)$ and $z_1 = r(z)$, where r is the scaling factor. These were computed within the sliding window neighborhood $N_\kappa$. Gabor gradient features were calculated at 13 scales $$\left( r \in \left\{ -\frac{\pi}{16}, -\frac{\pi}{8\sqrt{2}}, \ldots, \frac{\pi}{16} \right\} \right),$$

6 orientations $$\left( \theta \in \left\{ 0, \frac{\pi}{6}, \frac{\pi}{3}, \frac{\pi}{2}, \frac{2\pi}{3}, \frac{5\pi}{6} \right\} \right)$$

and 3 window sizes ($\kappa \in \{3, 5, 7\}$). FIG. 9(b) shows a feature image extracted by applying a Gabor operator $$\left( \theta = \frac{\pi}{3}, r = -\frac{\pi}{\sqrt{2}}, \kappa = 5 \right)$$

on a 2D slice from C (FIG. 9(a)).

First Order Statistical Features

Four first order statistical features for 3 different window sizes were calculated. They included the mean, median, standard deviation, and range for the gray values of voxels within the sliding window neighborhood $N_\kappa$, $\kappa \in \{3, 5, 7\}$. FIG. 9(c) shows a feature image obtained via application of a first order statistical operator (range, $\kappa=3$) for the MRI section in FIG. 9(a).

Second Order Statistical Features

To calculate the second order statistical (Haralick) feature scenes, A G×G co-occurrence matrix $P_{d,c,\kappa}$ associated with $N_\kappa(c)$ is calculated, where G is the maximum gray scale intensity in C. The value at any location $[g_1, g_2]$ in $P_{d,c,\kappa}$, where $g_1, g_2 \in \{1, \ldots, G\}$, represents the frequency with which two distinct voxels $c_i, c_j \in N_\kappa(c)$, $i, j \in \{1, \ldots, |C|\}$ with associated image intensities $f(c_i)=g_1$, $f(c_j)=g_2$ are separated by distance d. A total of 13 Haralick features including energy, entropy, inertia, contrast, correlation, sum average, sum variance, sum entropy, difference average, difference variance, difference entropy, local homogeneity and average deviation were extracted at every voxel $c \in C$, based on $P_{d,c,\kappa}$, for $\kappa \in \{3, 5, 7\}$, $d=1$ and $G \in \{64, 128, 256\}$. FIG. 9(d) shows a feature image (energy) from the co-occurrence matrix ($\kappa=3$, $G=64$, $d=1$).

Non Linear Dimensionality Reduction

Graph Embedding

The aim of graph embedding is to find an embedding vector $X_{GE}(c)$, $\wedge c \in C$ such that the relative ordering of the distances between objects in the high dimensional feature space is preserved in lower dimensional space. Thus, if $c_i, c_j \in C$, $i, j \in \{1, \ldots, |C|\}$ are close in high dimensional feature space, then $\|X_{GE}(c_i) - X_{GE}(c_j)\|_2$ should be small, where $\|\cdot\|_2$ represents the Euclidean norm. This will only be true if the distances between all $c_i, c_j \in C$ are preserved in the low dimensional mapping of the data. To compute the optimal embedding, first a matrix $W_{GE} \in \Re^{|C| \times |C|}$ is defined, representing the adjacency between all objects $c \in C$ in high-dimensional feature space. For all $c_i, c_j \in C$, $W_{GE}$ is defined as $$W_{GE}(i,j) = e^{-\|F(c_i)-F(c_j)\|_2}, \wedge c_i, c_j \in C, i, j \in \{1, \ldots, |C|\}. \quad (99.55.1)$$

$X_{GE}(c)$ is then obtained from the maximization of the function:

$$E(X_{GE}) = 2\gamma \times tr\left[ \frac{X_{GE}(D - W_{GE})X_{GE}^T}{X_{GE} D X_{GE}^T} \right], \quad (99.55.2)$$

where tr is the trace operator, $X_{GE} = [X_{GE}(c_1), X(c_2) \ldots X_{GE}(c_n)]$, $n=|C|$ and $\gamma = n-1$. Additionally, D is a diagonal matrix where for all $c \in C$, the diagonal element is defined as $D(i, i) = \Sigma_j W_{GE}(i, j)$. The embedding space is defined by the Eigenvectors corresponding to the smallest $\beta$ Eigenvalues of $(D - W_{GE})X_{GE} = \lambda D W_{GE}$. The matrix $X_{GE} \in \Re^{|C| \times \beta}$ of the first $\beta$ Eigenvectors is constructed, and $\wedge c_i \in C$, $X_{GE}(c_i)$ is defined as row i of $X_{GE}$. $X_{GE}(c_i)$ is therefore a vector consisting of element number i from each of the first $\beta$ Eigenvectors, which represents the $\beta$-dimensional Cartesian coordinates.

Locally Linear Embedding (LLE)

LLE operates by assuming that objects in a neighborhood of a feature space are locally linear. Consider the set of feature vectors $\mathcal{F} = \{F(c_1), F(c_2) \ldots F(c_n)\}$, $n=|C|$. It is desired to map the set $\mathcal{F}$ to the set $\chi = \{X_{LLE}(c_1), X_{LLE}(c_2), \ldots, X_{LLE}(c_n)\}$ of embedding co-ordinates. For all objects $c \in C$, LLE maps the feature vector $F(c)$ to the embedding vector $X_{LLE}(c)$. Let $\{c_{n_i(1)}, \ldots, c_{n_i(k)}\}$ be the k nearest neighbors of $c_i$ where $n_i(k)$ is the index of the $k^{th}$ neighbor of $c_i$ in C. The feature vector $F(c_i)$ and its k nearest neighbors (kNN), $\{F(c_{n_i(1)}), F(c_{n_i(2)}), \ldots F(c_{n_i(k)})\}$ are assumed to lie on a patch of the manifold that is local linearly, allowing the use of Euclidean distances between the neighbors. Each $F(c_i)$ can then be approximated by a weighted sum of its kNN. The optimal reconstruction weights are given by the sparse matrix $W_{LLE}$ (subject to the constraint $\Sigma_t W_{LLE}(i, j) = 1$) that minimizes $$S_1(W_{LLE}) = \sum_{i=1}^{n} \left\| F(c_i) - \sum_{j=1}^{k} W_{LLE}(i, \eta_i(j)) F(c_{\eta_i(j)}) \right\|_2. \quad (99.55.3)$$

Having determined the weighting matrix $W_{LLE}$, the next step is to find a low-dimensional representation of the points in $\mathcal{F}$ that preserves this weighting. Thus, for each $F(c_i)$ approximated as the weighted combination of its kNN, its projection $X_{LLE}(c_i)$ will be the weighted combination of the projections of these same kNN. The optimal $\chi_{LLE}$ in the least squares sense minimizes $$S_2(\chi_{LLE}) = \sum_{i=1}^{n} \left\| X_{LLE}(c_i) - \sum_{j=1}^{n} W_{LLE}(i, j) X_{LLE}(c_j) \right\|_2 = tr(X_{LLE} L X_{LLE}^T), \quad (99.55.4)$$

where tr is the trace operator, $\chi_{LLE} = [X_{LLE}(c_1), X_{LLE}(c_2) \ldots X_{LLE}(c_n)]$, $L = (I - W_{LLE})(I - W_{LLE}^T)$ and I is the identity matrix. The minimization of (2.5.4) subject to the constraint $\chi_{LLE} \chi_{LLE}^T = I$ (a normalization constraint that prevents the solution $\chi_{LLE} = 0$) an Eigenvalue problem whose solutions are the Eigenvectors of the Laplacian matrix L. Since the rank of L is n-1 the first Eigenvector is ignored and the second smallest Eigenvector represents the best one-dimensional projection of all the samples. The best two-dimensional projection is given by the eigenvectors with the second and third smallest eigenvalues, and so forth.

Consensus Embedding to Obtain Stable Low Dimensional Data Representation

We require a lower dimensional embedding that models the true nature of the underlying manifold that is described in high dimensional space. Varying the feature subspaces of the high dimensional manifold and the parameters (e.g. the number of k nearest neighbors in LLE) associated with NLDR methods achieves multiple embeddings which individually model relationships between objects. Disclosed herein, is a novel method to obtain this representation by generating multiple lower dimensional embeddings of feature subspaces and capturing the adjacencies between the voxels in the lower dimensional spaces. These adjacencies can then be combined to yield a more stable representative embedding. Multiple embeddings $X_{\phi,\alpha}(c)$ for $c \in C$ are generated, based on feature subspaces $F_\alpha(c) \subseteq F(c)$, $\alpha \in \{1, \ldots, B\}$ using the NLDR schemes $\phi \in \{GE, LLE\}$ described earlier. Each embedding $X_{\phi,\alpha}$ will hence represent adjacencies between voxels $c_i$, $c_j \in C$ based on the feature sub-space $F_\alpha$. Thus, $\|X_{\phi,\alpha}(c_i) - X_{\phi,\alpha}(c_j)\|_2$ will vary as a function of $F_\alpha$. To represent the true adjacency and class relationship between $c_i$, $c_j \in C$ there is a need to combine the multiple embeddings $X_{\phi,\alpha}$. A confusion matrix $W_{\phi,\alpha} \in \Re^{|C| \times |C|}$ based on representing the adjacency between any two voxels $c_i$, $c_j \in C$ in the lower dimensional embedding representation $X_{\phi,\alpha}$ is first calculated as:

$$W_{\phi,\alpha}(i,j) = \|X_{\phi,\alpha}(c_i) - X_{\phi,\alpha}(c_j)\|_2. \quad (99.66.1)$$

where $c_i, c_j \in C$, $i, j \in \{1, \ldots, |C|\}$, $\phi \in \{GE, LLE\}$, $\alpha \in \{1 \ldots, B\}$. The confusion matrix $W_{\phi,\alpha}$ will hence represent the relationships between the voxels in each of the B embedding spaces $X_{\phi,\alpha}$, obtained via $F_\alpha$, $\alpha \in \{1, \ldots, B\}$. These voxel adjacencies can be averaged as $$\tilde{W}_\phi(i, j) = \frac{1}{B} \sum_\alpha W_{\phi,\alpha}(i, j), \forall i, j \in \{1, \ldots, |C|\}, \quad (99.66.2)$$

where $\tilde{W}_\phi(i, j)$ represents the average distance in the reduced dimensional space over B feature sets $F_\alpha$ between the voxels $c_i$, $c_j \in C$. The idea is that not every $F_\alpha$ will represent the true class relationship between $c_i$, $c_j \in C$; hence $\tilde{W}_\phi(i, j)$ is a more reliable estimate of the true embedding distance between $c_i$, $c_j$. Multidimensional scaling (MDS) is then applied to this $\tilde{W}_\phi$ to achieve the final combined embedding $\tilde{X}_\phi$. MDS is implemented as a linear method that preserves the Euclidean geometry between each pair of voxels $c_i$, $c_j \in C$. This is done by finding optimal positions for the data points $c_i$, $c_j$ in lower-dimensional space through minimization of the least squares error in the input pairwise Euclidean distances in $\tilde{W}_\phi$. The complete algorithm for the consensus embedding scheme is described below:

---
Algorithm Manifold Consensus Embed
---

Input: $F_\alpha(c) \subseteq F(c)$, for $\alpha \in \{1, \ldots B\}$, for all $c \in C$, B
Output: $X_\phi(c)$, $\phi \in \{GE, LLE\}$
begin
  0.  for $\alpha = 1$ to B do
  1.  Sample $F_\alpha(c)$ from $F(c)$ for all $c \in C$;
  2.  Use method $\phi$ to calculate $X_{\phi,\alpha}(c)$ for all $c \in C$, $\phi \in \{GE, LLE\}$;
  3.  Calculate $W_{\phi,\alpha}(i, j) = \|X_{\phi,\alpha}(c_i) - X_{\phi,\alpha}(c_j)\|_2$ for all $c_i, c_j \in C$;
  4.  endfor
  5.  Obtain $\tilde{W}_\phi(i, j) = \frac{1}{B} \sum_\alpha W_{\phi,\alpha}(i, j)$, $\forall i, j \in \{1, \ldots |C|\}$;

---
Algorithm Manifold Consensus Embed
---

6.  Apply MDS to $\tilde{W}_\phi$ to obtain final combined embedding $\tilde{X}_\phi$;
end

Consensus Clustering on the Consensus Embedding Space

To overcome the instability associated with centroid based clustering algorithms, multiple weak clusterings $V_{\phi,t}^1$, $V_{\phi,t}^2$, $V_{\phi,t}^3$, $t \in \{0, \ldots, T\}$ is generated by repeated application of k-means clustering on the combined low dimensional manifold $\tilde{X}_\phi(c)$, for all $c \in C$ and $\phi \in \{GE, LLE\}$. Each cluster $V_{\phi,t}$ is a set of objects which has been assigned the same class label by the k-means clustering algorithm. As the number of elements in each cluster tends to change for each such iteration of k-means, a co-association matrix $H_\phi$ was calculated with the underlying assumption that voxels belonging to a natural cluster are very likely to be co-located in the same cluster for each iteration. Co-occurrences of pairs of voxels $c_i$, $c_j$ in the same cluster $V_{\phi,t}$ are hence taken as votes for their association. $H_\phi(i,j)$ thus represents the number of times $c_i$, $c_j \in C$ were found in the same cluster over T iterations. If $H_\phi(i, j) = T$ then there is a high probability that $c_i$, $c_j$ do indeed belong to the same cluster. MDS is applied to $H_\phi$ followed by a final unsupervised classification using k-means, to obtain the final stable clusters $\hat{V}_\phi^1$, $\hat{V}_\phi^2$, $\hat{V}_\phi^3$. The algorithm is described below:

---
Algorithm ManifoldConsensusClust
---

Input: $\tilde{X}_\phi(c)$ for all $c \in C$, T
Output: $\hat{V}_\phi^1, \hat{V}_\phi^2, \hat{V}_\phi^3$
begin
  0.  Initialize co-association matrix $H_\phi \in \Re^{|C| \times |C|}$, $\phi \in \{GE, LLE\}$ to zero;
  1.  for $t = 0$ to T do
  2.  Use k-means on $\tilde{X}_\phi(c)$ to cluster all $c \in C$ into clusters $V_{\phi,t}^1, V_{\phi,t}^2, V_{\phi,t}^3$;
  3.  if $c_i, c_j \in C$ belong to the same cluster

Results and Discussion

Qualitative Results

Our scheme was applied to 18 1.5 T datasets. The CAD analysis was done at both voxel and metavoxel resolutions (C and $\hat{C}$).

1.5 T MR Data at Metavoxel Resolution

FIG. 10 shows the results of applying the algorithms ManifoldConsensusEmbed and ManifoldConsensusClust to the feature data in $\hat{F}(\hat{c})$, $\wedge \hat{c} \in \hat{C}$. The different class labels obtained via clustering are represented via different colors as shown in the figure. The first column in FIG. 10 corresponds to a 2D section from C overlaid with the corresponding metavoxel grid $\hat{C}$ from three different in vivo prostate MR studies (FIGS. 10(a), (e), (i)). FIGS. 10(b), (f), (g) show the potential cancer space area shaded with a translucent red on the overlaid grid $\hat{C}$. FIGS. 10(c), (g), (k) show the labels for objects clustered into $\hat{V}_{GE}^1$, $\hat{V}_{GE}^2$, $\hat{V}_{GE}^3$ plotted back onto the MRI slice (in red, green and blue) generated via Graph Embedding (GE). FIGS. 10(d), (h), (l) show the labels for objects clustered into $\hat{V}_{LLE}^1$, $\hat{V}_{LLE}^2$, $\hat{V}_{LLE}^3$ plotted back onto the MRI slice obtained via LLE. It can be seen that the labels shaded in red correspond closely with the potential cancer space for both LLE and GE.

1.5 T MR Data at Voxel Resolution

FIG. 11 shows the results of the algorithm on 1.5 T prostate MRI studies at the voxel resolution; each row corresponding to a different dataset. The leftmost image in each row in FIG. 11 shows the corrected and standardized slice from C prior to analysis from three different in vivo prostate MR studies (FIGS. 11 (a), (e), (i)). FIGS. 11(b), (f), (j) show the potential cancer space overlaid as a translucent red shading on the slice. The third column (from left to right) shows a novel way of visualizing the low dimensional embedding coordinates of each c∈C. Each spatial location c∈C in FIGS. 11(c), (g), (k) is represented by the 3 principal Eigenvalues in $X_{GE}(c)$. The Eigenvalues have been appropriately scaled so that they can be displayed as RGB values. The results shown in FIGS. 11(c), (g), and (k) reveal at least 3 distinct tissue regions via the manifold visualization scheme. Using the algorithm ManifoldConsensusClust, the final clusters $\hat{V}_{GE}^1$, $\hat{V}_{GE}^2$, $\hat{V}_{GE}^3$ then obtained The labels corresponding to the cluster with the greatest overlap with the cancer space were plotted back onto the slice. The CaP segmentations (in red) thus obtained are shown at voxel resolution of MR data on FIGS. 11(d), (h), and (l). Note that in each case there is significant overlap between the region determined to be cancer via ManifoldConsensusClust (FIGS. 11(d), (h), and (l)) and the corresponding cancer space (FIGS. 11(b), (f), and (j)).

Quantitative Evaluation

1.5 T MR Data at Metavoxel Resolution

We have already determined the counts of metavoxels lying in the potential cancer space for each dataset. The counts of the metavoxels in each of the clusters $\hat{V}_\phi^1$, $\hat{V}_\phi^2$, $\hat{V}_\phi^3$. $\phi\in\{GE, LLE\}$ are compared with this ground truth value. Sensitivity, specificity and positive predictive values (PPV) for each of $\hat{V}_\phi^1$, $\hat{V}_\phi^2$, $\hat{V}_\phi^3$ are obtained. The cluster with the highest sensitivity, specificity and PPV is then determined as the cancer class. These results are then averaged over 18 datasets and are summarized in Table 1. The results suggest that GE yields a marginally better sensitivity compared to LLE, but LLE has higher specificity and PPV. Note that with both GE and LLE the average detection sensitivity and specificity are 80% or higher.

Example 6

A Meta-Classifier for Detecting Prostate Cancer by Quantitative Integration of In Vivo Magnetic Resonance Spectroscopy and Magnetic Resonance Imaging Recently researchers have been developing computer-aided diagnosis (CAD) methods for CaP detection on MRI and MRS alone. In previous Examples a novel supervised CAD scheme for detection of CaP from 4 T ex vivo prostate MRI was disclosed. A multi-attribute classifier trained via CaP extent on MRI determined from corresponding whole mount histology specimens was used to generate a likelihood scene in which the intensity at every spatial location corresponded to the probability of CaP being present. A multichannel statistical classifier, was suggested, which used multi-protocol 1.5 T in vivo MRI to generate a statistical probability map CaP occurrence within the prostate. The quantification of prostate MRS by model based time fitting was also worked on as well as frequency domain analysis. However automated peak finding algorithms suffer from problems associated with the noisy data which worsens when a large baseline is present along with low signal to noise ratio. z-score (ratio of difference between population mean and individual score to the population standard deviation) analysis was suggested as an automated technique for quantitative assessment of 3D MRSI data for glioma. Disclosed herein above is an automated scheme for detection of CaP using in vivo prostate MRS data alone which applied hierarchical clustering and manifold learning to successfully differentiate between cancerous and non-cancerous regions in the prostate.

The Example described herein represents the first attempt to integrate MRS and MRI prostate data in a quantitative manner for CaP detection. Previous related work has focused on the qualitative examination of the modalities individually and combining the results of such findings to arrive at a consensual decision about the severity and extent of CaP. Quantitative integration of multimodal image data (PET and MRI) is simply the concatenation of image intensities follow-

TABLE 4

CaP detection sensitivity, specificity and PPV at the metavoxel resolution averaged over 18 1.5 T MRI datasets using LLE and GE in conjunction with consensus embedding and consensus clustering. Note that on account of memory constraints the LLE algorithm was unable to yield any useful results at the voxel resolution.

| Resolution | NLDR Method | Sensitivity | Specificity | PPV |
|---|---|---|---|---|
| Metavoxel | Graph Embedding | 84.50 | 79.40 | 69.09 |
| Metavoxel | LLE | 82.87 | 80.70 | 72.10 |
| Voxel | Graph Embedding | 92.65 | 82.06 | 57.75 |

1.5 T MR Data at Voxel Resolution

Similar to the manner used to evaluate the metavoxel resolution results, the counts of voxels lying in the potential cancer space were already determined for each dataset. The counts of the voxels in each of the clusters $\hat{V}_\phi^1$, $\hat{V}_\phi^2$, $\hat{V}_\phi^3$, $\phi\in\{GE\}$ are compared with this ground truth value. Sensitivity, specificity and positive predictive values (PPV) for each of $\hat{V}_\phi^1$, $\hat{V}_\phi^2$, $\hat{V}_\phi^3$ are obtained. The cluster with the highest sensitivity, specificity and PPV is then determined as the cancer class. These results are then averaged over 12 datasets and are summarized in Table 1. Note that due to the much higher spatial resolution of the data analyzed the performance measures at voxel resolution are higher compared to those at metavoxel resolution.

ing registration. Comparatively quantitative integration of heterogeneous modalities such as MRS and MRI involves combining physically disparate sources such as image intensities and spectra and is therefore a challenging problem. As an example consider a multimodal MR scene C, where for every location c, spectral and image information exists. Let S(c) denote the spectral MRS feature vector at every location c and let $f(c)$ denote the associated intensity value for this location on the corresponding MRI image. Building a meta-classifier for CaP detection by concatenating S(c) and $f(c)$ together at location c is not a solution owing to (i) different dimensionalities of S(c) and $f(c)$ and (ii) the difference in physical meaning of S(c) and $f(c)$ To improve discriminability between CaP and benign regions in prostate MRI a large number of texture features are extracted from the MRI image.

This feature space will form a texture feature vector F(c) at every location c. The spectral vector S(c) and texture feature vector F(c) will each form a high dimensional feature space at every location c in a given multimodal scene C.

By means of non-linear dimensionality reduction (NLDR), the heterogeneity of these differing sets of information is overcome, as well as inherent non-linearities within this data. Such non-linearities were shown not to be taken into account by linear dimensionality reduction schemes such as principal component analysis (PCA). Use is made of graph embedding (GE) and locally linear embedding (LLE) to project the individual high dimensional MRI and spectral features into a lower dimensional embedding space, while preserving class and object relationships from these high dimensional feature spaces in their resultant lower dimensional embedding spaces. On account of the aforementioned reasons, physically combining S(c) and F(c) in the high dimensional space is not feasible; the goal is to integrate S(c) and F(c) in a lower dimensional embedding space where S(c) and F(c) are now represented by their corresponding embedding vectors $X^S(c)$ and $X^F(c)$. Note that since $X^S(c)$ and $X^F(c)$ represent embedding co-ordinates which are divorced from any physical meaning and thus they can be reconciled into an integrated feature vector $X^{F,S}(c)$ and be used to build a MRI, MRS meta-classifier for CaP detection. In order to analyze the result of integrating multimodal MR data as compared to using the individual modalities, unsupervised consensus k-means clustering is used to partition all the spatial locations c∈C into cancerous, benign, or other tissue classes based on the corresponding $X^F(c)$, $X^S(c)$, $X^{F,S}(c)$ values. This scheme was applied for CaP detection on a total of 16 in vivo prostate MRI and MRS datasets. Ground truth estimates of CaP on partial whole mount histological sections were available which were used to define CaP location on MRI which was then used for quantitative evaluation. the hypothesis is that the MRS, MRI meta-classifier $X^{F,S}(c)$ will provide higher CaP detection, sensitivity, and specificity compared to classifiers based on the individual modalities ($X^F(c)$ and $X^S(c)$).

System Overview

Data Description and Notation

A total of 16 1.5 T in vivo endorectal MRI and MRS studies were obtained from the American College of Radiology Imaging Network (ACRIN) multi-site prostate trial[3]. For each patient, MR data (T2 imaging protocol) was acquired prior to radical prostatectomy. Following resection, the gland was quartered and stained. These sections were then manually examined for CaP to constitute the ground truth on histology. CaP locations on MRI were then manually obtained.

We define a 3D MRI scene C=(C, $f$) where C is a set of spatial locations $c_i$∈C, i∈{1, . . . |C|}, |C| is the cardinality of any set C and $f$(c) is a function that assigns an intensity value to every c∈C. A 3D spectral scene is defined as Ĉ=(Ĉ, Ĝ), where Ĉ is a 3D grid of metavoxels superposed on C. For ever spatial location $ĉ_i$∈Ĉ, i∈{1, . . . |Ĉ|}, there an associated 256-dimensional valued spectral vector $Ĝ(ĉ_i)=[ĝ_r(ĉ_i)|u∈\{1, \ldots, 256\}]$ where $ĝ_r(ĉ_i)$ represents the concentration of different biochemicals (such as creatine, citrate, and choline). FIG. 12 shows a representative MR image with the MRS grid Ĉ overlaid in yellow and the MRS spectra for locations within this grid. Representative cancerous and non-cancerous spectra are highlighted in red and blue respectively on each of the images. Note that the distance between any two adjacent metavoxels $ĉ_i$, $ĉ_j$∈Ĉ, $\|ĉ_i-ĉ_j\|_2$ (where $\|\cdot\|_2$ denotes the $L_2$ norm) is roughly 16 times the distance between any two adjacent spatial voxels $ĉ_i$, $ĉ_j$∈C.

Determination of Approximate Ground Truth for CaP on MRI, MRS

Partial ground truth for the CaP extent on MR studies in the ACRIN database is available in the form of approximate sextant locations and sizes for each study. An algorithm was previously disclosed (See e.g. PCT/US2008/0418, incorporated herein by reference in its entirety), for registration of ex vivo MRI and whole-mount histological (WMH) images for accurate mapping of spatial extent of CaP from WMH sections onto MRI. However most of the histology data in the ACRIN study are not WMH, but partial gland sections which are difficult to reconstitute. Hence the CaP ground truth estimate on the MRI sections is obtained in the following manner. The MR image of the prostate is visually divided into two lateral compartments: Left (L) and Right (R); and further divided into 3 regions longitudinally: Base (B), Midgland (M) and Apex (A). Presence of CaP (potential cancer space) has previously been determined in one or more of these six locations: Left Base (LB), Left Midgland (LM), Left Apex (LA), Right Base (RB), Right Midgland (RM), and Right Apex (RA) via manual mapping of CaP from histology onto the corresponding MRI sections. The maximum diameter of the tumor is also recorded in each of the 6 candidate locations and is denoted as MaxDiameter. The number of possible cancer metavoxels is calculated as:

$$\text{No. of candidate slices} \times \left\lceil \frac{MaxDiameter^2}{\Delta \hat{x} \Delta \hat{y}} \right\rceil,$$

where $\Delta\hat{x}$, $\Delta\hat{y}$ refer to the dimensions of the metavoxel ĉ∈Ĉ in the X and Y dimensions. Note that the exact spatial location of these metavoxels on a particular slice is not available, only the size and sextant within which it occurs. This potential cancer space nonetheless serves as a basis for performing a semi-quantitative evaluation of the CAD scheme.

Brief Outline of Experimental Design

As illustrated in FIG. 13 the methodology comprises 4 main modules:

Module 1: MRS Feature Extraction—The high dimensional spectral feature vector Ĝ(ĉ) is non-linearly projected into lower dimensional space via NLDR methods to form the low dimensional embedding of MRS data Ŷ(ĉ). The MRS embedding space forms one input to the data integration module.

Module 2: MRI Feature extraction—Texture features previously shown to be able to differentiate between cancerous and non-cancerous regions are used to extract a large texture feature space F̂(ĉ) at every location ĉ. The consensus embedding method is used to project the data F̂(ĉ) into embedding space. This novel scheme combines embeddings of multiple feature subspaces of the MRI feature data to achieve a more stable embedding solution. The consensus MRI embedding space X̃(ĉ) forms the second input to the data integration module.

Module 3: Integration of MRI and MRS—A consolidated embedding vector Ẽ(ĉ) for each ĉ∈Ĉ is created by concatenating embedding coordinates Ŷ(ĉ) and X̃(ĉ).

Module 4: Classification of integrated MRS and MRI feature spaces via consensus clustering—Unsupervised consensus clustering is applied to partition all objects ĉ∈Ĉ into one of 3 classes. The clustering scheme is applied individually to X̃(ĉ), Ŷ(ĉ), and Ẽ(ĉ). The cluster with the largest overlap (sensitivity and specificity) with respect to the potential cancer space is identified as the CaP class.

Feature Extraction Methods for MRS and MRI

MRS Feature Extraction

Most automated MRS classification schemes are based on calculating ratios of the discriminatory peaks (choline/creatine) in MRS which involve processes of peak detection and noise suppression. Application of such methods to prostate MRS is complicated due to poor signal quality and noise issues. Instead the MR spectrum is considered in its totality. The 256-point MRS spectrum $\hat{G}(\hat{c})$ associated with every metavoxel $\hat{c} \in \hat{C}$ is non-linearly projected into a lower dimensional space using two NLDR methods, $\phi \in \{GE, LLE\}$ to calculate the MRS embedding vector $\hat{Y}(\hat{c})$ associated with every $\hat{c} \in \hat{C}$. $\hat{Y}_\phi(\hat{c})$ now represents the MRS feature vector at $\hat{c} \in \hat{C}$.

Graph Embedding

The aim of graph embedding is to find an embedding vector $Y_{GE}(\hat{c})$, $\Lambda \hat{c} \in \hat{C}$ such that the relative ordering of the distances between objects in the high dimensional feature space is preserved in lower dimensional space. Thus, if locations $\hat{c}_i$, $\hat{c}_j \in \hat{C}$, $\hat{i}, \hat{j} \in \{1, \ldots, |\hat{C}|\}$ are close in high dimensional feature space, then $\|Y_{GE}(\hat{c}_i) - Y_{GE}(\hat{c}_j)\|_2$ should be small, where $\|\cdot\|_2$ represents the Euclidean norm. However this is only true if the distances between all $\hat{c}_i$, $\hat{c}_j \in \hat{C}$ are preserved in the low dimensional mapping of the data. To compute the optimal embedding, first a matrix $W_{GE} \in \mathfrak{R}^{|\hat{C}| \times |\hat{C}|}$ is defined, representing the adjacency between all objects $\hat{c} \in \hat{C}$ in high-dimensional feature space. For all $\hat{c}_i$, $\hat{c}_j \in \hat{C}$, $W_{GE}$ is defined as $$W_{GE}(\hat{i},\hat{j}) = e^{-|F(\hat{c}_i) - F(\hat{c}_j)|^2}, \Lambda \hat{c}_i, \hat{c}_j \in \hat{C}, \hat{i}, \hat{j} \in \{1, \ldots, |\hat{C}|\}. \quad (12.1.1)$$

$Y_{GE}(\hat{c})$ is then obtained from the maximization of the function:

$$E(\mathcal{Y}_{GE}) 2\gamma \times tr\left[\frac{\mathcal{Y}_{GE}(D - W_{GE})\mathcal{Y}_{GE}^T}{\mathcal{Y}_{GE} D \mathcal{Y}_{GE}^T}\right], \quad (12.1.2)$$

where tr is the trace operator $\gamma_{GE} = [Y_{GE}(\hat{c}_1), Y_{GE}(\hat{c}_2), \ldots, Y_{GE}(\hat{c}_n)]$, $n = |\hat{C}|$ and $\gamma = n - 1$. Additionally, D is a diagonal matrix where for all $\hat{c} \in \hat{C}$, the diagonal element is defined as $D(\hat{i},\hat{i}) = \Sigma_{\hat{j}} W_{GE}(\hat{i}, \hat{j})$. The embedding space is defined by the Eigenvectors corresponding to the smallest β Eigenvalues of $(D - W_{GE})\gamma_{GE} = \lambda D W_{GE}$. The matrix $\gamma_{GE} \in \mathfrak{R}^{|\hat{C}| \times \beta}$ of the first β Eigenvectors is constructed, and $\Lambda \hat{c}_i \in \hat{C}, Y_{GE}(\hat{c}_i)$ is defined as row $\hat{i}$ of $\gamma_{GE}$, $Y_{GE}(\hat{c}_i)$ is therefore a vector consisting of element number $\hat{i}$ from each of the first β Eigenvectors and represents the β-dimensional embedding coordinates.

Locally Linear Embedding (LLE)

LLE operates by assuming that objects in a neighborhood of a feature space are locally linear. Consider the set of feature vectors $\mathcal{F} = \{F(\hat{c}_1), F(\hat{c}_2), \ldots F(\hat{c}_n)\}$, $n = |\hat{C}|$. It is desired to map the set $\mathcal{F}$ to the set $\gamma = \{Y_{LLE}(\hat{c}_1), Y_{LLE}(\hat{c}_2), \ldots Y_{LLE}(\hat{c}_n)\}$ of embedding co-ordinates. For all objects $\hat{c} \in \hat{C}$, LLE maps the feature vector $F(\hat{c})$ to the embedding vector $Y_{LLE}(\hat{c})$. Let $\{\hat{c}_{\eta_i(1)}, \ldots, \hat{c}_{\eta_i(k)}\}$ be the k nearest neighbors of $\hat{c}_i$ where $\eta_i(k)$ is the index of the $k^{th}$ neighbor of $\hat{c}_i$ in $\hat{C}$. The feature vector $F(\hat{c}_i)$ and its k nearest neighbors (kNN), $\{F(\hat{c}_{\eta_i(1)}), F(\hat{c}_{\eta_i(2)}), \ldots, F(\hat{c}_{\eta_i(k)})\}$ are assumed to lie on a patch of the manifold that is local linearly, allowing the use of Euclidean distances between the neighbors. Each $F(\hat{c}_i)$ can then be approximated by a weighted sum of its kNN. The optimal reconstruction weights are given by the sparse matrix $W_{LLE}$ (subject to the constraint $\Sigma_{\hat{j}} W_{LLE}(\hat{i}, \hat{j}) = 1$) that minimizes $$S_1(W_{LLE}) = \sum_{i=1}^{n} \left\| F(\hat{c}_i) - \sum_{\hat{j}=1}^{k} W_{LLE}(\hat{i}, \eta_i(\hat{j})) F(\hat{c}_{\eta_i(\hat{j})}) \right\|_2. \quad (12.1.3)$$

Having determined the weighting matrix $W_{LLE}$, the next step is to find a low-dimensional representation of the points in $\mathcal{F}$ that preserves this weighting. Thus, for each $F(\hat{c}_i)$ approximated as the weighted combination of its kNN, its projection $Y_{LLE}(\hat{c}_i)$ will be the weighted combination of the projections of these same kNN. The optimal $Y_{LLE}$ in the least squares sense minimizes $$S_2(\mathcal{Y}_{LLE}) = \quad (12.1.4)$$

$$\sum_{i=1}^{n} \left\| Y_{LLE}(\hat{c}_i) - \sum_{\hat{j}=1}^{n} W_{LLE}(\hat{i}, \hat{j}) Y_{LLE}(\hat{c}_{\hat{j}}) \right\|_2 = tr(\mathcal{Y}_{LLE} L \mathcal{Y}_{LLE}^T),$$

where tr is the trace operator, $\gamma_{LLE} = [Y_{LLE}(\hat{c}_1), Y_{LLE}(\hat{c}_2), \ldots, Y_{LLE}(\hat{c}_n)]$, $L = (I - W_{LLE})(I - W_{LLE}^T)$ and I is the identity matrix. The minimization of (3.1.4) subject to the constraint $\gamma_{LLE}\gamma_{LLE}^T = I$ (a normalization constraint that prevents the solution $\gamma_{LLE} = 0$) is an Eigenvalue problem whose solutions are the Eigenvectors of the Laplacian matrix L. Since the rank of L is n−1 the first Eigenvector is ignored and the second smallest Eigenvector represents the best one-dimensional projection of all the samples. The best two-dimensional projection is given by the eigenvectors with the second and third smallest eigenvalues, and so forth.

MRI Feature Extraction

Texture Representation of CaP on MRI

Over 350 3D texture feature scenes corresponding to three different texture classes were extracted from each MRI scene. These feature representations were chosen since they have been demonstrated to be able to discriminate between the cancer and non-cancer classes. The feature scenes $\mathcal{F}_u = (C, f_u)$ are calculated for each C by applying the feature operators $\Phi_u$, $u \in \{1, \ldots, 373\}$ within a local neighborhood associated with every $c \in C$. Hence $f_u(c)$ is the feature value associated with feature operator $\Phi_u$ at voxel c. Therefore, it is possible to define a feature vector associated with each $c \in C$ as $F(c) = [f_u(c) | u \in \{1, \ldots 373\}]$. A κ-neighborhood centered on $c_i \in C$ is defined as $N_\kappa(c_i)$ where $\Lambda c_j \in N_\kappa(c_i)$, $\|c_j - c_i\| \leq \kappa$, $i, j \in \{1, \ldots, |C|\}$, $c_i \notin N_\kappa(c_i)$. Similarly, a κ-neighborhood $N_\kappa(\hat{c}_i)$ is defined for $\hat{c}_i \in \hat{C}$ where for all $c_j \in N_\kappa(\hat{c}_i)$, $\|c_j - \hat{c}_i\| \leq \kappa$, $\hat{i} \in \{1, \ldots |\hat{C}|\}$, $j \in \{1 \ldots, |C|\}$, $c_j \neq \hat{c}_i$. It is possible to define a feature attribute for each metavoxel $\hat{c} \in \hat{C}$ as the median $\hat{f}_u(\hat{c}_i) = MEDIAN_{c_a \in N_\kappa(\hat{c}_i)}[f_u(c_a)]$, $a \in \{1, \ldots, |C|\}$, $\hat{i} \in \{1, \ldots, |\hat{C}|\}$. The corresponding feature vector is then given as $\hat{F}(\hat{c}) = [\hat{f}_u(\hat{c}) | u \in \{1, \ldots, 373\}]$, $\Lambda \hat{c} \in \hat{C}$ as earlier.

Gradient Features

Gradient features are calculated using steerable and non-steerable linear gradient operators. Eleven non-steerable gradient features were obtained using Sobel, Kirsch and standard derivative operations. Gabor gradient operators comprising the steerable class of gradient calculations were defined for every $c \in C$ where $c = (x, y, z)$, $$f_u(c) = \frac{1}{2^{\frac{3}{2}}\sigma_X\sigma_Y\sigma_Z} e^{\frac{-1}{2}\left[\frac{x^2}{\sigma_X^2}+\frac{y^2}{\sigma_Y^2}+\frac{z^2}{\sigma_Z^2}\right]}\cos(2\pi\omega x), \quad (12.2.1)$$

where $\omega$ is the frequency of a sinusoidal plane wave along the X-axis, and $\sigma_X$, $\sigma_Y$, and $Y_Z$ are the space constraints of the Gaussian envelope along the X, Y, and Z directions respectively. The orientation of the filter, $\theta$, is affected by the coordinate transformations: $x^1=r(x \cos \theta + y \sin \theta)$, $y^1=r(-x \sin \theta + y \cos \theta)$ and $z^1=r(z)$ where $r$ is the scaling factor. These were computed within the sliding window neighborhood $N_\kappa$. Gabor gradient features were calculated at 13 scales $$\left(r \in \left\{-\frac{\pi}{16}, -\frac{\pi}{8\sqrt{2}}, \ldots, \frac{\pi}{16}\right\}\right),$$

6 orientations $$\left(\theta \in \left\{0, \frac{\pi}{6}, \frac{\pi}{3}, \frac{\pi}{2}, \frac{2\pi}{3}, \frac{5\pi}{6}\right\}\right)$$

and 3 window sizes ($\kappa \in \{3, 5, 7\}$). FIG. 14(*b*) shows a feature image extracted by applying a Gabor operator $$\left(\theta = \frac{\pi}{3}, \quad r = -\frac{\pi}{\sqrt{2}}, \quad k = 5\right)$$

on a 2D section from C (FIG. 14(*a*)).

First Order Statistical Features

Four first order statistical features for 3 different window sizes were calculated. They included the mean, median, standard deviation, and range for the gray values of pixels within the sliding window neighborhood $N_\kappa$, $\kappa \in \{3, 5, 7\}$. FIG. 14(*c*) shows a feature image obtained via application of a first order statistical operator (range, $\kappa=3$) for the MRI section shown in FIG. 14(*a*).

Second Order Statistical Features

To calculate the second order statistical (Haralick) feature scenes, a M×M co-occurrence matrix $P_{d,c,\kappa}$ associated with $N_\kappa(c)$ is computed, where M is the maximum gray scale intensity in C. The value at any location $[m_1, m_2]$ in $P_{d,c,\kappa}$, where $m_1, m_2 \in \{1, \ldots M\}$, represents the frequency with which two distinct voxels $c_i, c_j \in N_\kappa(c), i, j \in \{1, \ldots, |\hat{C}|\}$ with associated image intensities $f(c_i)=m_1, f(c_j)=m_2$ are separated by distance d. A total of 13 Haralick features including energy, entropy, inertia, contrast, correlation, sum average, sum variance, sum entropy, difference average, difference variance, difference entropy, local homogeneity and average deviation were extracted at every voxel $c \in C$, based on $P_{d,c,\kappa}$, for $\kappa \in \{3, 5, 7\}$, d=1 and M$\in \{64, 128, 256\}$. FIG. 14(*d*) shows a feature image (energy) extracted from the co-occurrence matrix ($\kappa=3$, G=61, d=1).

Consensus Embedding for Feature Extraction

We require a lower dimensional embedding that models the true nature of the underlying manifold that is described in high dimensional space based on relationships between the objects in this space. Varying the feature subspaces of the high dimensional manifold and the parameters (e.g. the number of k nearest neighbors in LLE) associated with NLDR methods achieves multiple embeddings which individually model relationships between these objects. Disclosed herein is a novel method to obtain a stable low dimensional data representation which integrates estimates of object adjacency from multiple lower dimensional representations of the data. Multiple embeddings $X_{\phi,\alpha}(\hat{c})$ are generated for $\hat{c} \in \hat{C}$, based on feature subspaces $F_\alpha(\hat{c}) \subseteq \hat{F}(\hat{c})$, $\alpha \in \{1 \ldots, B\}$ using the NLDR schemes $\phi \in \{GE, LLE\}$ described hereinabove. Each embedding $X_{\phi,\alpha}$ will hence represent adjacencies between metavoxels $\hat{c}_i, \hat{c}_j \in \hat{C}$ based on the feature subspace $F_\alpha$. Thus $\|X_{\phi,\alpha}(\hat{c}_i) - X_{\phi,\alpha}(\hat{c}_j)\|_2$ will vary as a function of $F_\alpha$. To represent the true adjacency and class relationship between $\hat{c}_i, \hat{c}_j \in \hat{C}$ there is a need to combine the multiple embeddings $X_{\phi,\alpha}$. A confusion matrix $W_{\phi,\alpha} \in \Re^{|\hat{C}| \times |\hat{C}|}$ based on representing the adjacency between any two metavoxels at locations $\hat{c}_i, \hat{c}_j \in \hat{C}$ in the lower dimensional embedding representation $X_{\phi,\alpha}$ is first calculated as $$:W_{\phi,\alpha}(\hat{i},\hat{j}) = \|X_{\phi,\alpha}(\hat{c}_i) - X_{\phi,\alpha}(\hat{c}_j)\|_2. \quad (12.2.2)$$

where $\hat{c}_i, \hat{c}_j \in \hat{C}, \hat{i}, \hat{j} \in \{1 \ldots, |\hat{C}|\}.\phi \in \{GE, LLE\}, \alpha \in \{1 \ldots B\}$. The confusion matrix it $W_{\phi,\alpha}$ will hence represent the relationships between the metavoxels in each of the B embedding spaces $X_{\phi,\alpha}$, obtained via $F_\alpha$, $\alpha \in \{1, \ldots, B\}$. These metavoxel adjacencies can be averaged as:

$$\tilde{W}_\phi(\hat{i}, \hat{j}) = \frac{1}{B}\sum_\alpha W_{\phi,\alpha}(\hat{i}, \hat{j}), \forall \hat{i}, \hat{j} \in \{1, \ldots, |\hat{C}|\}. \quad (12.2.3)$$

where $\tilde{W}_\phi(\hat{i}, \hat{j})$ represents the average distance in the reduced dimensional space over B feature sets $F_\alpha$ between the metavoxels at locations $\hat{c}_i, \hat{c}_j \in \hat{C}$. Since it is not guaranteed every $F_\alpha$ will reflect the true class relationship between $\hat{c}_i, \hat{c}_j \in \hat{C}$, the assumption is that the average object adjacency $\tilde{W}_\phi$ is a truer representation of the true embedding distance between $\hat{c}_i, \hat{c}_j$. Multidimensional is applied to $\tilde{W}_\phi$ to achieve the final combined embedding $\hat{X}_\phi$. MDS is implemented as a linear method that preserves the Euclidean geometry between each pair of metavoxels at $\hat{c}_i, \hat{c}_j \in \hat{C}$. This is done by finding optimal positions for the data points $\hat{c}_i, \hat{c}_j$ in lower-dimensional space through minimization of the least squares error in the input pairwise Euclidean distances $\tilde{W}_\phi$. The result is lower dimensional embedding vector for the MRI feature space $\hat{X}_\phi(\hat{c}), \Lambda \hat{c} \in \hat{C}$, and $\phi \in \{GF, LLE\}$.

Data Integration and Classification

Multimodal Data Integration of MRI and MRS

Owing to the physical differences in the MRS and MRI features the MRS, MRI meta-classifier is created in the joint MRI and MRS embedding space where the physicality of the object features has been removed. Thus while it was not possible to physically concatenate the MRS and MRI features in the original high dimensional space, a direct concatenation of the MRI and MRS embedding coordinates can be done since objects $\hat{c}_i$ and $\hat{c}_j$ that are adjacent in $\tilde{X}$ and $\tilde{Y}$ should also be adjacent in the combined embedding space. The integration of the embedding spaces is predicated on the fact that they are identically scaled. A combined embedding vector $\tilde{E}_\phi(\hat{c}) = [\tilde{X}_\phi(\hat{c}), \tilde{Y}_\phi(\hat{c})]$ is obtained at each $\hat{c} \in \hat{C}$ by direct concatenation of $\tilde{X}_\phi(\hat{c})$ and $\tilde{Y}_\phi(\hat{c})$. For every $\hat{c} \in \hat{C}$, $\tilde{X}_\phi(\hat{c}) \in \Re^{1 \times 3}$ and $\tilde{Y}_\phi(\hat{c}) \in \Re^{1 \times 3}$, a $\tilde{E}_\phi(\hat{c}) \in \Re^{1 \times 23}$ exists, where $\beta$ is the number of Eigenvectors calculated in projecting the data via NLDR. FIG. 15 shows the result of visualizing the embedding vectors on the MR image. Each spatial location $\hat{c} \in \hat{C}$ in FIG. 15(*a*), (*b*), (*c*) is represented by the 3 principal Eigenvalues in $\tilde{X}_{GE}(\hat{c})$, $\tilde{Y}_{GE}(\hat{c})$, and $\tilde{E}_{GE}(\hat{c})$ respectively. The Eigenvalues have been appropriately scaled so that they can be displayed as RGB values. The images reveal at least 3 distinct regions via this embedding visualization. The NLDR method used was Graph Embedding (GE).

Consensus κ-Means Clustering for Final Classification

We now have the 3 vectors associated with each metavoxel $\hat{c} \in \hat{C}$, specifically (i) the lower dimensional embedding obtained from MRI data $[\tilde{X}_\phi(\hat{c})]$, (ii) the lower dimensional embedding obtained from MRS data $[\tilde{Y}_\phi(\hat{c})]$ and (iii) the integrated lower dimensional embedding $[\tilde{E}_\phi(\hat{c})]$. To overcome the instability associated with centroid based clustering algorithms, multiple weak clusterings $Z_{\psi,\phi,t}^1 \cdot Z_{\psi,\phi,t}^2 \cdot Z_{\psi,\phi,t}^3 \cdot t\in\{0\ldots,T\}$ are generated by repeated application of k-means clustering on each of the low dimensional manifolds $\psi\in\{\tilde{X}, \tilde{Y}, \tilde{E}\}$ each calculated using NLDR methods $\phi\in\{GE, LEE\}$ for all $\hat{c} \in \hat{C}$. Each cluster $\tilde{Z}_{\psi,\phi}$ is a set of objects which has been assigned the same class label by the k-means clustering algorithm. As the number of elements in each cluster tends to change for each such iteration of k-means, a co-association matrix $\Pi_{\psi,\phi}$ is calculated, with the underlying assumption that metavoxels belonging to a natural cluster are very likely to be co-located in the same cluster for each iteration. Co-occurrences of pairs of metavoxels $\hat{c}_i, \hat{c}_j$ in the same cluster $Z_{\psi,\phi,t}$ are hence taken as votes for their association. $Z_{\psi,\phi}(\hat{i},\hat{j})$ thus represents the number of times $\hat{c}_i, \hat{c}_j \in \hat{C}$ were found in the same cluster over T iterations. If $Z_{\psi,\phi}(\hat{i},\hat{j})=T$ then there is a high probability that $\hat{c}_i, \hat{c}_j$ do indeed belong to the same cluster. MDS is applied to $H_{\psi,\phi}$ followed by a final unsupervised classification using k-means, to obtain the final stable clusters $\tilde{Z}_{\psi,\phi}^1 \cdot \tilde{Z}_{\psi,\phi}^2 \cdot \tilde{Z}_{\psi,\phi}^3$ for each of $\psi\in\{\tilde{X}, \tilde{Y}, \tilde{E}\}$ and $\phi\in\{GE, LLE\}$.

Results

Qualitative Results

The scheme disclosed herein was applied on 16 1.5 T datasets at metavoxel resolution ($\hat{C}$). The results from consensus clustering of the lower dimensional embedding from the individual modalities ($\tilde{X}_\phi(\hat{c})$ and $\tilde{Y}_\phi(\hat{c})$) were compared with the embeddings created via the combination scheme ($\tilde{E}_\phi(\hat{c})$). FIG. 16 shows representative results of applying the scheme to MR data, while using graph embedding (GE) as the NLDR method in each case. Each row in this figure corresponds to a different dataset and the different class labels obtained via clustering are represented via different colors (red, green, and blue). The first column in FIG. 16 shows the potential cancer space shaded with a translucent red on a 2D section from C (FIGS. 16(a) and (e)). FIGS. 16(b) and (f) show the labels for objects clustered into $\tilde{Z}_{\tilde{X},GE}^1, \tilde{Z}_{\tilde{X},GE}^2, \tilde{Z}_{\tilde{X},GE}^3$ (from classifying the consensus embedding $\hat{X}_{GE}(\hat{c})$ of the MRI feature vector $\hat{F}(\hat{c})$) plotted back onto the MR slice. FIGS. 16(c) and (g) show the labels for objects in $\tilde{Z}_{\tilde{Y},GE}^1, \tilde{Z}_{\tilde{Y},GE}^2, \tilde{Z}_{\tilde{Y},GE}^3$ (from classifying the embedding $\hat{Y}_{GE}(\hat{c})$ of the MRS feature vector $\hat{G}(\hat{c})$) similarly plotted onto the same slice. The labels for objects clustered into $\tilde{Z}_{\tilde{E},GE}^1, \tilde{Z}_{\tilde{E},GE}^2, \tilde{Z}_{\tilde{E},GE}^3$ (from the classifying the integrated embedding vector $\tilde{E}_{GE}(\hat{c})$) are plotted onto the slice in FIGS. 16(d) and (h). FIG. 17 shows representative results of applying this scheme to MR data, while using LLE as the NLDR method in each case. In both sets of results, the region labeled red was found to correspond most closely to the potential cancer space (FIGS. 16(a) and (e), FIGS. 17(a) and (e)). The integration of the information from the modalities can be seen by the integration of labels from $\tilde{Z}_{\tilde{X},GE}^{1-3}(\hat{c})$ and $\tilde{Z}_{\tilde{Y},GE}^{1-3}(\hat{c})$ in the labels in $\tilde{Z}_{\tilde{E},GE}^{1-3}(\hat{c})$.

Quantitative Results

We have already determined the counts of metavoxels lying in the potential cancer space for each dataset at the metavoxel resolution. The counts of the metavoxels in each of the clusters $\tilde{Z}_{\psi,\phi}^1, \tilde{Z}_{\psi,\phi}^2, \tilde{Z}_{\psi,\phi}^3, \psi\in\{\tilde{X}, \tilde{Y}, \tilde{E}\}, \phi\in\{GE, LLE\}$ are compared with this ground truth value. Sensitivity, specificity and positive predictive values (PPV) for each of $\tilde{Z}_{\psi,\phi}^1, \tilde{Z}_{\psi,\phi}^2, \tilde{Z}_{\psi,\phi}^3$ are obtained. The cluster with the highest sensitivity, specificity and PPV is identified as the cancer class. These results are then averaged over 16 datasets and are summarized in Table 1. The results appear to suggest that integration of MRI and MRS performs marginally better or comparably to MRS or MRI alone. Possible reasons that more obvious differences were not observed may have to do with the lack of precise ground truth data for CaP extent. Note that LLE shows a high sensitivity in each case as compared to using graph embedding, but that GE shows a higher specificity and PPV.

TABLE 5

CaP detection sensitivity, specificity and PPV at the metavoxel resolution averaged over 16 1.5 T MRS/MRI datasets using LLE and GE.

| | Sensitivity | | Specificity | | PPV | |
|---|---|---|---|---|---|---|
| | GE | LLE | GE | LLE | GE | LLE |
| MRI data $[\tilde{X}_\phi(\hat{c})]$ | 81.58 | 82.77 | 89.90 | 82.30 | 78.70 | 71.64 |
| MRS data $[\tilde{Y}_\phi(\hat{c})]$ | 84.80 | 88.60 | 86.50 | 83.30 | 75.50 | 71.28 |
| Embeddings combined $[\tilde{E}_\phi(\hat{c})]$ | 87.00 | 87.90 | 84.30 | 83.90 | 72.64 | 73.12 |

Example 7

A Comprehensive Segmentation, Registration, and Cancer Detection Scheme on 3 Tesla \Textit{In Vivo} Prostate DCE-MRI Most current efforts in computer-aided diagnosis of CaP from DCE-MRI involve pharmacokinetic curve fitting such as in the 3 Time Point (3TP) scheme. Based on the curve/model fits these schemes attempt to identify wash-in and wash-out points, i.e. time points at which the lesion begins to take up and flush out the contrast agent. Lesions are then identified as benign, malignant or indeterminate based on the rate of the contrast agent uptake and wash out. A supervised CAD scheme was disclosed for analysis of the peripheral zone of the prostate. Pharmacokinetic features derived from curve fitting were used to train the model and coarse quantitative evaluation was performed based on a roughly registered spatial map of CaP on MRI. Area under the Receiver Operating Characteristic (ROC) curve (AUC) was used as a measure of accuracy. A mean AUC of 0.83 was reported. Due to the lack of perfect slice correspondences between MRI and histology data and the large difference in the number of slices between the two modalities, training a supervised classification system based on such labels is inappropriate.

The 3TP and pharmacokinetic modeling approaches assume linear changes in the dynamic MR image intensity profiles. Such data suffers from intensity non-standardness, wherein MR image intensities do not have fixed tissue-specific meaning within the same imaging protocol, body region, and patient. FIGS. 19(a), (b), (c) show the image intensity histograms for the non-lesion areas within 7 3 T in vivo DCE-MRI prostate studies for timepoints t=2, t=4, and t=6 respectively. An obvious intensity drift in the MR images can be seen in the apparent mis-alignment of the intensity histograms. Non-linear dimensionality reduction methods such as locally linear embedding (LLE have been shown to faithfully preserve relative object relationships in biomedical data from the high- to the low-dimensional representation. An exploratory analysis of breast DCE-MRI data was performed via different dimensionality reduction methods. LLE was found to be more robust and accurate in differentiating between benign and malignant tissue classes as compared to linear methods such as Principal Component Analysis (PCA).

In this example presented is a comprehensive segmentation, registration and detection scheme for CaP from 3 T in vivo DCE-MR imagery that has the following main features: (1) a multi-attribute active shape model is used to automatically segment the prostate boundary, (2) a multimodal non-rigid registration scheme is used to map CaP extent from whole mount histological sections onto corresponding DCE-MR imagery, and (3) an unsupervised CaP detection scheme involving LLE on the temporal intensity profiles at every pixel location followed by classification via consensus clustering. The methodology disclosed is evaluated on a per-pixel basis against registered spatial maps of CaP on MRI. Additionally, the results obtained using the disclosed novel methodology are compared with those obtained from the 3TP method for a total of 21 histology-MRI slice pairs.

Experimental Design

Data Description and Notation

A total of 21 3 T in vivo endorectal MR (T2-weighted and DCE protocols) images with corresponding whole mount histological sections (WMHS) following radical prostatectomy were obtained from 6 patient datasets from the Beth Israel Deaconess Medical Center. The DCE-MR images were acquired during and after a bolus injection of 0.1 mmol/kg of body weight of gadopentetate dimeglumine using a 3-dimensional gradient echo sequence (3D-GE) with a temporal resolution of 1 min 35 sec. Following radical prostatectomy, whole-mount sections of the prostate were stained via Haemotoxylin and Eosin (H & E) and examined by a trained pathologist to accurately delineate the presence and extent of CaP.

We define a 2D DCE-MR image $C^{D,t}=(C, f^{D,t})$ where C is a set of spatial locations $c_i \in C$. $i \in \{1, \ldots |C|\}$, $|C|$ is the cardinality of C and $t \in \{1, \ldots, 7\}$. $f^{D,t}(c)$ then represents the intensity value at location $c \in C$ at timepoint t. A 2D T2-weighted (T2-w) MR image is defined as $C^{T_2}=(C, f^{T_2})$ and the corresponding WMHS as $C^H$. $G(C^H)$ is defined as the set of locations in the WMHS $C^H$ that form the spatial extent of CaP ("gold standard").

Automated Boundary Segmentation on in vivo MR Imagery

A Multi-Attribute, Non-initializing, Texture Reconstruction based Active shape model (MANTRA) algorithm is described hereinabove. Unlike traditional ASMs, MANTRA makes use of local texture model reconstruction to overcome limitations of image intensity, as well as multiple attributes with a combined mutual information metric. MANTRA also requires only a rough initialization (such as a bounding-box) around the prostate to be able to segment the boundary accurately.

Step 1 (Training): PCA is performed on expert selected landmarks along the prostate border to generate a statistical shape model. A statistical texture model is calculated for each landmark point by performing PCA across patches of pixels sampled from areas surrounding each landmark point in each training image.

Step 2 (Segmentation): Regions within a new image are searched for the prostate border and potential locations have patches of pixels sampled from around them. The pixel intensity values within a patch are reconstructed from the texture model as best possible, and mutual information is maximized between the reconstruction and the original patch to test for a border location. An active shape model (ASM) is fit to such locations, and the process repeats until convergence.

FIG. 20(a) shows an original sample T2-w image $C^{T_2}$. The final segmentation of the prostate boundary via MANTRA is seen in FIG. 20(b) in green. MANTRA is applied to segment the prostate boundary for all images $C^{T_2}$ and $C^{D,t}$, $t \in \{1, \ldots, 7\}$.

Establishment of Cap Ground Truth on DCE-MRI Via Elastic Multimodal Registration of Histology, T2-w, and DCE-MRI This task comprises the following steps:

1. Affine alignment of $C^H$ to corresponding $C^{T_2}$ is done using the Combined Feature Ensemble Mutual Information (COFEMI) scheme, (see e.g. PCT/US2008/0418, incorporated herein by reference in its entirety). This is followed by elastic registration using thin plate splines (TPS) warping based of $C^H$ (FIG. 20(c)) to correct for non-linear deformations from endorectal coil in $C^{T_2}$ (FIG. 20(b)) and histological processing.

2. Having placed $C^{T_2}$ and $C^H$ in spatial correspondence, the histological CaP extent $G(C^H)$ is mapped onto $C^{T_2}$ to obtain $G^T(C^{T_2})$ via the transformation r determined in step 2.

3. MI-based affine registration of $C^{T_2}$ to $C^{D,5}$ (chosen due to improved contrast) is done to correct for subtle misalignment and resolution mismatch between the MR protocols. It is known that the individual DCE time point images $C^{D,t}$, $t \in \{1, \ldots, 7\}$ are in implicit registration, hence requiring no alignment.

4. Mapping of histology-derived CaP ground truth $G^T(C^{T_2})$ (FIG. 20(d)) onto $C^{D,5}$ to obtain $G^R(C^{D,5})$ via the transformation R determined in step 3.

Classification of DCE-MRI Via LLE and Consensus Clustering

Locally Linear Embedding (LLE):

For each pixel c within each DCE-MR image $C^{D,t}$, $t \in \{1 \ldots 7\}$, there is an associated intensity feature vector $F(c_i)=[f^{D,t}(c_i)/t \in \{1 \ldots 7\}]$, $c_i \in C$, $i \in \{1 \ldots, |C|\}$. LLE is used to embed the set $\mathcal{F}=\{F(c_1), F(c_2), \ldots, F(c_p)\}$, $p=|C|$ to result in the set of lower dimensional embedding vectors $\chi=\{X_{LLE}(c_1), X_{LLE}(c_2) \ldots X_{LLE}(c_p)\}$. Let $\{c_{\eta_i(1)} \ldots c_{\eta_i(m)}\}$ be the m nearest neighbors (mNN) of $c_i$ where $\eta_i(m)$ is the index of the $m^{th}$ neighbor of $c_i \in C$. $F(c_i)$ is then approximated by a weighted sum of its own mNN, $F(c_{\eta_i(1)})$, $F(c_{\eta_i(2)})$, $\ldots$, $F(c_{\eta_i(m)})$ by assuming local linearity, thus allowing the use of Euclidean distances between the neighbors. The optimal reconstruction weights are given by the sparse matrix $W_{LLE} \in \mathcal{R}^{|C| \times |C|}$:

$$\psi_1(W_{LLE}) = \sum_{i=1}^{p} \left\| F(c_i) - \sum_{j=1}^{m} W_{LLE}(i, \eta_i(j)) F(c_{\eta_i(j)}) \right\|_2, \quad (14.4.1)$$

subject to the constraints $W_{LLE}(i,j)=0$ if $c_j$ does not belong to the mNN of $c_i$ and $\Sigma_j W_{LLE}(i,j)=1$. $c_i$, $c_j \in C$. The low-dimensional projection of the points in $\mathcal{F}$ that preserves the weighting in $W_{LLE}$ is determined by approximating each projection $X_{LLE}(c_i)$ as a weighted combination of its own mNN. The optimal $\chi_{LLE}$ in the least squares sense minimizes $$\psi_2(X_{LLE}) = \sum_{i=1}^{p} \left\| X_{LLE}(c_i) \sum_{j=1}^{p} W_{LLE}(i,j) X_{LLE}(c_j) \right\|_2 = tr(X_{LLE} L X_{LLE}^T), \quad (14.4.2)$$

where tr is the trace operator, $\chi_{LLE}=[X_{LLE}(c_1), X_{LLE}(c_2) \ldots X_{LLE}(c_p)]$, $L=(I-W_{LLE})(I-W_{LLE}^T)$ and I is the identity matrix. The minimization of (2.4.2) subject to the constraint $\chi_{LLE}\chi_{LLE}^T=I$ (a normalization constraint that prevents the solution $\chi_{LLE}=0$) is an Eigenvalue problem whose solutions are the Eigenvectors of the Laplacian matrix L.

Unsupervised Classification Via Consensus k-Means Clustering:

To overcome the instability associated with centroid based clustering algorithms, N weak clusterings $\hat{V}_n^1, \hat{V}_n^2, \ldots, \hat{V}_n^k$, $n \in \{0, \ldots, N\}$ are generated by repeated application of k-means clustering for different values of $k \in \{3, \ldots, 7\}$ on the low dimensional manifold $X_{LLE}(c)$, for all $c \in C$, and combine them via consensus clustering. As a priori the number of classes (clusters) to look for in the data is unknown, k is varied to determine up to 7 possible classes in the data. A co-association matrix H is calculated with the underlying assumption that pixels belonging to a natural cluster are very likely to be co-located in the same cluster for each iteration. H(i, j) thus represents the number of times $c_i, c_j \in C$, $i \neq j$ were found in the same cluster $\hat{V}_n^k$ over N iterations. If H(i, j)=N then there is a high likelihood that $c_i, c_j$ do indeed belong to the same cluster. Multidimensional scaling (MDS) is applied to H, which finds optimal positions for the data points $c_i, c_j$ in lower-dimensional space through minimization of the least squares error in the input pairwise similarites in H. A final unsupervised classification via k-means is used to obtain the stable clusters $V_k^1, V_k^2, \ldots, V_k^k$, q=k; for all $k \in \{3, \ldots, 7\}$.

Results

Qualitative Results

Representative results from experiments on 21 DCE-histology slice pairs are shown in FIG. 21 with each row corresponding to a different dataset. Corresponding histology sections (not shown) were registered to DCE-MRI data ($C^{D,5}$) to obtain the ground to truth estimate $G^R(C^{D,5})$ shown in FIGS. 21(a), (e), (i) highlighted in green. FIGS. 21(b), (f), (j) show the RGB scaled values of $X_{LLE}(c)$ at every $c \in C$ by representing every spatial location on the image by its embedding co-ordinates and scaling these values to display as an RGB image. Similar colors in FIGS. 21(b), (f), (j) represent pixels embedded close together in the LLE-reduced space. Each of the clusters $V_k^1, V_k^2, \ldots, V_k^q$ for each value of $k \in \{3, \ldots, 7\}$ are evaluated against $G^R(C^{D,5})$ and the cluster showing the most overlap is considered to be the cancer class. FIGS. 21(c), (g), (k) show the result of plotting this cluster back onto the slice (in red). FIGS. 21(d), (h), (l) show 3TP results based on the DCE images $C^{D,t}$, $t \in \{1, \ldots, 7\}$ in FIGS. 21(a), (e), (i). Red, blue and green colors are used to represent different classes based on the ratio $$w = \frac{\text{Rate of wash-in}}{\text{Rate of wash-out}}$$

of the contrast agent uptake. When w is close to 1, the corresponding pixel is identified as cancerous area (red), when w, is close to zero, the pixel is identified as benign (blue), and green pixels are those are identified as indeterminate.

Quantitative Evaluation Against Registered CaP Ground Truth Estimates on DCE

For each of 21 slices, labels corresponding to the clusters $V_k^1, V_k^2, \ldots, V_k^q$, q=k, for each $k \in \{3, 4, 5, 6, 7\}$ are each evaluated against the registered CaP extent on DCE-MRI ($G^R(C^{D,5})$). The cluster label showing the largest overlap with this ground truth is then chosen as the cancer class. This class is used to calculate the sensitivity, specificity, and accuracy of the CAD system at a particular k value for the slice under consideration. These values are then averaged across all 21 slices and are summarized in Table 1. The maximum sensitivity observed is 60.64% (k=3), the maximum specificity is 84.54% (k=7), and the maximum accuracy is 77.20% (k=7). A reduction in sensitivity is observed, as k increases from 3 to 7, with a corresponding increase in specificity and accuracy. Using the 3TP technique (which assumes that only 3 classes can exist in the data), a sensitivity of 41.53% and specificity of 70.04% is obtained. It is evident, that the technique diclosed has an improved performance as compared to the popular state-of-the-art 3TP method across $k \in \{3, 4, 5, 6, 7\}$.

Comparison Against Existing Prostate DCE CAD

Analyzing the results by Vos et al. [Vos, P., Hambrock, T., et al.: Computerized analysis of prostate lesions in the peripheral zone using dynamic contrast enhanced MRI. Medical Physics 35(3) (2008) 888-899] in differentiating between non-malignant suspicious enhancing and malignant lesions in the prostate, reveal that their sensitivity of 83% corresponds to a 58% specificity. These values were obtained by only considering the peripheral zone of the prostate. Comparatively the metrics (60.64% sensitivity, 84.54% specificity, and 77.20% accuracy) have been achieved when examining the whole of the prostate while utilizing a more rigorously registered CaP extent for evaluation.

TABLE 6

CaP detection sensitivity and specificity at the pixel resolution averaged over 21 3 T DCE-MRI datasets. These are compared for different values of k within consensus clustering, as well as for the 3TP method.

|  | k = 3 | k = 4 | K = 5 | k = 6 | k = 7 | 3TP |
|---|---|---|---|---|---|---|
| Sensitivity | 60.64 | 51.77 | 49.06 | 42.33 | 41.73 | 41.53 |
| Specificity | 65.80 | 76.24 | 79.60 | 83.30 | 84.54 | 70.04 |
| Accuracy | 64.54 | 71.30 | 74.20 | 76.65 | 77.20 | 67.37 |

Example 8

Integrating Structural and Functional Imaging for Computer Assisted Detection of Prostate Cancer on Multi-Protocol In Vivo 3 Tesla MRI Recently, Magnetic Resonance Imaging (MRI) has emerged as a promising modality for prostate cancer (CaP) detection. Initial results using high resolution 3 Tesla (T) endorectal in vivo prostate MRI suggest significant improvements in both the contrast and resolution of internal structures over 1.5 T MRI as well as ultrasound imaging. Additionally, a focus of recent work in prostate MRI has been on the integration of multi-protocol MR data [2] to make use of different types of information to detect CaP. Other related work in this field has focused on integration approaches for these data, but have not definitively indicated that such information fusion improves diagnostic accuracy. These attempts have made use of just the T2-w intensity value or simple T2-w based intensity features. Textural representations of T2-w data can be used to better characterize CaP regions, as they can better capture the inherent structural information. Integrating functional information with such textural representations of structure will therefore significantly improve the classification accuracy.

Experimental Design:

Notation and Pre-Processing

A 2D prostate T2-w MR image is represented as $\zeta^{T2}=(C, f^{T2})$ where C is a finite 2D rectangular array of pixels $c \epsilon C$ and $f^{T2}$ is a function that assigns an intensity value to every $c \epsilon C$. The 2D prostate DCE image is represented as $\zeta^{D,t}=(C, f^{D,t})$ where $f^{D,t}$ is a function that assigns an intensity value to every $c \epsilon C$ at time point t, $t \epsilon \{1, \ldots, 7\}$. $G(\zeta^{T2})$ and $G(\zeta^{D})$ represent the set of locations on $\zeta^{T2}$ and $\zeta^{D,t}$ that form the spatial extent of CaP obtained by registration of corresponding whole mount histological sections and MR images via the previously presented Combined Feature Ensemble Mutual Information (COFEMI) scheme in conjunction with thin-plate spline warping. The histological CaP extent is first mapped onto $\zeta^{T2}$ to obtain $G(\zeta^{T2})$. Affine alignment of the higher resolution $\zeta^{T2}$ to the lower resolution $\zeta^{D,5}$ (chosen due to improved contrast) allows to then map this CaP extent onto $\zeta^{D,5}$ to obtain $G(\zeta^{D,t})$. The ITK toolkit's BiasCorrector algorithm was used to correct each of the original 2D MR images, $\zeta^{T2}$ and $\zeta^{D,t}$, for bias field inhomogeneity. Intensity standardization was then used to correct for the non-linearity in MR image intensities on $\zeta^{T2}$ alone to ensure that the T2-w intensities have the same tissue-specific meaning across images within the same study, as well as across different patient studies. All data was analyzed at the DCE-MRI resolution, with appropriate alignment being done as described.

Six texture features (steerable features (Sobel-Kirsch operators), first order statistical features (standard deviation operator), and second order statistical (Haralick) features including intensity average, entropy, correlation, and contrast inverse moment) that have previously demonstrated good separation between cancer and non-cancer classes were extracted from $\zeta^{T2}$. The features described in Chan et al., 2003 [Chan, I., W. Wells III, et al. (2003). "Detection of prostate cancer by integration of line-scan diffusion, T2-mapping and T2-weighted magnetic resonance imaging; a multi-channel statistical classifier." Medical Physics 30(9): 2390-2398] were also extracted to compare scheme disclosed herein, with a related multi-protocol approach. Multiple possible combinations of the information contained in the structural and functional images are considered. Five feature sets of data $F^\psi$, $\psi \epsilon \{D, T2f, ints, feats\}$ are created for each pixel in each of the images:

DCE intensity vector $F^D(c)=[f^{D,t}(c)|t\epsilon\{1, \ldots, 7\}]$

T2-w intensity alone $F^{T2}(c)=[f^{T2}(c)]$

T2-w feature vector $F^{T2f}(c)=[f^{T2}(c), f_\phi^{T2f}(c)|\phi\epsilon\{1, \ldots, 6\}]$ DCE+T2 intensity vector $F^{ints}(c)=[F^D(c), F^{T2}(c)]$ DCE+T2 feature vector $F^{feats}(c)=[F^D(c), F^{T2f}(c)]$ The classifier used is based on the voting of results from an ensemble of bagged (bootstrapped aggregated) decision trees. For a given training set $\Pi^\psi$, $\psi\epsilon\{D, T2f, ints, feats\}$, N bootstrapped subsets $S_i^\psi$, $i\epsilon\{1, \ldots, N\}$, N=50, are created with replacement of the training data. Based on each training subset $S_i^\psi$ a C4.5 decision tree classifier $\xi_i^\psi$ is constructed while considering each pixel c as an individual sample. The classification result $\partial_i^\psi(c)$ for pixel c is obtained using decision tree $\xi_i^\psi$; $\partial_i^\psi(c)=1$ if c is classified as cancerous and $\partial_i^\psi(c)=0$ otherwise. The final classification is also done on a pixel basis and is the majority vote of the classification results from each individual decision tree $\partial_i^\psi$. For each pixel c, it is possible to assign the frequency of being labeled cancerous as $$P(c) = \frac{1}{N} \sum_{i=1}^{N} \partial_i^\psi(c).$$

This frequency is analogous to the probability of a particular pixel being cancer, thus a high value of P(c) indicates a high probability of a pixel c being cancerous. This yields a "frequency map" of cancer presence where brighter regions on the image will indicate a higher probability of cancer.

Results:

Sample classification results are shown in FIG. 18. FIGS. 18(a) and (g) show overlays of $G(\zeta^D)$ in green on $\zeta^{T2}$ (registered to $\zeta^{D,t}$) with each row corresponding to a different slice. FIGS. 18(b) and (h) show the best classification result obtained by thresholding $\zeta^{T2}$. The poor classification is obvious when using T2-w intensities alone. FIGS. 18(c)-(f) and 1(i)-(l) show frequency maps for cancer when using the feature sets $F^D$, $F^{T2f}$, $F^{ints}$, $F^{feats}$ for classification. Bright regions on these images correspond to higher probabilities of cancer. The results in FIGS. 18(f) and (l) can be seen to have better correspondences with the ground truth in FIGS. 18(a) and (g). From FIGS. 18(b), (h), (e), and (k) it is clear that T2-w and DCE intensities alone form poorer feature sets for classifying CaP.

FIG. 18(m) shows the best Receiver-Operating Characteristic (ROC) curves obtained from among the 10 slices with different colours corresponding to the different feature sets, obtained via leave-one-out cross validation using permutations of the 10 images. The highest AUC (area under the ROC curve) value is for $F^{feats}$ (shown in red), while the lowest is for $F^{T2}$ (shown in purple). AUC values averaged over 10 slices for each of the different feature sets are summarized in Table 1 with corresponding standard deviations.

Paired student t-tests were conducted using the AUC, specificity and sensitivity values at the operating point of the respective ROC curves for each image to determine the significance of the results (Tables 2, 3 and 4) using different feature combinations. It was found that $F^{feats}$ significantly (p<0.05) outperformed classification based on any of $\{F^{T2}, F^{T2f}, F^{ints}\}$ in terms of AUC. Additionally, it is evident that classification based on simple thresholding of $F^{T2}$ is extremely poor, showing the worst performance in terms of sensitivity, specificity and AUC. The superior performance when using $F^{feats}$ suggests that integrating structural textural features and functional information performs better compared to any individual modality.

Comparison to Previous Work:

A simple comparison is shown in Table 5 of relative runtimes and accuracies with a related method for CaP detection on multi-protocol MRI (described in [2]) and the proposed technique. All experiments were conducted using MATLAB 7.6 (Mathworks Inc.) on a 32 GB RAM, 2 dual core 2.33 Ghz 64-bit Intel Core 2 processor machine. It is clear that the proposed method offers significant improvements even with differences in datasets and protocols being taken into account. It must be noted that the technique in Chan et al, 2003 was observed to have significant implementation and runtime issues, as well as demonstrating acute sensitivity to training data. Comparatively the method was more robust due to the use of bagging, and does not suffer from the redundancy in feature space that has also been noted in Chan et al, 2003.

Contributions:

A methodological framework for non-rigid alignment and fusion of structural and functional information.

Application of proposed framework for fusion of structural T2-w MRI and functional DCE MRI demonstrating improved accuracy compared to any individual modality.

TABLE 1

Showing average AUC values with standard deviations for each combination of protocols across 10 slices

| Feature set $\Pi^\phi$ | Avg. AUC | Std. Dev. |
|---|---|---|
| $F^{feats}$ | 0.692 | 0.087 |
| $F^{ints}$ | 0.629 | 0.071 |
| $F^D$ | 0.668 | 0.073 |
| $F^{T2f}$ | 0.561 | 0.031 |
| $F^{T2}$ | 0.531 | 0.065 |

TABLE 2

Showing p values for t-tests over 10 slices comparing AUCs from $F^{feats}$ to AUCs from feature sets.

| AUC | p value |
|---|---|
| $F^{feats}$ vs. $F^D$ | 0.486 |
| $F^{feats}$ vs. $F^{T2}$ | 0.002 |
| $F^{feats}$ vs. $F^{ints}$ | 0.001 |
| $F^{feats}$ vs. $F^{T2f}$ | 0.001 |

TABLE 3

Showing p values for t-tests over 10 slices comparing specificity from $F^{feats}$ to specificity from feature sets.

| Specificity | p value |
|---|---|
| $F^{feats}$ vs. $F^D$ | 0.139 |
| $F^{feats}$ vs. $F^{T2}$ | $9.951 \times 10^{-5}$ |
| $F^{feats}$ vs. $F^{ints}$ | 0.606 |
| $F^{feats}$ vs. $F^{T2f}$ | 0.002 |

TABLE 4

Showing p values for t-tests over 10 slices comparing sensitivity from $F^{feats}$ to sensitivity from feature sets.

| Sensitivity | p value |
|---|---|
| $F^{feats}$ vs. $F^D$ | 0.3261 |
| $F^{feats}$ vs. $F^{T2}$ | 0.9767 |
| $F^{feats}$ vs. $F^{ints}$ | 0.0393 |
| $F^{feats}$ vs. $F^{T2f}$ | $6.651 \times 10^{-4}$ |

Table 5

Comparing the current method to Chan et al in terms of run time (in minutes) and overall accuracy.

| Method | Feature extraction time | Classification time | Highest avg. AUC value |
|---|---|---|---|
| Chan et al | 240 | 30 | 0.58 |
| Our method | 30 | 90 | 0.69 |

Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined in the appended claims.

What is claimed is:

1. A method of constructing a classifier to detect cancer sub-clusters in an organ using a dataset containing in vivo high resolution magnetic resonance imaging (MRI) data, comprising the steps of:
   a. preprocessing the MRI data by correcting bias field inhomogeneity and non-linear MRI artifacts to create a corrected MRI scene;
   b. rigidly or non-rigidly registering determined correspondences of whole-mount histological sections (WMHS) and MRI data via a Combined Feature Ensemble Mutual Information (COFEMI) technique, thereby obtaining cancerous and non-cancerous regions in the preprocessed MRI data;
   c. extracting features on a per-voxel basis from the MRI scene;
   d. embedding the extracted feature into a low dimensional Eigen space using manifold learning techniques on a per-voxel basis, thereby non-linearly reducing the dimensionality of the extracted image features;
   e. training a classifier on the reduced dimensional Eigen feature to discriminate a voxel from an MRI scene as cancerous or normal; and
   f. classifying each voxel in the MRI scene based on its reduced dimensional Eigen feature as cancerous or normal, thereby detecting cancer.

2. The method of claim 1, wherein the dataset comprises magnetic resonance spectroscopy (MRS).

3. The method of claim 1, wherein the dataset comprises T2-weighted (T2w) MRI.

4. The method of claim 1, wherein the dataset comprises diffusion weighted (DWI) MRI.

5. The method of claim 1, wherein the dataset comprises dynamic contrast-enhanced (DCE) MRI.

6. The method of claim 1 wherein each of the extracted image features is selected from a group consisting of a metabolic feature, a statistical feature, a Heralick co-occurrence feature, a Gabor feature, a local binary pattern feature, an apparent diffusion coefficient map feature, an inherent kinetic feature, or their combination.

7. The method of claim 1, wherein the step of embedding the extracted feature is by locally linear embedding, graph embedding, isometric mapping, or their combination via consensus embedding.

8. The method of claim 1, wherein the steps of training and classifying the reduced dimensional Eigen feature are by decision trees, probabilistic boosting trees, support vector machines, hierarchical clustering, k-means clustering, mean shift clustering, or a combination thereof.

9. The method of claim 1, wherein the organ is a prostate.

10. A method of combining multiple magnetic resonance imaging protocols to detect cancer sub-clusters in an organ using a dataset containing in vivo high resolution MRI data, comprising the steps of:
   a. preprocessing the MRI data by correcting bias field inhomogeneity and non-linear MR artifacts for each MRI protocol to create corrected multi-protocol MRI scenes;
   b. rigidly or non-rigidly registering determined correspondences of whole-mount histological sections (WMHS) and multi-protocol MRI scenes via a Combined Feature Ensemble Mutual Information (COFEMI) technique, thereby obtaining cancerous and non-cancerous regions on multi-protocol MRI data;
   c. extracting features on a per-voxel basis from each multi-protocol MRI scene;
   d. embedding each extracted multi-protocol MRI scene feature into a low dimensional Eigen space using manifold learning techniques on a per-voxel basis, thereby non-linearly reducing the dimensionality of the extracted multi-protocol MRI scene feature;
   e. concatenating low dimensional Eigen vectors from each MRI protocol scene on a per-voxel basis, thereby combining features of the reduced dimensional multi-protocol MRI scene;
   f. training a classifier on the combined reduced dimensional Eigen feature to discriminate a voxel from a multi-protocol MRI scene as cancerous or normal; and
   g. classifying each voxel in the multi-protocol MRI scene based on its reduced dimensional Eigen feature as cancerous or normal, thereby detecting cancer.

11. The method of claim 10, wherein the dataset comprises MRS, DCE, DWI, and T2w MRI data.

12. The method of claim 10, wherein each of the extracted image features is selected from a group consisting of a metabolic feature, a statistical feature, a Haralick co-occurrence feature, a Gabor feature, a local binary pattern feature, an apparent diffusion coefficient map feature, an inherent kinetic feature, or their combination.

13. The method of claim 10, wherein the step of embedding the extracted feature is by locally linear embedding, graph embedding, isometric mapping, or their combination via consensus embedding.

14. The method of claim 10, wherein the steps of training and classifying the reduced dimensional Eigen feature are by decision trees, probabilistic boosting trees, support vector machines, hierarchical clustering, k-means clustering, mean shift clustering, or a combination thereof.

15. The method of claim 10, wherein the organ is a prostate.

16. A method of combining multiple magnetic resonance imaging protocols to identify high grade cancer sub-clusters in an organ using a dataset containing in vivo high resolution MRI data, comprising the steps of:
   a. preprocessing the MRI data by correcting bias field inhomogeneity and non-linear MRI artifacts to create a corrected MRI scene;
   b. rigidly or non-rigidly registering determined correspondences of whole-mount histological sections (WMHS) and MRI data via a Combined Feature Ensemble Mutual Information (COFEMI) technique, thereby obtaining cancerous and non-cancerous regions in the MRI data;
   c. extracting features on a per-voxel basis from the MRI scene;
   d. embedding the extracted feature into a low dimensional Eigen space using manifold learning techniques on a per-voxel basis, thereby non-linearly reducing the dimensionality of the extracted image features;
   e. concatenating low dimensional Eigen vectors from each MRI protocol scene on a per-voxel basis, thereby combining features of the reduced dimensional multi-protocol MRI scene;
   f. training a classifier on the combined reduced dimensional Eigen feature to discriminate a voxel from an MRI scene as high- or low-grade cancer; and
   g. classifying each voxel in the MRI scene based on its reduced dimensional Eigen feature as high- or low-grade, thereby identifying high-grade cancer.

17. The method of claim 16, wherein the dataset comprises MRS, DCE, DWI, and T2w MRI data.

18. The method of claim 16, wherein each of the extracted image features is selected from a group consisting of a metabolic feature, a statistical feature, a Haralick co-occurrence feature, a Gabor feature, a local binary pattern feature, an apparent diffusion coefficient map feature, an inherent kinetic feature, or their combination.

19. The method of claim 16, wherein the step of embedding the extracted feature is by locally linear embedding, graph embedding, isometric mapping, or their combination via consensus embedding.

20. The method of claim 16, wherein the steps of training and classifying the reduced dimensional Eigen feature are by decision trees, probabilistic boosting trees, support vector machines, hierarchical clustering, k-means clustering, mean shift clustering, or a combination thereof.

21. The method of claim 16, wherein the organ is a prostate.

* * * * *